(12) United States Patent
Walton et al.

(10) Patent No.: US 7,295,154 B2
(45) Date of Patent: Nov. 13, 2007

(54) VEHICLE OBSTACLE WARNING RADAR

(75) Inventors: Eric K. Walton, Columbus, OH (US); Chi-Chih Chen, Dublin, OH (US)

(73) Assignee: The Ohio State University, Columbus, OH (US)

( * ) Notice: Subject to any disclaimer, the term of this patent is extended or adjusted under 35 U.S.C. 154(b) by 316 days.

(21) Appl. No.: 10/968,472

(22) Filed: Oct. 19, 2004

(65) Prior Publication Data
US 2006/0022866 A1 Feb. 2, 2006

Related U.S. Application Data

(63) Continuation-in-part of application No. 10/294,507, filed on Nov. 14, 2002, now Pat. No. 6,806,826.

(60) Provisional application No. 60/349,816, filed on Jan. 17, 2002.

(51) Int. Cl.
G01S 13/93 (2006.01)
G01S 10/04 (2006.01)

(52) U.S. Cl. .......................... 342/194; 342/70; 342/126; 342/195

(58) Field of Classification Search ............ 342/70–73, 342/90, 126, 145, 194, 195
See application file for complete search history.

(56) References Cited

U.S. PATENT DOCUMENTS

| | | | |
|---|---|---|---|
| 3,308,463 A | 3/1967 | Emerson | 343/18 |
| 3,854,137 A | 12/1974 | Kohler | 343/106 D |
| 3,900,879 A | 8/1975 | Lewinter | 343/113 R |
| 3,911,357 A | 10/1975 | Adam | 324/51 |
| 3,918,054 A | 11/1975 | Collins | 343/5 DP |

(Continued)

FOREIGN PATENT DOCUMENTS

GB 2309829 A 8/1999

(Continued)

OTHER PUBLICATIONS

Kim, M. W., et al, "Neural Network Based Optimum Radar Target Detection in Non-Gaussian Noise.", Proceedings of the International Joint Conference on Neural Networks, Jun. 7-11, 1992.

(Continued)

Primary Examiner—Ian J. Lobo
(74) Attorney, Agent, or Firm—Standley Law Group LLP

(57) ABSTRACT

A method for detecting an object using a transmitting antenna and an array of receiving antennas. The method comprises the step of transmitting a signal from the transmitting antenna. The magnitude and phase of a respective received signal at each of the receiving antennas is then measured. Next, the magnitude of a weighted sum of respective phase-compensated signals related to each of the receiving antennas is determined. The magnitude of the weighted sum is compared against a first predetermined threshold value and, optionally, a second predetermined threshold value. An object may be detected by considering a ratio of the magnitude of the weighted sum to the first predetermined threshold value and, optionally, to the second predetermined threshold value. In some embodiments, a second array of receiving antennas may be provided to facilitate the determination of the location of the object.

14 Claims, 36 Drawing Sheets

U.S. PATENT DOCUMENTS

| | | | | |
|---|---|---|---|---|
| 3,975,738 | A | 8/1976 | Pelton et al. | 343/872 |
| 4,276,509 | A | 6/1981 | Bryant et al. | 324/51 |
| 4,287,520 | A | 9/1981 | Van Vliet et al. | 343/909 |
| 4,395,677 | A | 7/1983 | Petersdorf | 324/117 H |
| 4,475,108 | A | 10/1984 | Moser | 343/700 MS |
| 4,584,523 | A | 4/1986 | Elabd | 324/96 |
| 4,673,944 | A | 6/1987 | Graves | 342/424 |
| 4,712,057 | A | 12/1987 | Pau | 324/73 R |
| 4,764,773 | A | 8/1988 | Larsen et al. | 343/713 |
| 4,813,198 | A | 3/1989 | Johnston et al. | 52/171 |
| 5,012,255 | A | 4/1991 | Becker | 343/704 |
| 5,014,346 | A | 5/1991 | Phillips et al. | 455/89 |
| 5,039,949 | A | 8/1991 | Hemming et al. | 324/646 |
| 5,089,700 | A | 2/1992 | Sapia et al. | 250/330 |
| 5,138,330 | A | 8/1992 | Lindenmeier et al. | 343/713 |
| 5,139,850 | A | 8/1992 | Clarke et al. | 428/192 |
| 5,147,694 | A | 9/1992 | Clarke | 428/34 |
| 5,266,960 | A | 11/1993 | Lindenmeier et al. | 343/704 |
| 5,293,177 | A | 3/1994 | Sakurai et al. | 343/906 |
| 5,337,016 | A | 8/1994 | Wozniak et al. | 324/632 |
| 5,355,144 | A | 10/1994 | Walton et al. | 343/713 |
| 5,436,872 | A | 7/1995 | Gilmour et al. | 367/103 |
| 5,459,760 | A | 10/1995 | Watanabe | 375/202 |
| 5,577,269 | A | 11/1996 | Ludewig | 455/90 |
| 5,598,163 | A * | 1/1997 | Cornic et al. | 342/70 |
| 5,620,799 | A | 4/1997 | Sauer | 428/426 |
| 5,621,413 | A | 4/1997 | Lempkowski et al. | 342/117 |
| 5,638,281 | A | 6/1997 | Wang | 364/461 |
| 5,739,790 | A | 4/1998 | Green, Jr. | 343/702 |
| 5,756,991 | A | 5/1998 | Risinger et al. | 250/252.1 |
| 5,757,194 | A | 5/1998 | Yun | 324/627 |
| 5,768,131 | A | 6/1998 | Lissel et al. | 342/109 |
| 5,812,098 | A | 9/1998 | Harris et al. | 343/906 |
| 5,821,904 | A | 10/1998 | Kakizawa et al. | 343/713 |
| 5,834,661 | A | 11/1998 | Nonaka et al. | 73/866 |
| 5,853,889 | A | 12/1998 | Joshi et al. | 428/411.1 |
| 5,864,319 | A | 1/1999 | Paulus | 343/703 |
| 5,867,129 | A | 2/1999 | Sauer | 343/713 |
| 5,874,917 | A | 2/1999 | Desodt et al. | 342/379 |
| 5,917,458 | A | 6/1999 | Ho et al. | 343/909 |
| 5,923,284 | A | 7/1999 | Artis et al. | 342/129 |
| 5,945,957 | A | 8/1999 | Kakizawa | 343/713 |
| 5,999,134 | A | 12/1999 | Dishart et al. | 343/713 |
| 5,999,135 | A | 12/1999 | Nozaki et al. | 343/713 |
| 6,002,357 | A | 12/1999 | Redfern et al. | 342/22 |
| 6,081,237 | A | 6/2000 | Sato et al. | 343/713 |
| 6,085,151 | A | 7/2000 | Farmer et al. | 701/301 |
| 6,087,996 | A | 7/2000 | Dery | 343/713 |
| RE36,819 | E | 8/2000 | Gellner et al. | 342/70 |
| 6,198,427 | B1 | 3/2001 | Aker et al. | 342/104 |
| 6,208,303 | B1 | 3/2001 | Tachihara et al. | 343/704 |
| 6,211,812 | B1 | 4/2001 | Chiles et al. | 342/145 |
| 6,229,493 | B1 | 5/2001 | Iijima | 343/713 |
| 6,268,832 | B1 | 7/2001 | Twort et al. | 343/713 |
| 6,292,129 | B1 | 9/2001 | Matsugatani et al. | 342/70 |
| 6,320,558 | B1 | 11/2001 | Walton | 343/906 |
| 6,356,236 | B1 | 3/2002 | Maeuser et al. | 343/713 |
| 6,377,221 | B1 | 4/2002 | Lindenmeier et al. | 343/713 |
| 6,437,748 | B1 | 8/2002 | Burnside et al. | 343/703 |
| 6,452,560 | B2 | 9/2002 | Kunysz | 343/770 |
| 6,483,468 | B2 | 11/2002 | Walton | 343/713 |
| 6,551,715 | B1 | 4/2003 | Seto et al. | 428/432 |
| 6,614,922 | B1 | 9/2003 | Walton | 382/141 |
| 6,693,597 | B2 | 2/2004 | Walton et al. | 343/713 |
| 6,784,826 | B2 * | 8/2004 | Kane et al. | 342/195 |
| 6,806,826 | B2 | 10/2004 | Walton et al. | 342/194 |
| 6,860,081 | B2 | 3/2005 | Walton et al. | 52/786.11 |
| 6,864,834 | B2 | 3/2005 | Walton | 342/195 |
| 2001/0015698 | A1 | 8/2001 | Tokoro | 342/70 |
| 2002/0122009 | A1 | 9/2002 | Winebrand et al. | 343/767 |
| 2003/0011510 | A1 | 1/2003 | Haruta et al. | 342/160 |
| 2003/0112190 | A1 | 6/2003 | Baliarda et al. | 343/713 |

FOREIGN PATENT DOCUMENTS

| | | |
|---|---|---|
| WO | WO 03/027707 A2 | 4/2003 |
| WO | WO 03/073124 A1 | 9/2003 |
| WO | WO 03/092117 A2 | 11/2003 |
| WO | WO 2003/092117 A3 | 11/2003 |
| WO | WO 2004/051869 A2 | 6/2004 |
| WO | WO 2004/051869 A3 | 6/2004 |
| WO | WO 2004/051870 A2 | 6/2004 |
| WO | WO 2004/051870 A3 | 6/2004 |
| WO | WO 2005/003810 A1 | 1/2005 |

OTHER PUBLICATIONS

Williams, D. A., "Millimetre Wave Radars for Automotive Applications", International Microwave Symposium Digest, Jun. 1-5, 1992.

Burnside, W.D. et al., "An Ultra-Wide Bandwidth, Tapered Chamber Feed", 1996 AMTA Symposium, Seattle, WA, Oct. 1996, pp. 103-108.

Gau, J-R. J., et al., "Chebyshev Multilevel Absorber Design Concept", IEEE Transactions on Antennas Propagation, vol. 45, No. 8, Aug. 1997, pp. 1286-1293.

Kim, M.W., et al., "Neural Network Based Optimum Radar Target Detection in Non-Gaussian Noise.", Proceedings of the International Joint Conference on Neural Networks, Jun. 7-11, 1992, pp. III-654-III-659.

Lai, A. K. Y., et al., "A Novel Antenna for Ultra-Wide-Band Applications", IEEE Transactions on Antennas Propagation, vol. 40, No. 7, Jul. 1992, pp. 755-760.

Skolnik, M. I., "Introduction to Radar Systems", Second Edition, ISBN #0-07-057909-1, McGraw-Hill Book Company, 1980, pp. 375-376.

Web pages, http://www.owlnet.rice.edu/~elec43 . . . jects96/pictomaniacs/previous.html, Jan. 19, 2000, 3 pages.

Williams, D. A., "Millimetre Wave Radars for Automotive Applications", International Microwave Symposium Digest, Jun. 1-5, 1992, pp. 721-724.

* cited by examiner

VEHICLE OBSTACLE WARNING RADAR

This application is a continuation-in-part of U.S. application Ser. No. 10/294,507, filed Nov. 14, 2002, now U.S. Pat. No. 6,806,826 which claims the benefit of U.S. Provisional Application No. 60/349,816, filed Jan. 17, 2002, each of which is hereby incorporated by reference in its entirety.

BACKGROUND AND SUMMARY OF THE INVENTION

The present invention relates generally to a radar system and, more particularly, to a warning radar that may be used to detect obstacles in the path of a moving or stationary vehicle. Although the present invention will be described herein primarily with regard to a vehicle obstruction warning radar, it should be understood that the present invention may also be be used in other applications. For instance, the present invention may be used in other similar or conventional applications of radars.

A driver may check his rearview mirror and sideview mirrors when backing up a vehicle. A driver may also pivot his head around to look behind the vehicle. Despite checking each of the mirrors and/or turning around, there typically is a blind spot in the driver's field of view. Compounding the problem with the blind spot, some drivers may not see properly behind the vehicle simply because they are distracted or do not exercise proper care. As a result, a driver may not see obstacles behind the vehicle when backing up. For many of the same or similar reasons, a driver may not be able to see obstacles located to the side or front of a vehicle.

In light of the difficulties with seeing obstacles when driving a car, there is a need for a radar system that detects and warns of such obstacles. There is also a need for a radar system that can accurately detect the presence of an obstacle using one or more transmitted signals of substantially the same frequency as opposed to multiple transmitted signals having different frequencies. Furthermore, a need exists for being able to determine the presence of an obstacle without modulating the transmitted signals.

The present invention solves one or more of the aforementioned needs. The system includes at least one transmitting antenna and at least one receiving antenna. In one exemplary embodiment which includes multiple transmitting and/or receiving antennas, the receiving antennas may be arranged in at least one linear array to provide spatially distributed data to facilitate the determination of the angle and range estimates of the obstacle(s). It should be recognized that the receiving antennas may be arranged in a non-linear configuration, but a non-linear configuration may increase the difficulty of determining the angle and range estimates of the obstacles.

The transmitting antenna receives an input signal and transmits an electromagnetic wave. The electromagnetic wave reflects off an obstacle back to the receiving antenna. The receiving antenna captures the reflected electromagnetic wave and produces an output signal. The output signal is then combined with the input signal in a quadrature mixer. The resulting in-phase (I) and quadrature (Q) signals may be further processed and then transmitted to a processing system. The processing system uses a suitable algorithm (e.g., a near field back projection algorithm, a far field angle of arrival algorithm, or any other type of tomographic algorithm) to estimate the type and/or location of obstacle that reflected the electromagnetic wave. In an exemplary embodiment, the algorithm is adapted to discriminate between different sizes and/or locations of obstacles in order to determine if there is a hazard. Based on this information, the processing system may then communicate with a visual or audible display or warning system in order to alert the driver about the obstacle if it has been determined to be a hazard.

In addition to the novel features and advantages mentioned above, other objects and advantages of the present invention will be readily apparent from the following descriptions of the drawings and exemplary embodiments.

BRIEF DESCRIPTION OF THE DRAWINGS

FIG. 17($b$) is a graph of an example of the polar plot of compact range measurements—H-plane.

DETAILED DESCRIPTION OF EXEMPLARY EMBODIMENT(S)

The present invention is directed to a radar system for detecting the presence of obstacles. The present invention may be used to detect obstacles in the intended path of a moving or stationary vehicle. Examples of vehicles include cars, trucks, sport utility vehicles, motorcycles, bikes, trains, construction equipment, carts, and other similar or conventional types of vehicles. The present invention may also be used in conjunction with other types of transportation or movable objects including, but not limited to, boats, ships, submarines, planes, helicopters, and other similar or conventional types of transportation or movable objects.

Figure 1:
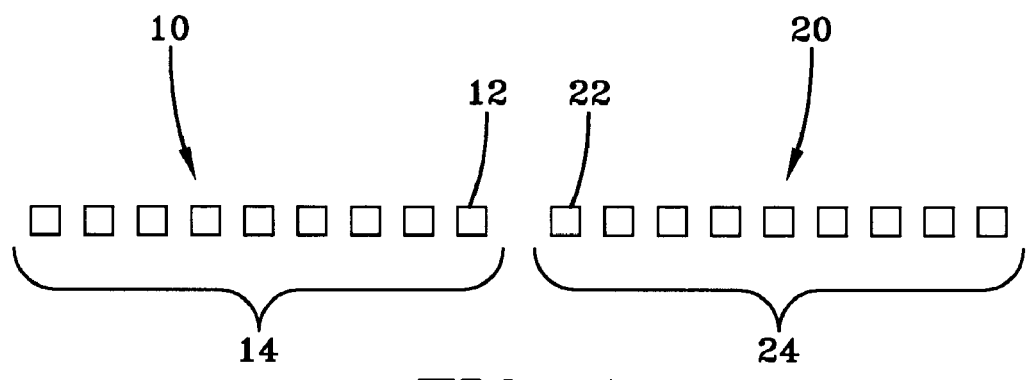
FIG. 1 is a schematic diagram of an exemplary embodiment of two arrays of transmitting and receiving antennas of the present invention.

The radar system of the present invention includes at least one transmitting antenna and at least one receiving antenna. The number and spacing of the transmitting antenna(s) and the receiving antenna(s) may be selected to achieve the desired resolution and sensitivity of the radar system. In an exemplary embodiment which includes multiple transmitting and/or receiving antennas, the receiving antennas may be arranged in at least one linear array to provide spatially distributed data to facilitate the determination of the angle, range, and type estimates of the obstacle(s). One exemplary embodiment of the radar system may include a linear array of receiving or transmitting antennas, but not both. For example, FIG. 1 shows an exemplary configuration of two linear arrays of antennas 10 and 20. Linear array 10 includes a transmitting antenna 12 and an array of receiving antennas 14, and linear array 20 includes a transmitting antenna 22 and an array of receiving antennas 24. Nevertheless, it should be recognized that some embodiments of the present invention may include a linear array of transmitting antennas and a linear array of receiving antennas.

The location of the transmitting antenna(s) relative to the receiving antenna(s) may be varied as compared to the configuration of FIG. 1. For example, a transmitting antenna may be situated at another edge of a receiving array, or a transmitting antenna may be situated above, below, or at an intermediate point in a receiving array. While the receiving antennas may be arranged in a non-linear configuration, it should be recognized that a non-linear configuration may increase the difficulty of determining the angle, range, and type estimates of the obstacles.

The number of transmitting antennas may be less than, the same as, or greater than the number of receiving antennas. An exemplary embodiment of the present invention may include at least one array of receiving antennas or at least one array of transmitting antennas. For example, the radar system may include one transmitting antenna and two arrays of receiving antennas. In one exemplary embodiment, there may be about 1 or 2 transmitting antennas per about 30 to 100 receiving antennas. However, there may be multiple arrays of transmitting antennas and only a small number of receiving antennas in another exemplary embodiment. As such, it should be recognized that the number of transmitting antenna(s) and receiving antenna(s) is theoretically unlimited.

Figure 2:
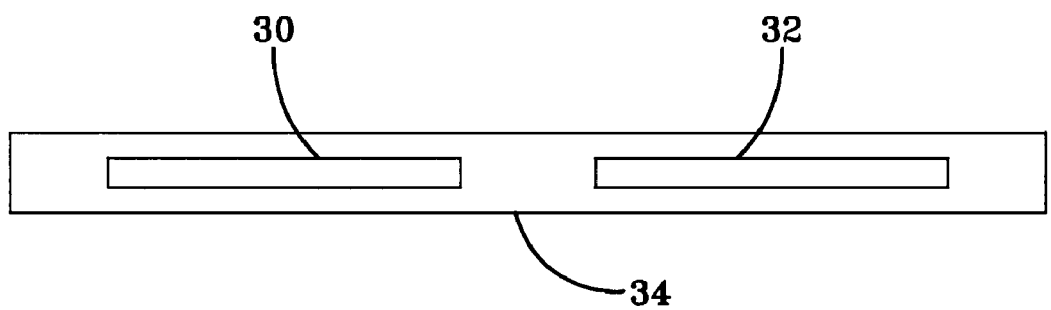
FIG. 2 is a schematic diagram of an exemplary implementation of two arrays of transmitting and receiving antennas of the present invention.
Figure 3:
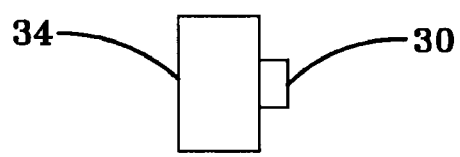
FIG. 3 is a side view of the exemplary implementation shown in FIG. 2.

An exemplary implementation of the present invention is shown in FIG. 2 and FIG. 3. In this embodiment, two arrays of transmitting and receiving antennas 30 and 32 are secured to a bumper 34 of a vehicle. In other embodiments of the present invention, the arrays may be secured to another portion of a vehicle including, but not limited to, the front or a side. The arrays may be secured to the vehicle using any suitable technique. For example, the arrays may be secured to the vehicle using adhesives and/or mechanical fastening means.

Figure 4:
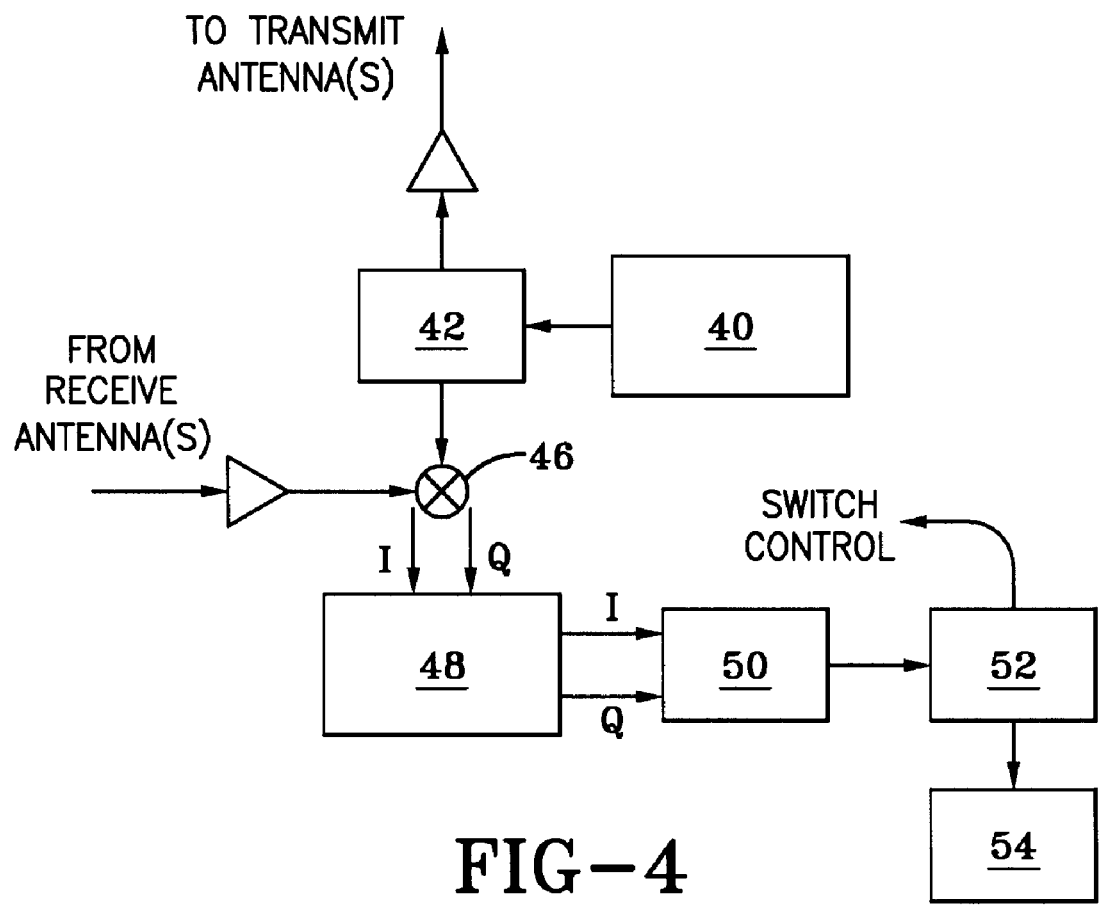
FIG. 4 is a schematic diagram of an exemplary radar system of the present invention.
Figure 5:
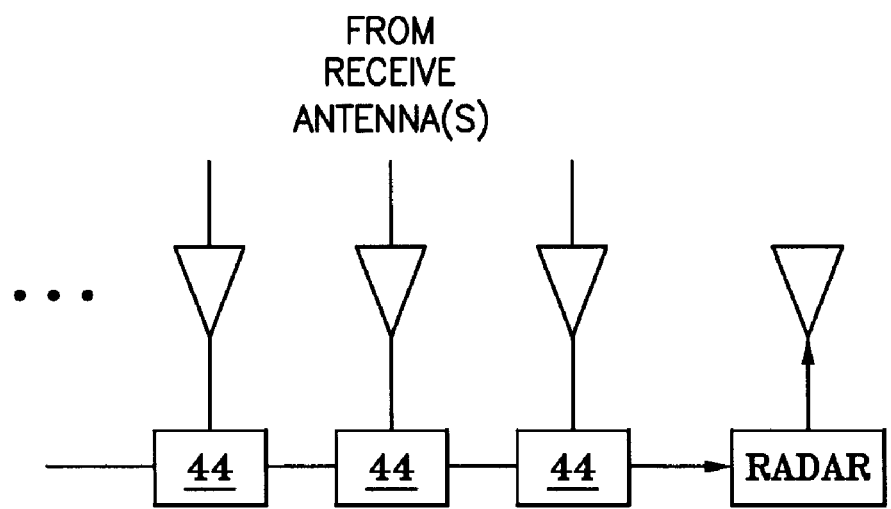
FIG. 5 is a schematic diagram of an exemplary switching architecture which may be used in the present invention.

FIG. 4 is a schematic diagram of an exemplary embodiment of the present invention. A continuous wave signal source 40 may be used to supply an input signal to at least one transmitting antenna. In the event there is multiple transmitting antennas, a power divider 42 may be utilized to deliver substantially the same input signal to each transmitting antenna. Each transmitting antenna transmits an electromagnetic wave that is adapted to reflect off an obstacle back to the receiving antennas. The receiving antennas capture the reflected electromagnetic waves and produce output signals. A switch configuration comprising a plurality of switches 44 such as shown in FIG. 5 may be utilized to facilitate the scanning of the output signals of the receiving antennas. The respective output signals are combined with the input signal in a quadrature mixer 46. The resulting in-phase (I) and quadrature (Q) signals may be further processed and then transmitted to a processing system. For example, the radar system may include at least one filter 48, e.g., a pair of low pass filters, for filtering the I and Q signals prior to the processing system. The radar system may also include at least one analog-to-digital converter 50 to facilitate electrical communication with the processing system. An example of the processing system 52 may be comprised of a processor and, optionally, a controller. The processor and the controller may be embodied in the same device or in separate devices. The controller may control the scanning of the switches 44 that are in communication with the receiving antennas. The processor may use a suitable algorithm (e.g., a near field back projection algorithm, a far field angle of arrival algorithm, or any other suitable type of tomographic algorithm) to estimate the type and/or location of obstacle that reflected the electromagnetic waves. In an exemplary embodiment, the algorithm may be adapted to discriminate between different sizes and/or locations of obstacles in order to determine if there is a hazard. For example, an exemplary embodiment of the present invention may be adapted to discriminate between various types of obstacles including, but not limited to, curbs, potholes, people, posts, other vehicles, and other various types of obstacles. In one embodiment, the size of an obstacle may be estimated by the strength of the reflected electromagnetic waves. In another embodiment, the location (e.g., distance and/or angle) of an obstacle may be estimated by deriving angle and range distribution data from the I signals and the Q signals. Based on such information, the processing system 52 may then communicate with a visual or audible display or warning system 54 in order to alert the driver about the obstacle if it has been determined to be a hazard.

As mentioned above, each receiving array may be linearly disposed. The length of each receiving array and its element spacing may be selected to obtain the desired resolution and sensitivity of the resulting image. For example, the radar system may be comprised of about 30 to 100 or more receiving antennas that are linearly disposed. At each receiving antenna, the amplitude and phase of the total received signal may be measured in an exemplary embodiment of the present invention. This signal is the phasor sum of the set of signals arriving at each antenna after reflecting from the various radar scatterers in the field of view of the array. This results in an array of bistatically received signals over the region of the radar, wherein each signal is the linear phasor sum of the various scattered signals. A suitable algorithm may then be performed.

An example of the algorithm may include some or all of the following steps:
1. choosing an area to image over and divide it into a 2-dimensional array of pixels;
2. selecting each pixel in the region to be imaged;
3. phase shifting each measured signal by a phase correction derived from the bistatic distance from the transmit antenna—to the pixel—to the receive antenna;
4. determining a linear phasor sum of the set of signals;
5. determining the amplitude of the phasor sum using the contribution of the scattering from the pixel of interest;
6. repeating these steps for all of the pixels in the area to be imaged; and
7. determining an image showing the level of scattering over the domain of the area of interest.

Any suitable type of display or warning system may be utilized in the present invention to convey the appropriate message to the intended recipient, e.g., the driver of the vehicle. For instance, the processing system may communicate with an audible warning system to produce an appropriate audible sound or message. In another embodiment, the processor may communicate with a visual display to produce an image of the obstacle(s) or an appropriate text message such as "GO" or "DON'T GO". One example of a visual display is a liquid crystal display. Another example of a display is one that includes visual imagery as well as an audible sound or message.

EXAMPLES

An exemplary embodiment of an X-band, dual-array radar system of the present invention was developed for detecting both stationary and moving objects within the configurable coverage area. In this example, each array receives microwave scattered signals whose magnitude and phase are recorded via a zero-IF, I/Q mixing scheme. The down-converted signals are then sampled and digitized using an analog-to-digital converter. Each receiving element is switched on using a fast, custom RF switch design. The received array information is then processed to obtain the angle-of-arrival (AOA) intensity profile whose high magnitude regions indicate the direction of possible obstacles. The AOA information from left and right arrays is then used to triangulate the locations of the obstacles. A custom radar control and data processing software program was also developed. The hardware designs and software operations of this example are described herein.

A reverse-sensing collision avoidance radar may be used on vehicles with poor visibility of the area directly behind them. This exemplary system will alert the operator if an object is behind the vehicle. An advantage of this exemplary system is its ability to determine the exact location of the object. Another advantage is the ability to detect obstacles that are moving or stationary relative to the vehicle. Still another benefit of this exemplary embodiment is the ability to detect obstacles in practically all terrain environments.

Figure 6:
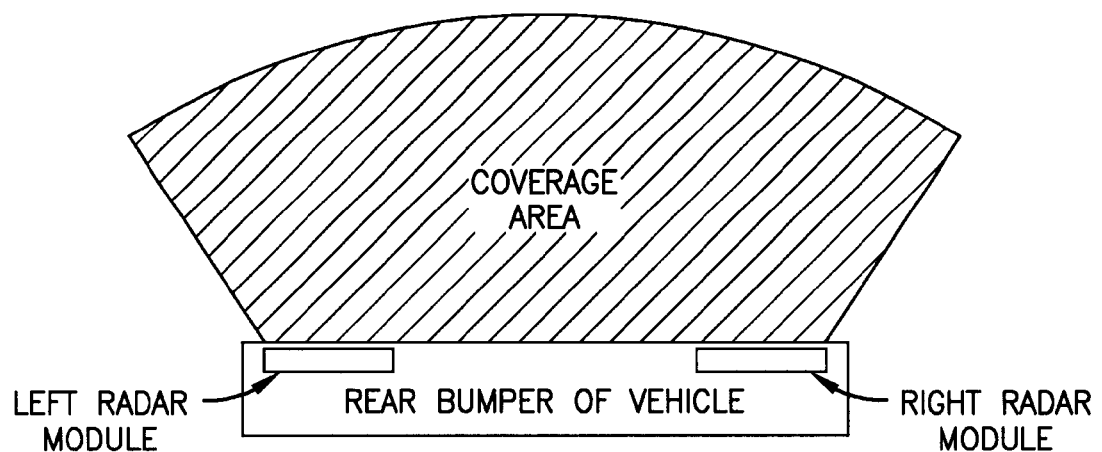
FIG. 6 is a schematic diagram of the radar placement of an exemplary embodiment of a radar system of the present invention.
Figure 7:
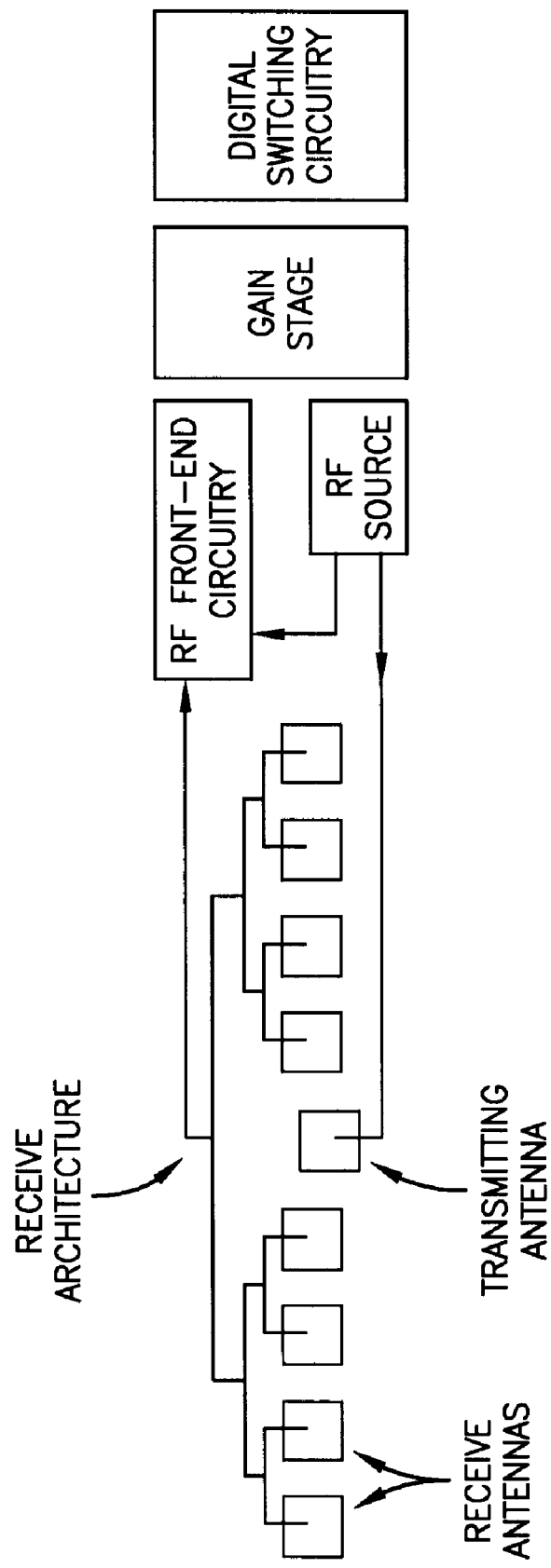
FIG. 7 is a block diagram of an exemplary embodiment of a radar system of the present invention.

A further benefit of this exemplary obstacle sensing radar is that it is adapted to reduce the number of false alarms. Thus, the radar system needs to be able to distinguish a target from the background clutter, to see stationary as well as moving targets, and to locate the position of any obstacle in the coverage area. The exemplary system presented here may accomplish some or all of these design goals. The exemplary radar system uses two separate radar units mounted on the bumper of a vehicle as shown in FIG. 6. Each radar generates a 10.525 GHz continuous wave (CW) signal, transmitted by a microstrip patch antenna. The choice of patch antennas was made to make the system as conformal as possible to the shape of the vehicle. The reflected signal is received by an array of eight patch antennas, as shown in FIG. 7. This array uses a parallel architecture with RF switches to guide the individual element received signals to the mixer. The use of a parallel architecture eliminates the need for individual receiving channel calibration. The absence of this calibration procedure was a welcomed feature of this new system.

Figure 8:
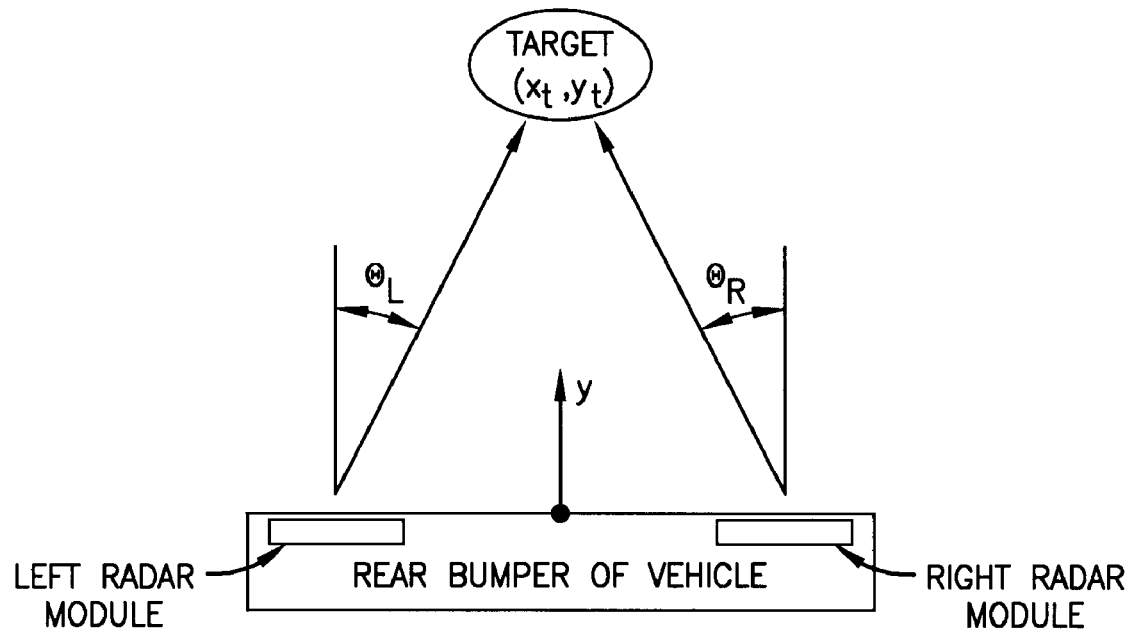
FIG. 8 is a schematic diagram showing target detection performed by the radar system of FIG. 7 using triangulation.

The target detection is performed by angle-of-arrival (AOA) and triangulation algorithms. As illustrated in FIG. 8, the left and right modules receive the scattered fields from a target at position $(x_t, y_t)$. The AOA algorithm is performed for each module individually, and returns angles $\theta_L$ and $\theta_R$, for the left and right modules, respectively. The triangulation algorithm extrapolates two rays originating at the center of each radar module along the target angle for each module and locates the intersection point. This intersection indicates the target's position. The algorithms use accurate phase information to process the incoming signal. To preserve this information, an I/Q mixing scheme was implemented. This mixing scheme uses two reference signals from the local oscillator (LO), with a 90° phase difference between them. The generation of these reference signals was accomplished by a quadrature-phase hybrid.

Radar Specifications

This exemplary system is a low-cost and conformal system that provides a low probability of false alarm. The ability to determine an object's location will aid in the reduction of false alarms.

Individual microwave circuit devices were developed for this example. However, it should be recognized that commercially available microwave components may be used and provide desired performance.

Another important specification is the overall dimension of the radar system. This exemplary system is to be attached to the rear bumper of a vehicle. In order to minimize installation problems, the system may have a low profile and conform to the shape of the vehicle. The overall board dimensions were set at 11 by 1.5 inches for this example. These dimensions were determined by studying the rear bumper configurations of many vehicles. This board size is small enough to fit onto many existing vehicles with minor alterations to the vehicle.

As stated earlier, a major technology advancement of the design is aimed at reducing the false alarms. The radar may distinguish between a target and random noise as well as stationary and moving targets. This system may accomplish this by using an Angle of Arrival (AOA) algorithm to detect targets. The AOA processing will look for targets based on phase information and use triangulation to determine the target's position. The profiles from a rough ground condition such as a gravel road or grassy terrain are expected to have a different appearance compared to an actual object above the ground. The rough ground will have a broad profile, effectively raising the noise floor of the AOA algorithm, while an actual target will appear as a sharp peak with a larger amplitude. This approach will reduce the number of false alarms caused by environmental features. The AOA technology will also allow the system to be able to track targets as they enter the coverage area.

A benefit of the system is the ability to detect a target at least 10 feet away. This range was determined by studying the reaction time of a human driver. The reaction time for a driver to an alarm or emergency situation is approximately 1.5 seconds based on a NTSB report, independent of vehicle speed. Using a top speed of 5 miles per hour, 10 feet is the minimum distance needed to notify the driver and safely stop the vehicle. The system may also see a target up to at least two feet beyond the sides of the vehicle. This is to ensure that a target entering the area behind the vehicle is detected before a dangerous situation is reached. Using these criteria, the coverage area becomes approximately a 5-by-10 foot rectangle behind the vehicle.

Radar System Description

Figure 9:
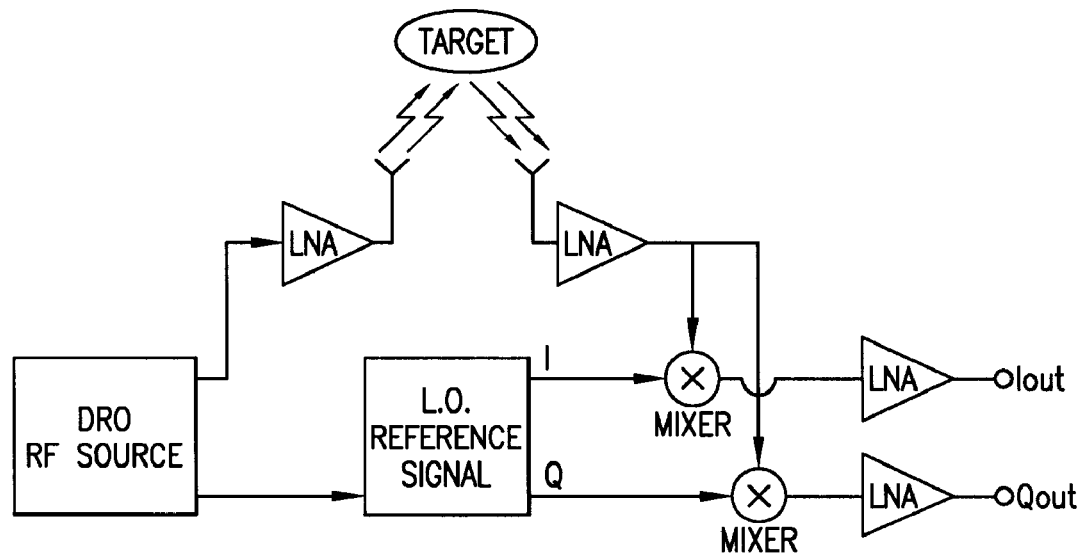
FIG. 9 is another block diagram of the system shown in FIG. 7.

This exemplary embodiment of the radar system is a bistatic radar that utilizes eight receive antennas and a single transmitting antenna to detect targets. FIG. 9 shows the basic block diagram of the system. The antennas for this radar were chosen to be patch antennas. Patch antennas are conformal, low-cost, and have a broad pattern in both the E and H planes. The design of the patch antenna will be discussed in full detail shortly.

The RF source is generated from a dielectric resonator oscillator (DRO) design at 10.525 GHz. DRO design is well known for its high-Q resonance that helps in providing a stable phase source. The generated RF signal is then divided equally into the transmitting signal for radiation and the LO signal for mixing. Because there are both I and Q channels, the LO signal is fed into a quadrature-phase hybrid that divides it into two equal-power LO signals with a 90° phase difference. Two single-end mixers are used to convert I- and Q-channel RF signals down to DC signals. The receiving RF signal and the LO signal are combined and fed through the mixer that was biased properly with RF-isolated DC biasing circuitry.

By using RF switches, the array can be scanned quickly to gather all the information from each channel while using a single mixer, gain stage, and A/D for the entire system. As an alternative, a parallel data collection scheme may be used. A low-capacitance PIN diode was used to vary the electrical length of a shunt open-circuited tuning stub to implement the switching functionality. Alternatively, commercially available X-ban switches may be used. The switch control is achieved by the timing/switch control circuitry discussed herein.

The DC gain stage amplifies the down-converted target signal and removes the DC bias voltage of the mixers. An automatic bias cancellation circuit was developed to automatically sense the DC bias level of the system and transform this level to the input of differential amplifiers in the gain stage. Differential amplifiers then amplify only the target signal and shift it to a proper DC level that is acceptable to the analog-to-digital (A/D) converter. A full description of the gain stage is given herein.

RF Transmitter

The RF source of the radar is provided by a dielectric resonator oscillator (DRO) design. DRO design is well known for its high Q value and stable phase, which facilitates coherent radar design. This DRO design uses an active FET with a feedback loop from DRAIN to GATE to generate an oscillation. The dielectric puck is placed in the feedback loop to serve as a high-Q bandpass filter and to increase the gain of the feedback loop. To generate stable oscillation, the loop gain may be greater than one, and the small-signal loop phase may be equal to integer multiples of 360°.

Figure 10:
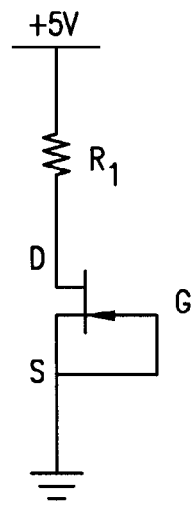
FIG. 10 is a diagram of the DC bias of the FET in an exemplary embodiment of a DRO circuit.

First, a proper DC biasing scheme is used to bias the FET into the pinch-off region as shown in FIG. 10. The DC biasing circuit is isolated from the RF by a quarter wavelength RF choke and capacitor. The FET used in this exemplary design is the NEC3210S01 GAsFET. The source and gate pins are grounded to set the voltage across the gate and source $V_{GS}$ equal to zero. This biasing scheme sets IDS equal to the saturation current $I_{DSS}$. The typical $I_{DSS}$ value recommended for the NEC3210S01 is 40 mA. In this example, the transistor is biased by R1, a 44Ω (or 68Ω) resistor. This biasing resistor establishes a $V_{DS}$ of 3V and a biasing current of 45 mA.

There may be four criteria for choosing a FET for use as a feedback oscillator. The voltage and current range for the FET should be able to provide the required output power. In this example, the maximum power output by a FET is given by the −1 dB compression point. The higher this value, the more output power the FET can handle. To maintain maximum phase stability for the oscillator circuit, the maximum transit frequency may be twice the operational frequency. For oscillations to occur, the loop gain of the oscillator circuit may be greater than one. In a common source configuration, the loop gain is the product of the $S_{21}$ and the transmission coefficient of the coupling network (i.e., DRO and coupling stubs). This implies that a FET with a larger $S_{21}$ may be easier to establish the resonance. In order to achieve the loop phase requirements for oscillation, a FET with a small $S_{21}$ phase may be chosen to keep the length of the transmission lines (GATE and DRAIN) as short as possible. The total phase of the oscillator circuit includes the phase of $S_{21}$, phase delay through the coupling stubs at the coupling points, and the phase delay through the resonator (DR).

A dielectric resonator (DR) was chosen as the feedback element in this exemplary design. Dielectric resonators are small cylindrical shaped pieces of ceramic with a high permittivity. Today, they may be preferred over resonant cavities as feedback elements in microwave circuits due to their higher Q value. Unlike metallic resonant cavities, DRs are smaller, have higher temperature stability, and are easy to use. The frequency of dielectric resonators can be controlled by physical geometry and can be tuned by varying the bias voltage or by perturbing the fields using a tuning screw or a tuning stub near the puck.

The RF source uses a dielectric resonator oscillation (DRO) design. The frequency tuning may be zero biased, i.e., grounded. A capacitor provides an isolation for the DC bias of the FET. The output of the FET, i.e., Drain, is filtered by a bandpass filter and then fed into a Wilkinson Power divider in this example.

Wilkinson Power Divider/Combiner/Isolator

Figure 11:
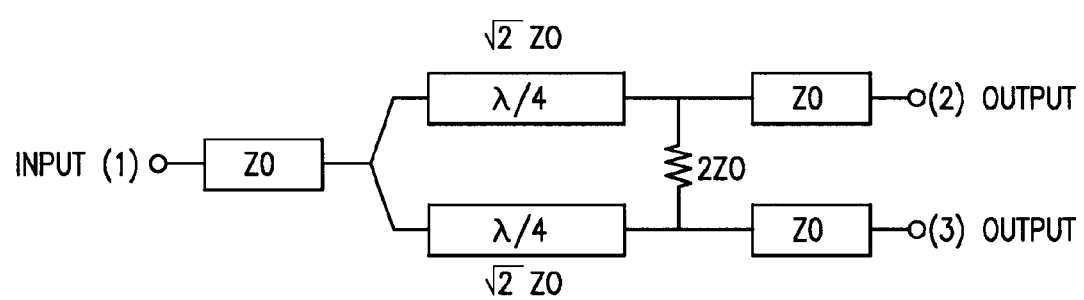
FIG. 11 is a diagram of an exemplary embodiment of a Wilkinson power divider/combiner.
Figure 12:
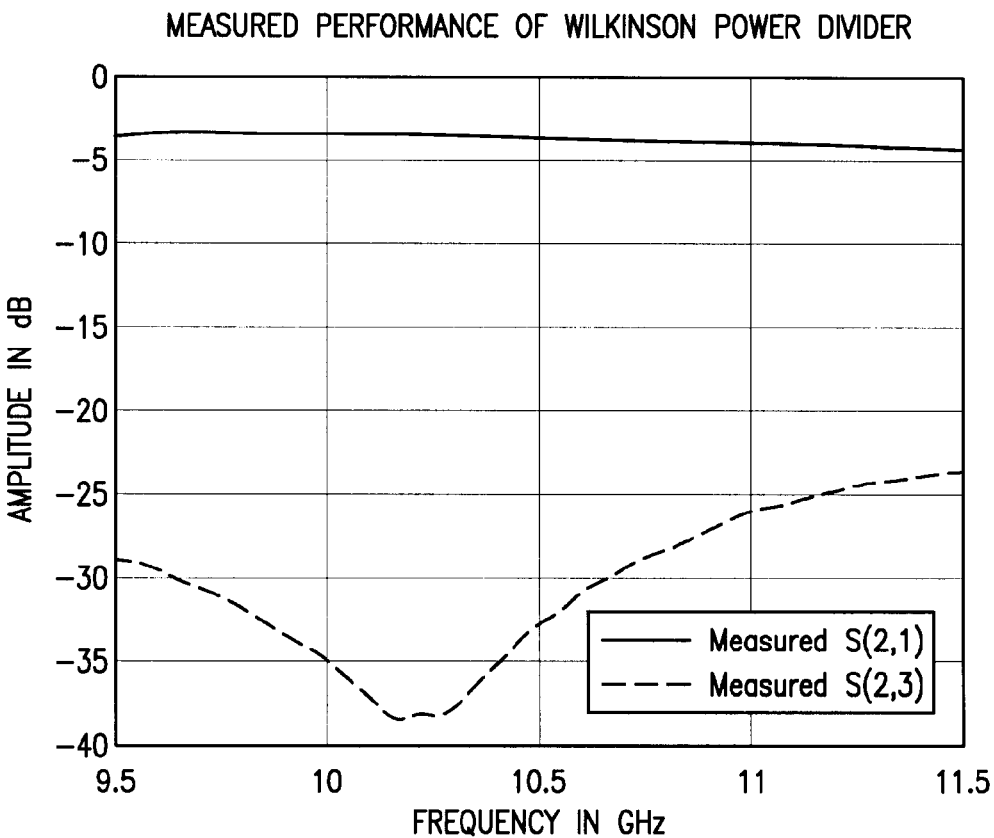
FIG. 12 is a graph of the measured transmission and isolation characteristics of the power divider design shown in FIG. 11.

A Wilkinson power divider as shown in FIG. 11 was chosen for this example. This type of power divider is a three-port network that can be made to have all ports matched with good isolation between the output ports. The Wilkinson power divider has two arms, each of a quarter wavelength long. The impedance in each arm is $\sqrt{Z_0}$, where $Z_0$ is the characteristic impedance of the input and output transmission lines. A resistor of $2Z_0$ is used to dissipate any reflected energy. This resistor also helps to provide isolation between the output ports. The measured amplitude plots of the transmission, $S_{21}$, and isolation, $S_{23}$, coefficients are shown in FIG. 12. As predicted, the transmitted power at each output port is approximately −3.6 dB, and the isolation between the two output ports is approximately −32 dB. This isolation property is useful for isolating LO and RF signals as well as for isolating between receiving channels.

Transmitter RF Gain Stage

Figure 13:
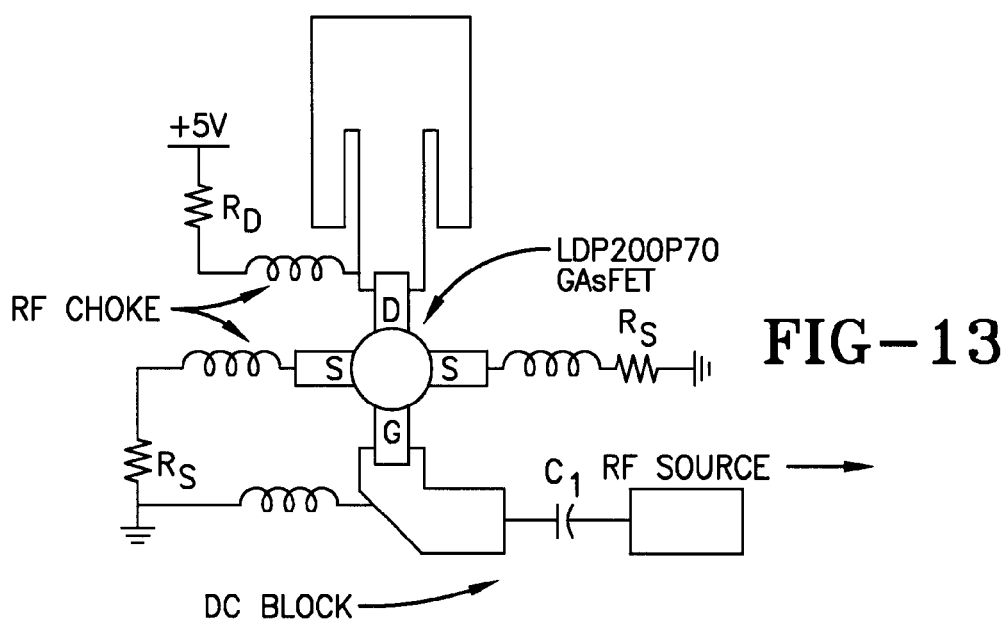
FIG. 13 is a diagram of an exemplary embodiment of the RF gain stage at the transmitting antenna side.

In order to increase the radiation power for improved sensitivity and to compensate the power loss of the combiners in the receiving array, a RF gain stage is added to the input port of the transmitting patch antenna as shown in FIG. 13. A low noise, wide band FET (e.g., Filtronic LPD200P70) is used to amplify the RF power by approximate 8-10 dB. The FET is biased by $R_D$ to establish an $I_D$ current of 30 mA. Two parallel 33Ω resistors are connected from the two source terminals to the ground. The gate voltage ($V_G$) is tied to ground, thus establishing a gate to source voltage ($V_{GS}$) of approximately −0.5V. A capacitor isolates the DC bias of the FET from the rest of circuits. On the PCB layout, ground holes are added around the transmitting antenna to reduce the coupling to the neighboring receiving antennas.

Transmitting/Receiving Patch Antenna

Figure 14:
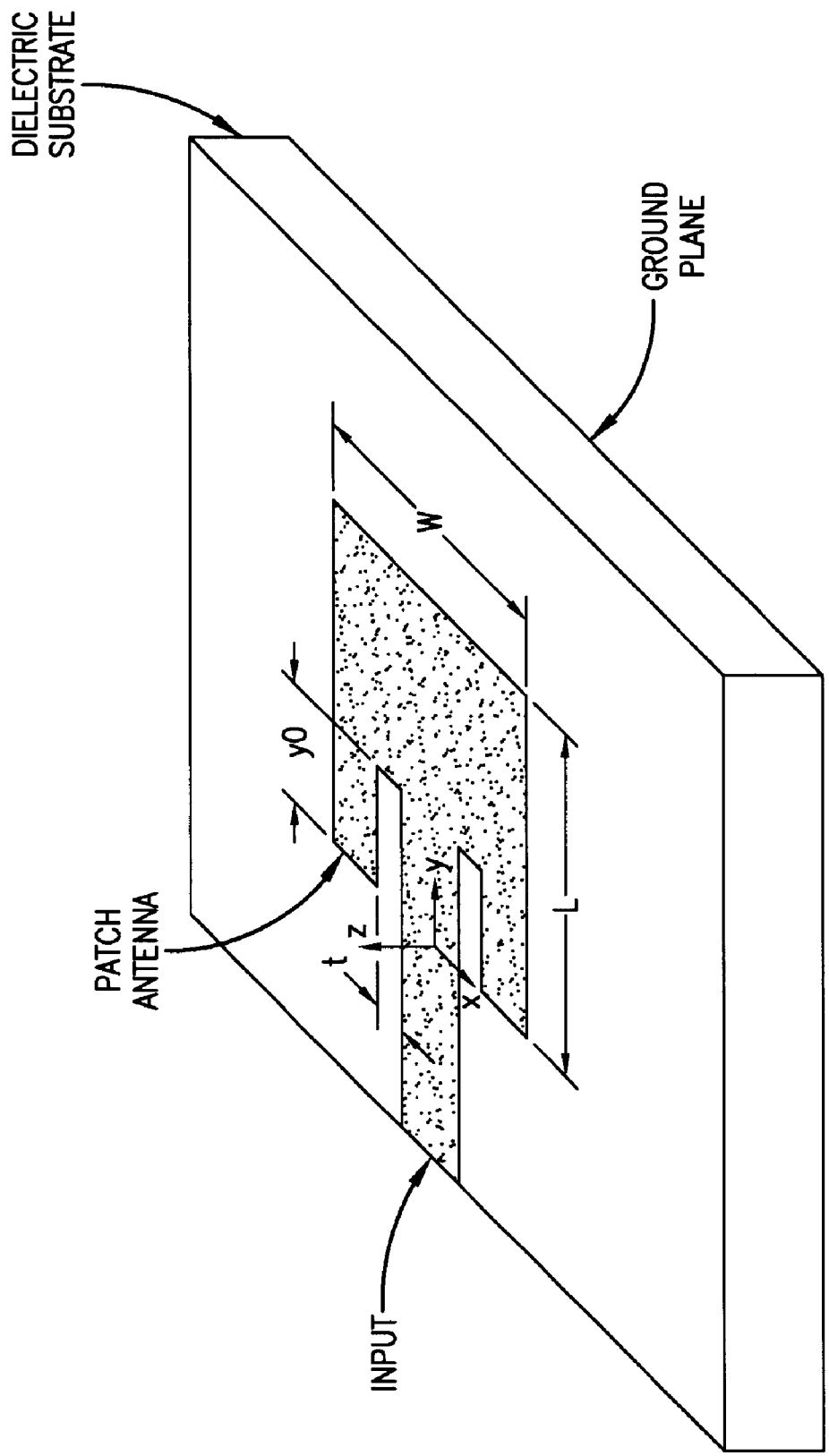
FIG. 14 is a diagram of an exemplary embodiment of patch antenna geometry.

When choosing an antenna for this example, very specific design criteria were established. The antenna should preferably be low cost, highly conformal, robust, and have a fairly broad pattern to provide the most coverage possible for this example. After considering these design parameters, the microstrip (or patch) antenna was selected. As shown in FIG. 14, the antenna is a rectangular patch located above a ground plane with a low-loss dielectric substrate in between. Radiation patterns of this type of antenna are broad in both the E and H planes, with a main beam normal to the ground plane. The design was analyzed based on a transmission line model of a patch antenna. This model is based on the radiation mechanism of the patch antenna. The radiation from patch antennas is caused by the fringe fields along the edges of the patch and the ground plane. The field distribution is usually uniform along the width and varies along the patch length. Thus, the transmission line model replaces the patch antenna with two radiating slots separated by a low-impedance transmission line of length L. Some design parameters associated with a rectangular patch antenna are discussed below.

The length of the antenna determines the resonant frequency. A good first approximation is roughly $\lambda_d/2$, where $\lambda_d$ is the wavelength in the dielectric substrate. The actual length may be slightly less than this length because the fringe fields effectively make the antenna longer. Most of the antenna's fields lie directly below the patch in the substrate. However, there are fields that exist in the air and the substrate beyond the edges of the patch. These fields create an effective dielectric constant for the material. When designing, it is this effective dielectric constant that determines the actual length of the patch. The patch antenna equations are given below. The effective dielectric constant is given in equation 3.1.

$$\epsilon_{reff} = \frac{\epsilon_r + 1}{2} + \frac{\epsilon_r - 1}{2}\left[1 + 12\frac{h}{W}\right]^{-\frac{1}{2}} \quad (3.1)$$

$$\frac{\Delta L}{h} = 0.412\frac{(\epsilon_{reff} + 0.3)\left(\frac{W}{h} + 0.264\right)}{(\epsilon_{reff} - 0.258)\left(\frac{W}{h} + 0.8\right)} \quad (3.2)$$

$$L = \frac{1}{2f_r\sqrt{\epsilon_{reff}}\sqrt{\mu_0\epsilon_0}} - 2\Delta L \quad (3.3)$$

The fringing fields will add an additional length to the antenna. This additional length, $\Delta L$, is given in equation 3.2 and is directly affected by the effective dielectric constant, $\epsilon_{reff}$ and W/h terms, where h is the dielectric thickness. Equation 3.2 shows that fringe fields are more concentrated under the patch for a substrate with a higher dielectric constant or for a thinner substrate. A more rigorous estimate of the physical length is given by equation 3.3. This equation accounts for the effect of the effective dielectric constant and the fringe fields.

The width of the antenna is related to the radiation efficiency. A good practical width that leads to good radiation efficiency is given by $$W = \frac{\lambda_r/2}{\sqrt{\epsilon_{reff}}} \quad (3.4)$$

$$= \frac{v_0}{2f_r}\sqrt{\frac{2}{\epsilon_r + 1}}$$

where
$\lambda_r$=Free Space Wavelength at Resonant Frequency
$\epsilon_r$=Dielectric Permittivity
$v_0$=Free Space Velocity of Light
$f_r$=Resonant Frequency of the Patch
$\epsilon_{reff}$=First Term Approximation of the Effective Dielectric Constant given in Equation 3.1

This equation shows that the width is related to the effective velocity of the EM wave propagating through a dielectric with permittivity $\epsilon_{reff}$. Other widths can be chosen; however, antennas with widths smaller than W have lower efficiency. Antennas with widths larger than W may have higher efficiency, but higher order modes may result and distort the radiation pattern.

A microstrip line or a coaxial cable are two feeding techniques for microstrip antennas. Here, the patch antenna is fed by a microstrip line. In order to provide the maximum power transfer, the input impedance of the microstrip line and patch antenna must be matched. Using the transmission line model discussed earlier, each radiating slot can be modeled as an equivalent admittance. At resonance, the input admittance becomes purely real. It can be shown that as the microstrip-line is moved into the patch, the input resistance decreases monotonically and reaches zero at the center. To minimize the coupling between the feed transmission line and the patch, a gap with width t is introduced. The size of the gap can be varied, but for most applications, a gap width of h may be used, where h is the thickness of the substrate. The distance $y_0$ needed to move into the patch antenna to match to a 50-ohm feed line is given by:

$$R_{in}(y = y_0) = R_{in}(y = 0)\cos^2\left(\frac{\pi}{L}y_0\right) \quad (3.5)$$

$$y_0 = \frac{L}{\pi}\arccos\left(\sqrt{\frac{50\,\Omega}{R_{in}(y = 0)}}\right) \quad (3.6)$$

Figure 15:
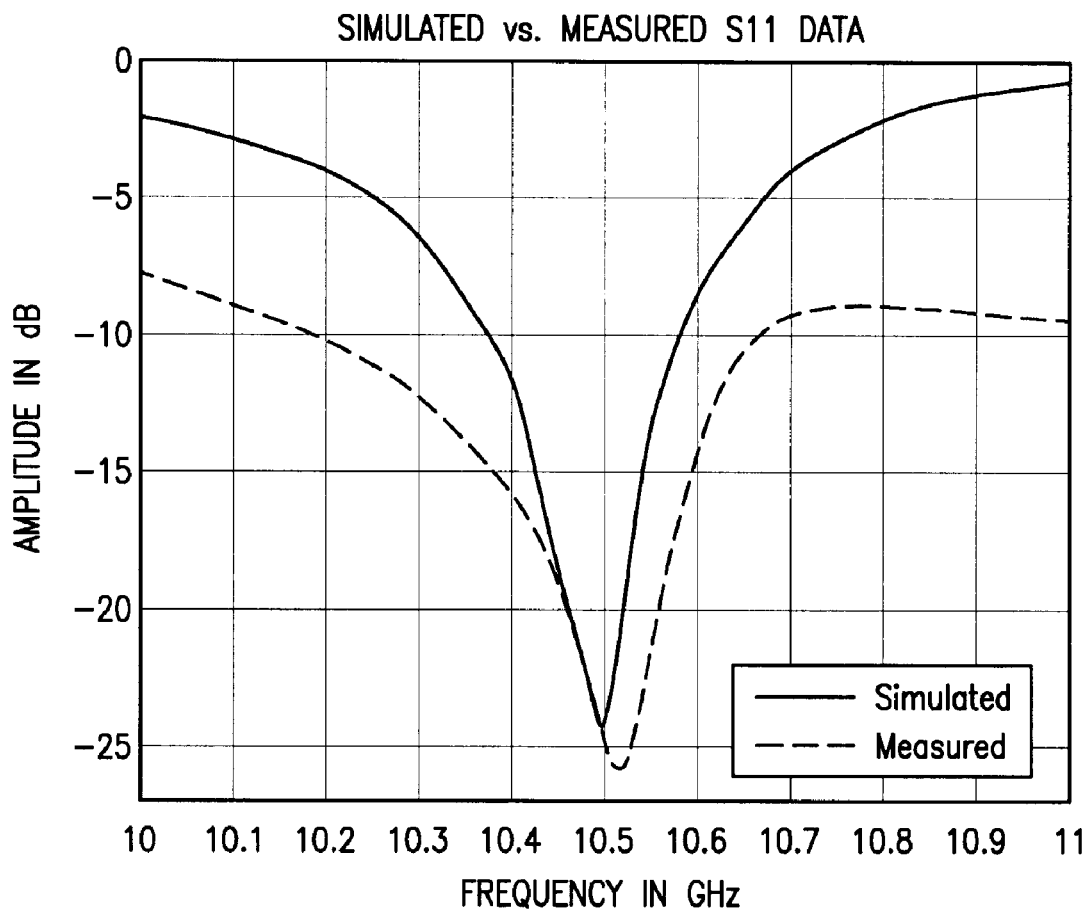
FIG. 15 is a graph of an example of the measured and simulated reflection coefficient.

FIG. 15 plots the measured and simulated reflection coefficient with respect to 50 ohms. A lower reflection coefficient indicates better impedance matching, and more energy is radiated.

Figures 16A, 16B:
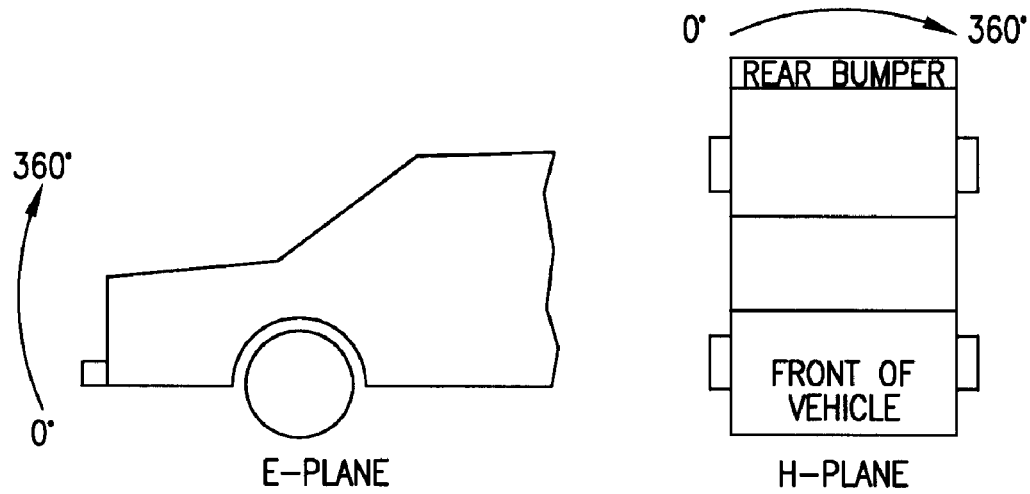
FIG. 16($a$ & $b$) is a diagram of an exemplary embodiment of the radiation pattern definition.
Figure 17B:
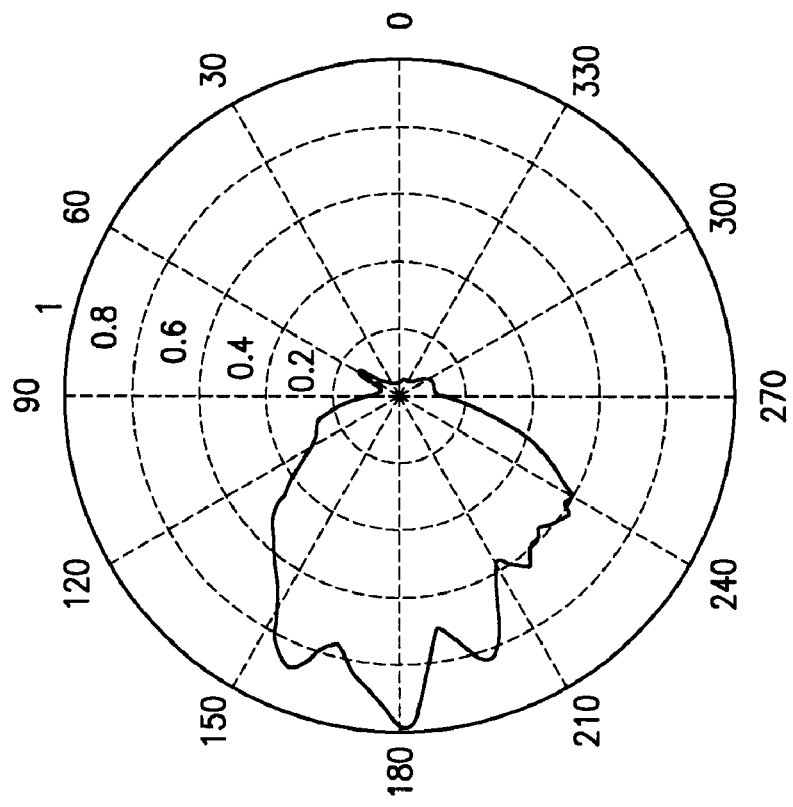
FIG. 17($a$) is a graph of an example of the polar plot compact range measurements—E-plane.
Figure 17A:
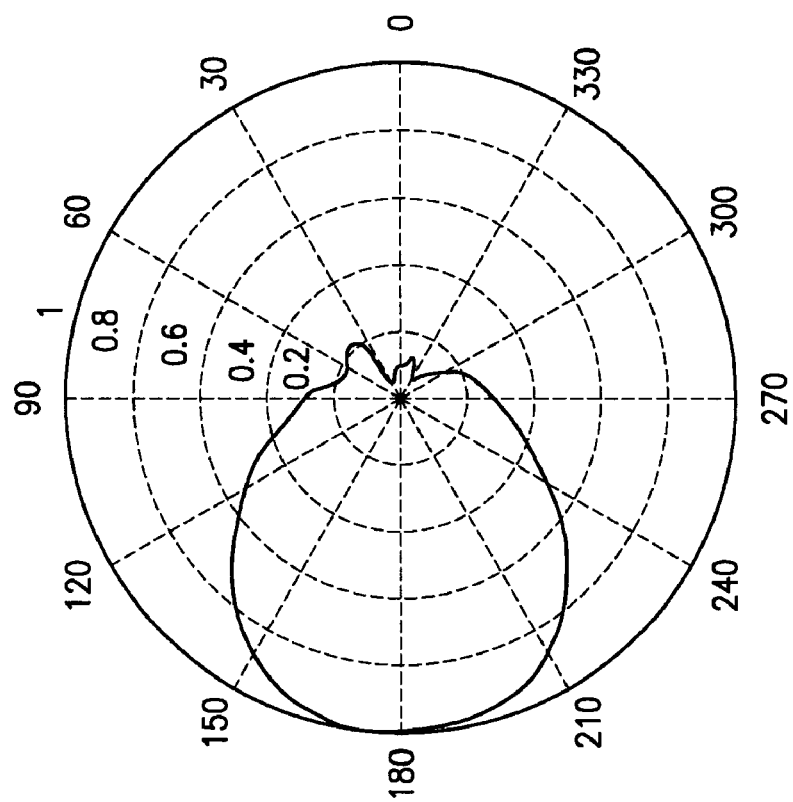

After the preliminary antenna design was completed, the design was analyzed by using a Moment of Method numerical simulation in Agilent's Advance Design System (ADS) simulation program. The pattern obtained from simulation showed a very broad and even pattern in both the E and H planes. The actual patterns were also measured in the compact range as shown in FIGS. 17(a) and 17(b). The definitions of E-plane and H-plane with respect to the vehicle are shown in FIGS. 16(a) and 16(b). The −6 dB coverage angle of the radar system is approximately 120° in both planes. The variation in the magnitude of H-plane pattern is due to the feeding transmission line.

Microstrip antennas usually radiate a linearly polarized signal. The polarization of an antenna is defined by the direction of the electric field vector as the transmitted wave propagates through space. Thus, for a linearly polarized antenna, the radiated electric field vector will lie in a plane defined by the electric field vector and the propagation direction. For microstrip antennas using a microstrip feed line, the polarization vector will lie along the length dimension of the patch. The main concern in choosing antenna polarizations is the effect of coupling between antennas.

Figure 18:
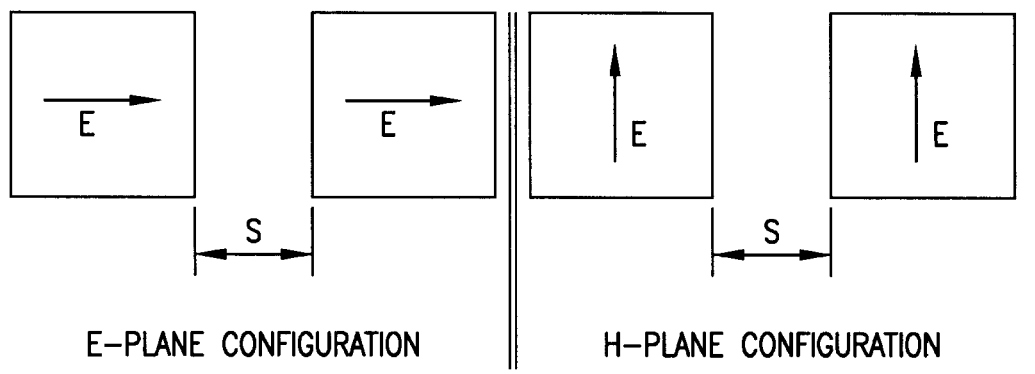
FIG. 18 is a diagram of an example of the horizontal and vertical array configurations.
Figure 19:
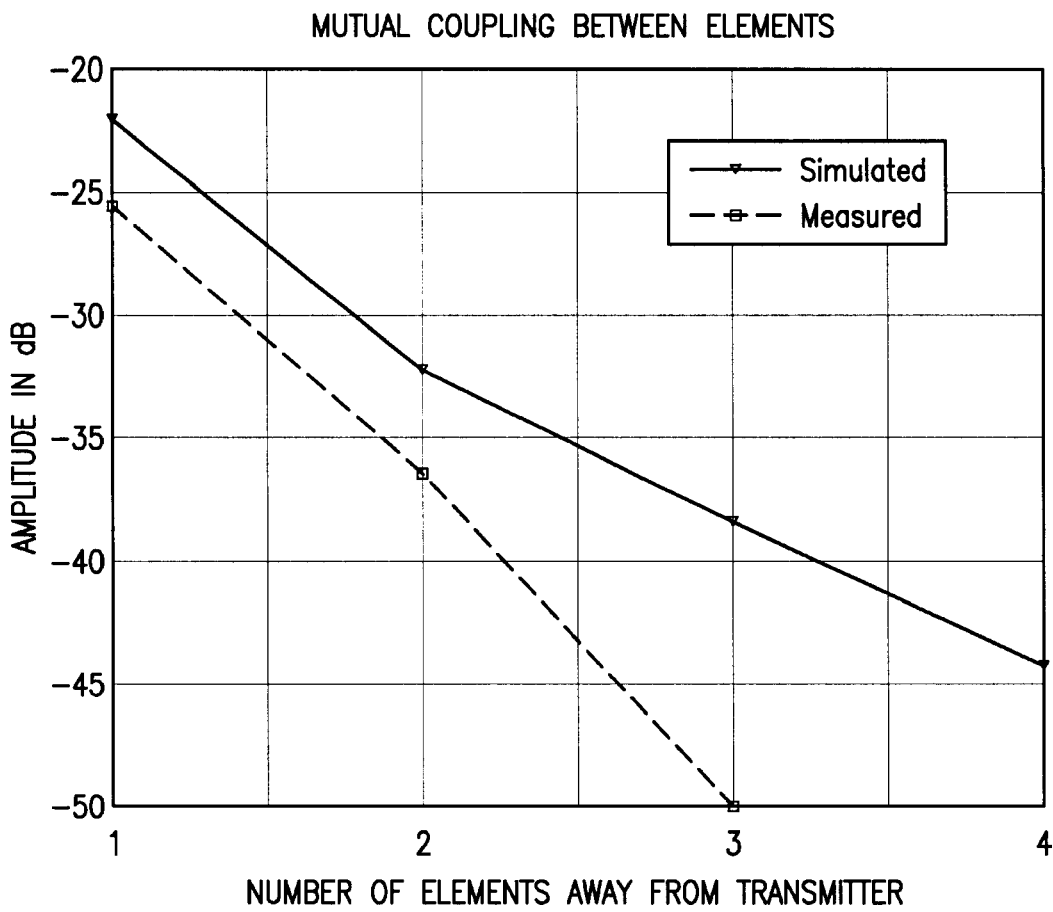
FIG. 19 is a graph of an example of the measured and simulated mutual coupling amplitude in the H-plane configuration.

Coupling between microstrip antennas is largely influenced by the spacing of elements and the polarization of the antenna. The coupling affect is caused by two components, a space wave and a surface wave existing within the dielectric substrate. Two polarization configurations were considered for this example. FIG. 18 illustrates the two array configurations considered. The first design utilized E-plane configuration for the antenna array. Although this configuration requires smaller board width, it was observed through simulation that the mutual coupling between elements was higher for this configuration. For the E-plane configuration, the coupling terms are dominated by the surface wave component along the dielectric substrate. As the spacing between elements is increased, the coupling remains fairly constant and undesirable. By changing the array design to a H-plane configuration, the coupling mechanism becomes the space wave, and the strength of the coupling drops off quickly as the array spacing increases. An example of simulated and measured mutual coupling for the H-plane configuration with an antenna spacing of 0.750 inches is shown in FIG. 19. It can be seen that the coupling from the space wave term drops off quickly as the distance between elements is increased.

RF Receiver

Figure 20:
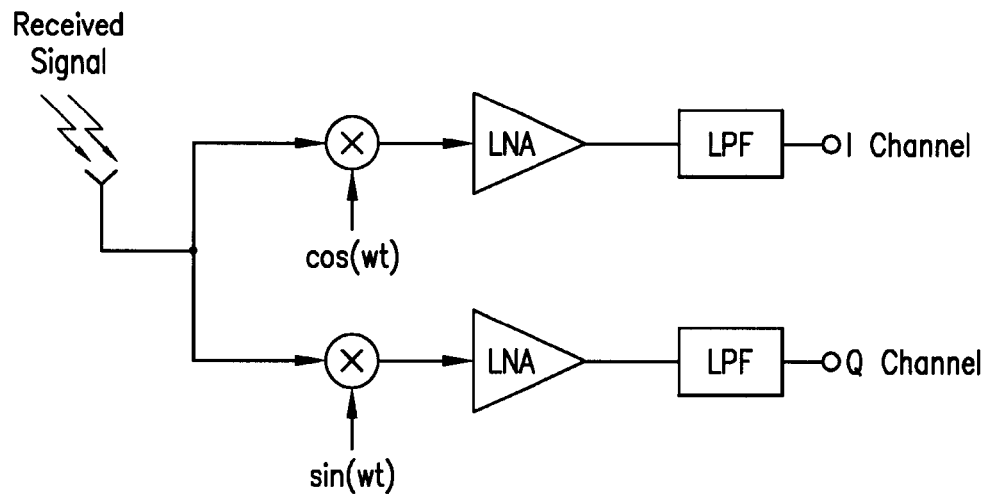
FIG. 20 is a diagram of an exemplary embodiment of the RF receiver.

A diagram of the RF receiver of this example is shown in FIG. 20.

Receiving Array

A parallel architecture was selected for the receiving array. Wilkinson power combiners are used to combine the receive channels while providing additional isolation among channels. The tradeoff of using the power combiners is that the signal is reduced by 3 dB after each combiner. Another tradeoff of using this parallel scheme is the larger board size to accommodate all of the power combiners. This added approximately 0.5 inches to the overall board height. Each channel has exactly the same transmission line configuration from the receiving patch antenna to the mixer. This eliminates the need for complicated channel calibration.

RF Switch Design

In order to obtain accurate phase information for AOA processing, the radar system is preferably able to see the target area as a stationary object. If the target position changes from the beginning to the end of an array scan, the information received at each channel would have changed. One exemplary system of the present invention may have all receive antennas on at the same time, each with its own A/D chip. A control signal may trigger all of the A/Ds to sample at the same time. This ensures that all antennas see the same target scene. However, the tradeoffs for this approach are cost and complexity. Each element would use its own I/Q mixer, gain stage, and A/D chip, thus raising the cost of the system significantly. The PCB layout would become very complex in order to accommodate the LO, receive, and output signals for each element. Due to the cost and size limitations set in the specifications of the radar, this approach was not implemented for this example. A serial switching approach was implemented instead. This approach uses a control signal to rapidly switch through the array enabling only one antenna at a time. This allows the use of a single mixer, gain stage, and A/D chip for the entire system, thus reducing cost. The complexity is also decreased, since the same circuitry can be reused for each antenna. The main tradeoff for this design is speed. In an exemplary embodiment, the system should preferably be able to switch fast enough to finish a whole array scan before the vehicle's movement causes phase errors.

Each RF switch is characterized by its insertion loss and isolation. Insertion loss is the amount of energy that is lost when the switch is turned on. This loss can come from impedance mismatches, heat loss, or other various factors. Isolation is the amount of signal that leaks through when the switch is turned off. An ideal switch may have zero insertion loss and infinite isolation. Good practical switches may have an insertion loss of less than 1 dB and isolation better than −40 dB. At X-band frequencies, this performance may come at a great price. In order to meet the cost restrictions for this example, a different switch was used.

Figure 21:
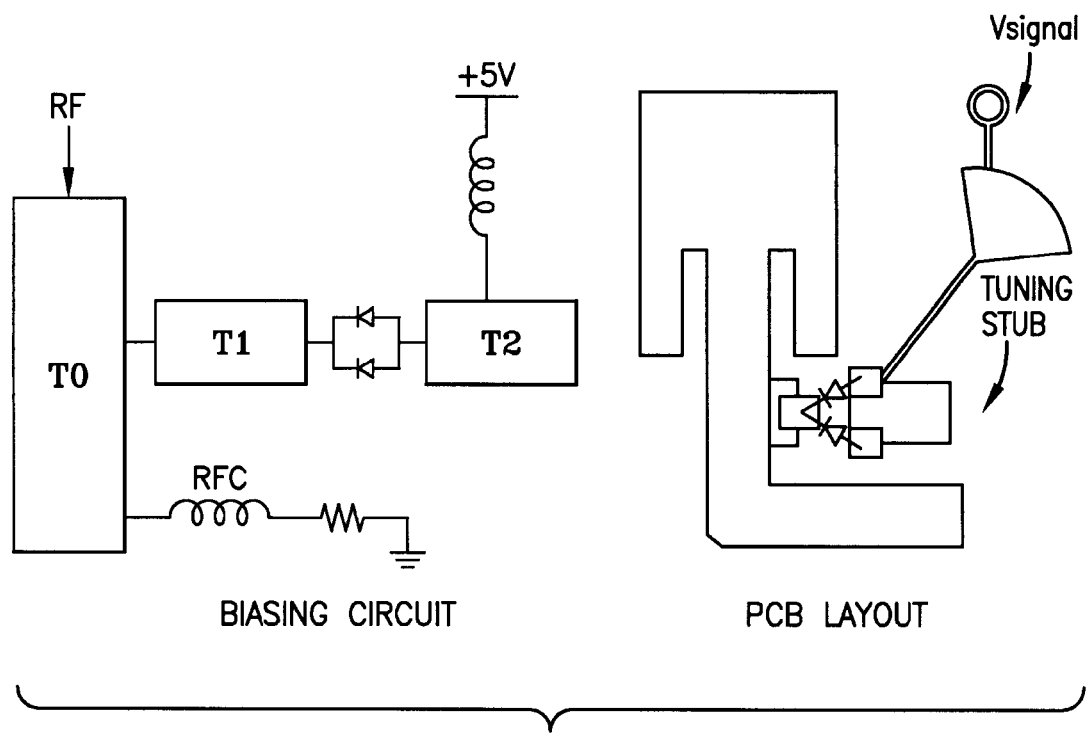
FIG. 21 is a diagram of an exemplary embodiment of the RF switch implemented with a tuning stub that appears either as a short or open to the main line.
Figure 22:
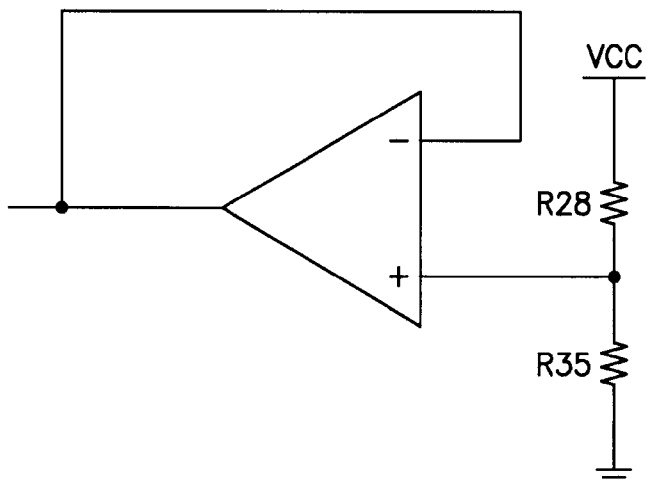
FIG. 22 is a diagram of an exemplary embodiment of the reverse bias voltage source.
Figure 23:
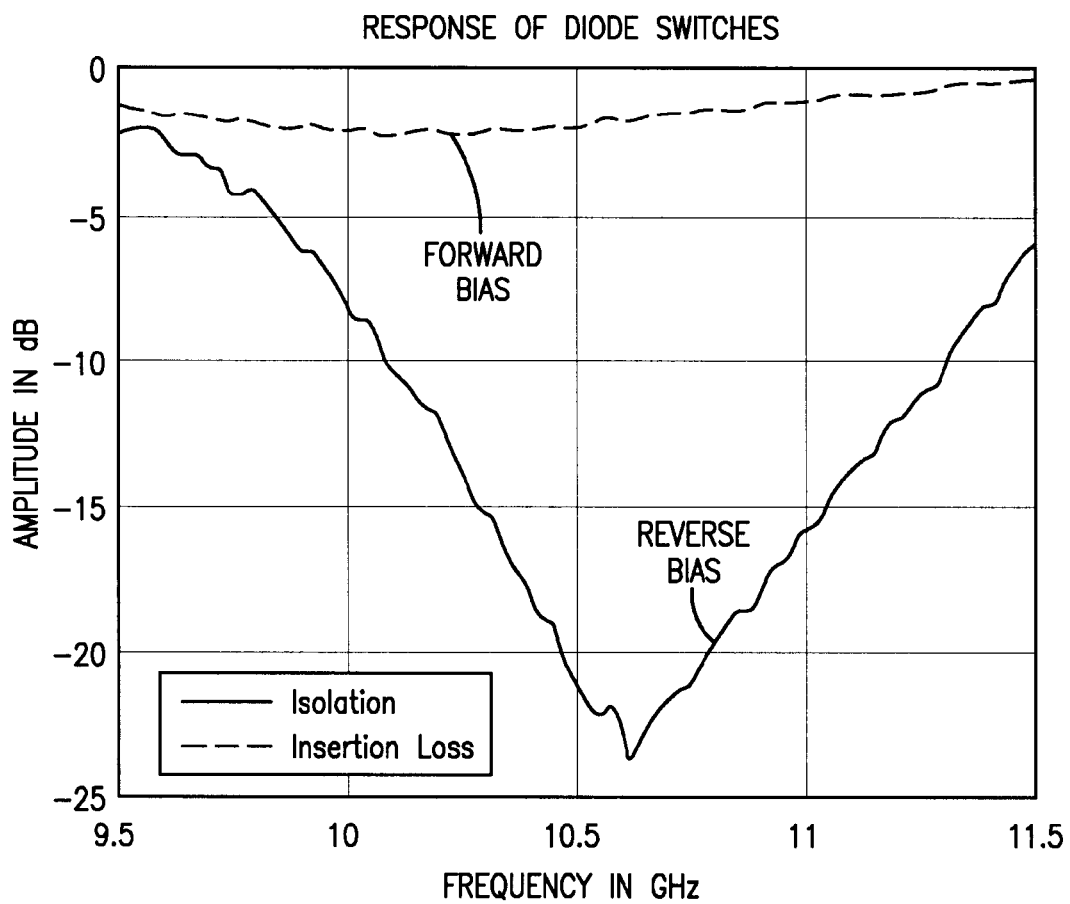
FIG. 23 is a graph of an example of the measured insertion loss and isolation of the RF switch design.

The switches for this radar are implemented using low-cost, low-capacitance, PIN diodes by METELICS PIN (SMPN7320-SOT23-4CC). The PIN diode is actually used as a varactor whose capacitance value is different between the forward and reverse biased conditions. This difference in capacitance affects phase delay as the RF signal propagates through the diode. This varies the effective electrical length of the microstrip stub containing T1 and T2 in FIG. 21. The length of T1 and T2 are designed carefully such that the impedance looking into the stub from the main line appears as an open circuit, i.e., ∞ when the diode is forward biased. This allows the RF signal to propagate along the main line. When the diode is reverse biased, the input impedance becomes zero. This cuts the RF propagation along the main line. In reality, the impedance is not completely like an ideal open and results in some insertion loss due to the presence of the stub junction. It is also not completely like an ideal short circuit and cause some leakage, i.e., poorer isolation. Like all other RF layout design, the geometry of the stub highly depends on the dielectric constant of the PCB material. The DC bias is supplied from the RF choke (fan structure). A constant 3.8 volt is supplied to the reverse side of the diode to reverse bias the PIN diode when the switch control is zero volt. This voltage also allows a forward bias current of approximately 10 mA through the PIN diode (5 mA each) when the switch control is 5 volts. The dual-diode configuration was found to be more stable compared to a single diode configuration. FIG. 23 plots the measured insertion loss and the isolation for the forward and reverse bias conditions, respectively. In the desired operational frequency, a 23-dB isolation and 2-dB insertion loss are observed in this example.

IQ Mixers

The mixer's function is to convert the incoming microwave signal down to a lower frequency signal where it can be amplified or processed more efficiently. A mixer is fundamentally a square-law detector. When properly biased, its output current is proportional to approximately the square of the voltage across the mixer diode.

Consider the nonlinear I/V characteristic of a mixing diode shown as an approximate power series as given by:

$$I_0 = kV^2 \quad (3.7)$$
$$= k(V_{LO} \pm V_{RF})^2$$
$$= k(V_{LO}^2 + V_{RF}^2) + 2kV_{LO}V_{RF}$$

where $$V_{LO} = a\,\cos(\omega_{LO} t + \Phi_S)$$
$$V_{RF} = b\,\cos(\omega_{RF} t + \Phi_S - \Psi)$$
$$= b\,\cos\left(\omega_{RF}\left(t - \frac{2R}{c}\right) + \Phi_S\right)$$

$\Phi_S$ = Phase of Source Signal $\Psi$ = Target Delay = $\omega_{RF} \dfrac{2R}{c}$ $R$ = Distance to Target $c$ = Speed of Light, and $V$ = Voltage across the diode As a result of the mixing process, the sum and difference frequency terms are produced along with harmonics of the original RF and LO signals, $2\omega_{RF}$ and $2\omega_{LO}$ respectively, as given by $$kV_{LO}^2 = k[a\cos(\omega_{LO} t + \Phi_S)]^2 \quad (3.8)$$
$$= ka^2\cos^2(\omega_{LO} t + \Phi_S)$$
$$= ka^2\left[\frac{1}{2}\cos(2\omega_{LO} t + 2\Phi_S) + 1\right]$$

and $$kV_{RF}^2 = k[b\cos(\omega_{RF} t + \Phi_S - \Psi)]^2 \quad (3.9)$$
$$= kb^2\cos^2(\omega_{RF} t + \Phi_S - \Psi)$$
$$= kb^2\left[\frac{1}{2}\cos(2\omega_{RF} t + 2\Phi_S - \Psi) + 1\right]$$

-continued $$2kV_{LO}V_{RF} = 2kabcos(\omega_{LO}t + \Phi_S)cos(\omega_{RF}t + \Phi_S - \Psi) \quad (3.10)$$
$$= kabcos(\omega_{LO}t - \omega_{RF}t + \Psi) +$$
$$kabcos(\omega_{LO}t + \omega_{RF}t + 2\Phi_S - \Psi).$$

The higher frequency components, $\omega_{LO}+\omega_{RF}$, are filtered out via RF choke design. Since $\omega_{LO}=\omega_{RF}$, the difference term becomes a DC voltage level, which is obtained using $$I_0 = kabcos(\omega_{LO}t - \omega_{RF}t + \Psi) \quad (3.11)$$
$$= kabcos(\Psi)$$
$$= kabcos\left(-\omega_{RF}\frac{2R}{c}\right).$$

Equation 3.12 shows that the current through the mixer diode is related to the target's position. Accounting for the Doppler shift seen as the target moves, one finds that $$I_0 = kabcos\left(-\omega_{RF}\frac{2R(t)}{c}\right) \quad (3.12)$$
$$= kabcos\left(\frac{-2\omega_{RF}}{c}\frac{dR}{dt}\right).$$

The above mixing scheme is referred to as "zero-IF" and is also known as a homodyne receiver. This type of receiver converts the receive RF signal directly to the baseband (DC). The LO and RF signals are combined and pumped into the mixing diode to generate a baseband signal that is retrieved via an RF choke.

Examples of the mixer diodes are Low Barrier X-band Schottky diodes MA4E2054-1141 by M/A-COM for Q and I channel, respectively. From the top, the received RF signal is equally divided into two RF signals for I- and Q-channel mixing. From the bottom, the two 0°-90° LO signals are combined with RF signals separately and pumped into the mixer diodes. A quarter-wavelength transformer is used to transform the 100-ohm transmission line into the 50-ohm lines in the mixing circuits. The RF signal at each side is terminated with a 50-ohm transmission line and a 50-ohm load to the ground. Capacitors isolate the DC bias for the mixer diodes from the rest of RF circuits. Resistors terminate the RF lines. The mixed DC signals are pulled out from the outputs of the diodes via a RF choke (fan-shaped objects). These DC signals are then fed into the first gain stage shown in FIG. 24. Resistors are used for the splitter/combiner to ensure a good isolation between the I and Q channels as well as between the LO and RF signals.

Figure 24:
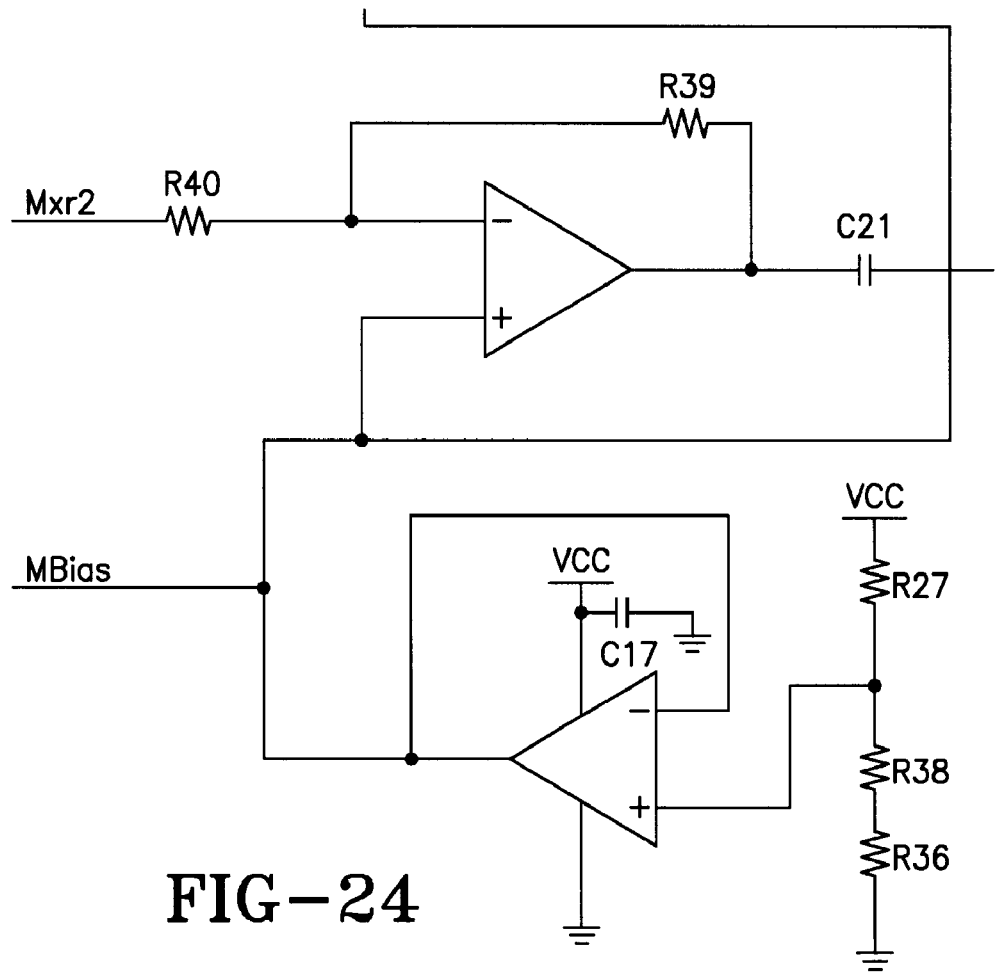
FIG. 24 is a diagram of an exemplary embodiment of the mixer biasing circuit and first gain stage.

FIG. 24 shows the biasing circuit for the mixer diodes and the first gain stage of one of the IQ channels. The $V_{cc}$ (+5 volts) is divided down to approximately 0.74V by the R27 and R36 and R38 resistors. This DC bias comes in from the top of the RF splitter as seen by top RF-choke fan at the top of FIG. 24. The DC amplifier serves as a buffer to provide enough biasing currents. The first gain stage provides differential gain of 10 for the voltage drop across the mixer diode. This voltage drop is determined by the rectified current as a result of pumping LO+RF through the diode. The "+" input terminal of U16 is connected to the same bias voltage as the diode. The value of resistor R40 serves as the load resistor of the mixer diode and controls the bias current. The typical voltage level at the left of R40 is around 0.68V in this example. The output of the first gain stage is connected to AC-coupled capacitors, C21 & C22, before the second gain stage. Notice that the "+" terminal of these capacitors is on the second gain-stage side. The output DC voltages associated with the bias are approximately 0.68V in this example, which is much greater than the measured target signal. Such a DC bias can cause saturation to the following gain stages and therefore is isolated from the subsequent gain stages. This is achieved by a capacitor. During the switching, different receiving channels have slightly different DC levels due to transmitter-to-receiver coupling, presence of target signal, and minor characteristic variation in the switching diodes. This may cause the RF related DC signals to appear like a staircase type of AC signal that can pass through the capacitors C21 and C22 and leave the bias DC behind.

Figure 25:
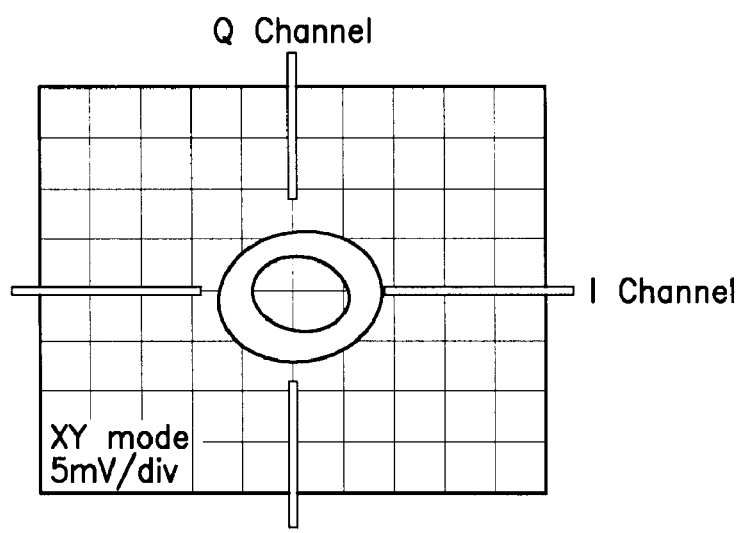
FIG. 25 is a diagram of an example of the screen shot of the IQ output when two RF sources with 1 MHz frequency separation are pumped into the mixer diode.
Figure 26:
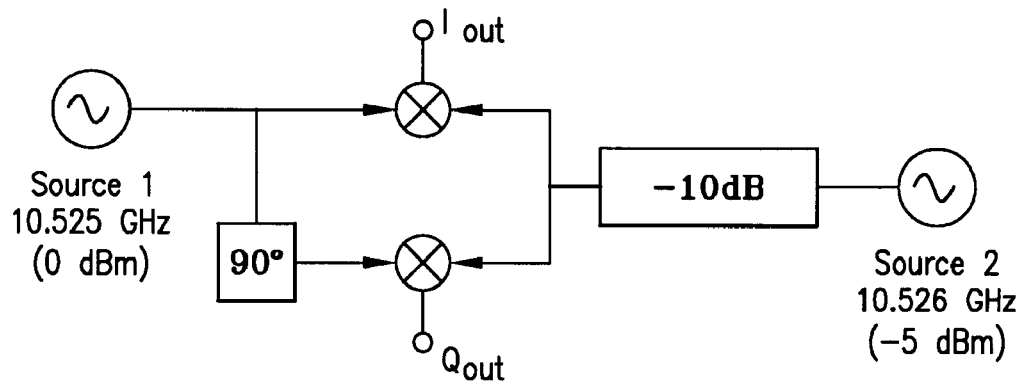
FIG. 26 is a diagram of an exemplary embodiment of the measurement setup for testing the IQ mixing design.

FIG. 25 shows a screen shot of the measured IQ output in X-Y mode. Two separate stable RF sources that have a 1 MHz difference in frequency are pumped into the mixer diode as shown in FIG. 26. It clearly shows that the amplitude and phase balance is very close to an ideal case in this example, a circle. This indicates that the IQ mixing circuit design is functioning properly.

Quadrature Phase 0°-90° LO Generation

Figure 27:
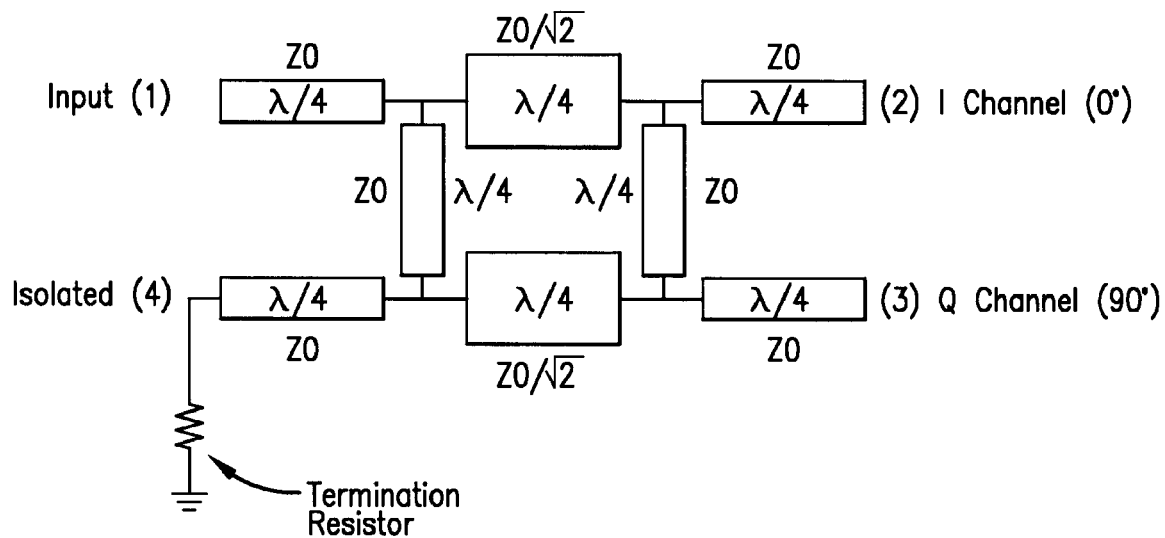
FIG. 27 is a diagram of an exemplary embodiment of the standard quadrature-phase hybrid design.
Figure 28:
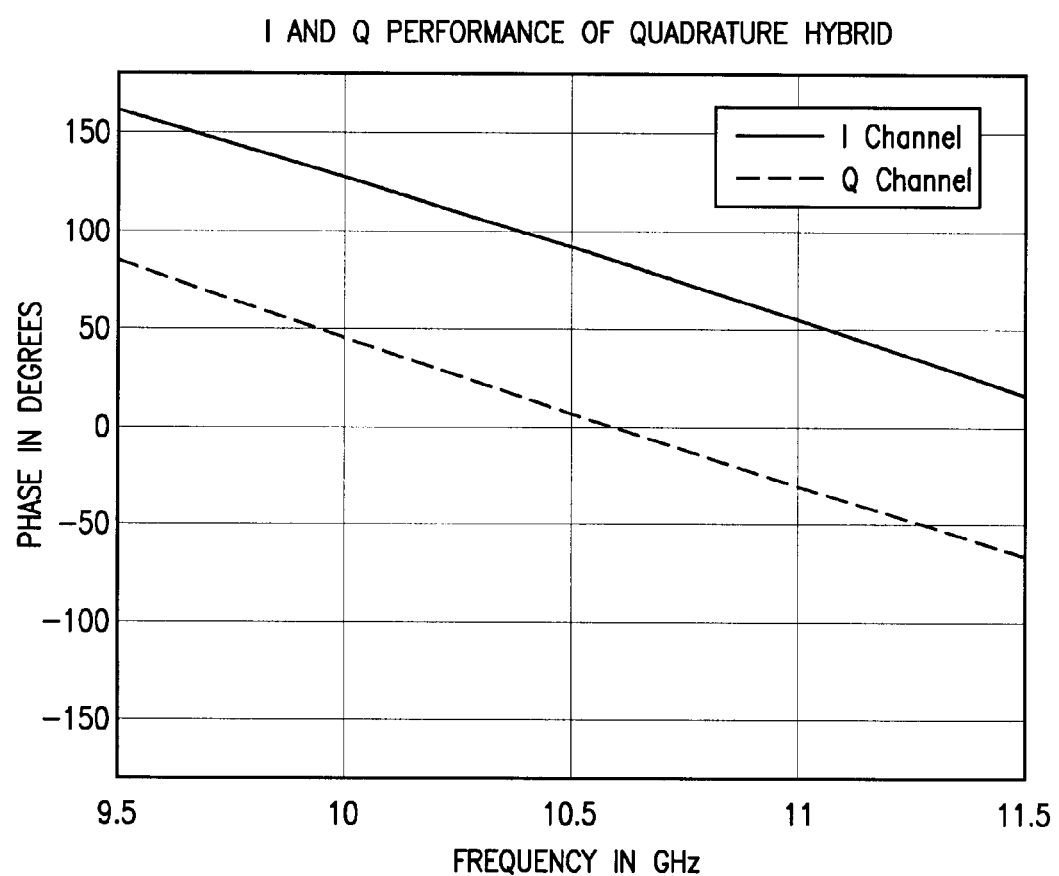
FIG. 28 is a graph of an example of the measured phases of the output of the quadrature-phase hybrid.

An important part of an IQ mixer circuit design is the generation of the I and Q LO signals. Three desired conditions in this example are (1) equal amplitude, (2) large isolation, and (3) 90° phase difference. This is achieved by a 0°-90° hybrid as shown in FIG. 27. The output power at ports (2) and (3) are both approximately −3 dB with an isolation better than 30 dB. A resistor is a termination for the isolation port. FIG. 28 plots the measured phases at the hybrid's output. Notice that the phase of the Q channel, i.e. port (3), has 90-degree lag compared to the I channel. This indicates that the design is working properly.

Gain Stages

Figure 29:
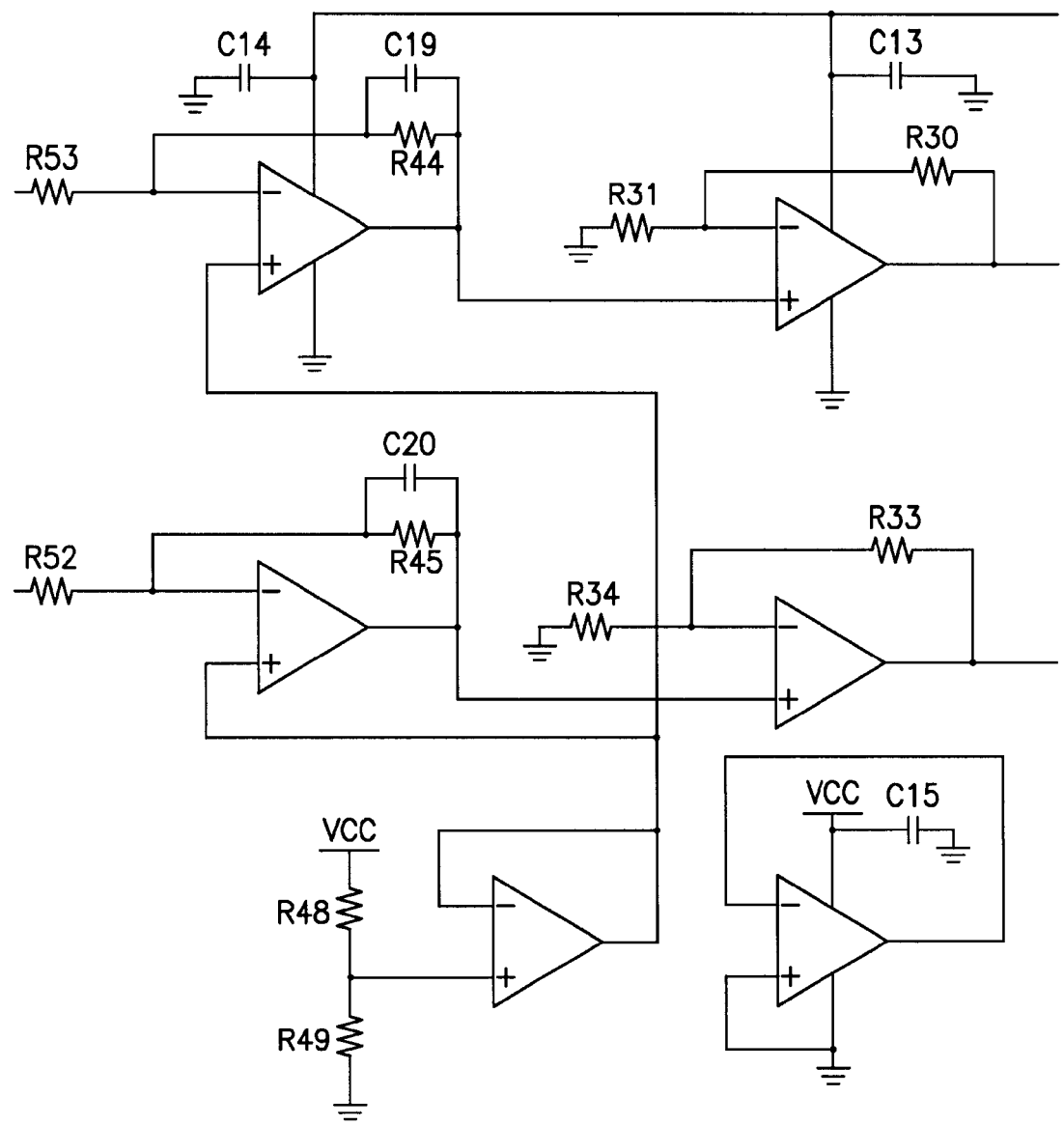
FIG. 29 is a diagram of an exemplary embodiment of the second and third DC-gain stages.

There are three gain stages used in this exemplary radar to amplify the DC signals. The first gain stage involves amplifier U16 as discussed earlier. This stage provides an inverted gain of 10. The second gain stage involves amplifier U14 and provides a gain of approximately 64 via the feedback resistors R44 and R45 as shown in FIG. 29. Recall that the DC component associated with the mixer bias is blocked by capacitors C21 and C22 placed between the first and second gain stages. The capacitors C19 and C20 added to the feed loop work with R44 and R45 as low pass filters such that AC interference of noise with a frequency content higher that 500 kHz will be filtered out at the output. The third gain stage (U17) provides a non-inverted gain of two. In order to meet the 0-10V input range of the A/D board, the DC power supply for amplifiers U14 and U17 are 12 volts. A DC offset of 2.5 volts is also introduced at the second gain stage from the "+" input terminals. The 2.5 volts are generated by R48, R49, and U18:B. Note that $V_{cc}$ for U18:B is +5 volts in this example. This 2.5V is later amplified +5V by the third gain stage. This +5 volts is the desired DC offset value for the final output since the total range is from 0 to 10 volts. Therefore, the final amplified signal can have a maximum peak-to-peak level of approximately 4.5 volts without causing saturation. If necessary, R44 and R45 can be increased to increase the gain. In doing so, one may lower the values of C19 and C20 such that the product of C19 (or C20) and R44 (or R45) remains the same. All the DC amplifiers and buffers in the exemplary design use a LM2904 low noise amplifier.

Timing/Switching Circuits

Figure 30:
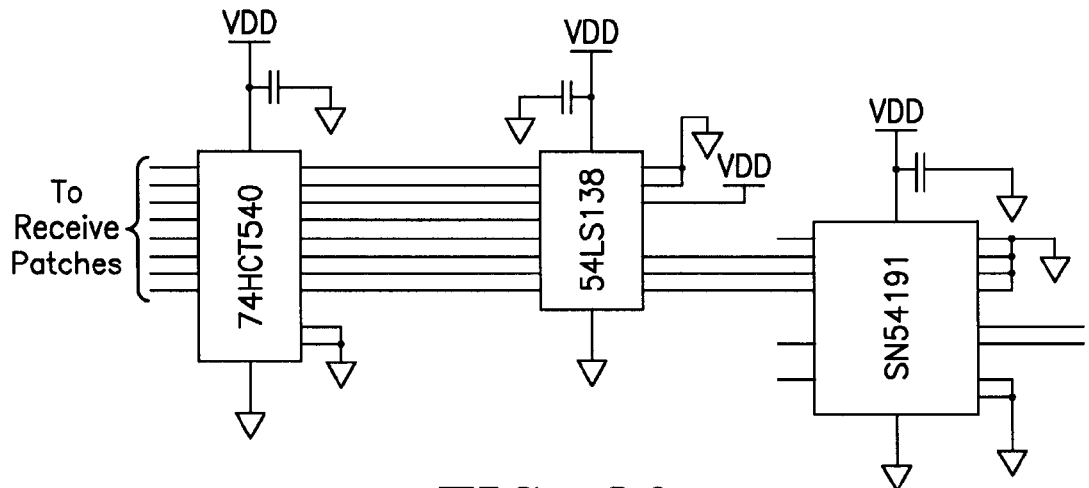
FIG. 30 is a diagram of an exemplary embodiment of the radar timing control circuitry.

FIG. 30 is a diagram of the radar timing control circuitry of this exemplary embodiment of the present invention. The main function of the timing circuitry is to perform the receiving antenna switching. The control inputs for the timing circuitry includes a COUNTER CLEAR and a CLOCK. The former sets the counter (TTL SN54191) output to zero at low state (0 volt), and the latter advances the counter output by one at high state (5 volts). Note that the counter output will remain to be zero as long as the COUNTER CLEAR remains low regardless of the CLOCK state. Therefore, COUNTER CLEAR is preferably set to high before the antenna scan. At zero count, the first address line output of the multiplexer (54LS138) is selected, and the first output line of the line driver (74HCT540) becomes high while other lines remain low. At this time, the PIN diodes on the first receiving antenna are forward biased and the first receiving path is connected. As the next clock transition from low to high occurs, the counter output increases by one and the second receiving path is connected while other receiving paths remain disconnected. After finishing the measurement of the eighth receiving antenna, the COUNTER CLEAR is set back to low to clear the counter.

Radar Control Software

The software of this exemplary embodiment was developed using HP VEE Programming Software. This program contains routines for data storage and data processing. The structure and major components in the program are discussed below. The basic operation instruction will also be provided. It should be recognized that other embodiments of the software are within the scope of the present invention, which may provide improved efficiency and stability.

Hardware Specifications

The basic system requirements and installation procedure for this exemplary embodiment are listed below. HP VEE has two installation versions: development and runtime versions. The development version allows the user to modify and execute HP VEE programs while the runtime option only allows the user to execute the compiled versions of HP VEE programs. The A/D board was configured (using INSCAL program) for 8-channel differential analog inputs with 12-bit resolution. The input voltage range is configured to the 0-10V range. The I and Q channels from the LEFT radar unit are connected to CH 1 and CH 2 respectively. The I and Q channels from the RIGHT radar unit are connected to CH 3 and CH 4, respectively. Three digital output channels are used for COUNTER CLEAR (DIO 2), A/D TRIGGER (DIO 1), and CLOCK (DIO 0) controls. The clock output is also connected back to CH0 to be sampled as a timing reference. The A/D board was supplied with a break-out evaluation board for testing. The evaluation board contained easily accessible sockets to connect cables directly to the radar system. In combination, the control program and A/D board allow the operator to send and receive data effectively to the radar system.

HP VEE Pro 6.0 System Requirements
    Pentium 266 MHz
    64 MB RAM
    Windows 95 and higher
    Matlab Server (installed with VEE)
    A/D Card Requirements
    Universal Library compatible
    Plug and Play Card
    Installation
    Install A/D Card with appropriate drivers
    Calibrate A/D Card with InstaCal Calibration Program
    Install HP VEE 6.0 Development or Runtime Version of HP VEE Pro 6.0 (or both)

Basic Operation Instruction

Once the A/D interface is properly configured and the HP VEE compatible Universal Library provided with the A/D card is installed, it is ready to run the software. The exemplary program starts with three groups of objects on the screen. The first group is the control buttons. The second group is the parameter entry windows, and the third group contains the output display windows. Two polar plots display the normalized AOA profiles from the left and right radar units. All of the tool bars at the top and bottom of the screen may disappear under the Running Environment instead of Programming Environment.

Control Buttons

The functions of the control buttons are described below.

RUN
    Start collecting data from A/D board and plot the data.

STOP
    Stop the program. The user may use this button to stop the program to ensure the termination of a background task that is running on the A/D board.

START NEW BKG
    Start to collect new background data. The background data will be subtracted from measured data before further processing. This is used to remove target independent responses caused by environment scattering and radar's internal coupling. New background may be taken when the environment changes or when the configuration of the radar is changed. Note that pressing this button alone does not save the averaged background data to the background files and are only useful until the program stops.

SAVE NEW BKG
    Press this button to save the new background to the background files so the current background will be used for future measurements.

REC BEG
    Pressing this button starts the recording of background subtracted LI, LQ, RI, and RQ data as time progresses. The data is only temporarily stored in the memory.

REC END
    Pressing this button saves the recorded data to data files on the hard disk.
    The channel identifier, LI, LQ, RI, RQ, and the elapsed time in seconds since the pressing of "REC BEG" will be automatically appended to the filenames. Each channel is saved in a separate text file. A single array of text data is recorded in each file. The first eight data points correspond to the real-number data from receiver #1 to #8 sampled at the first time step. The next eight data points correspond to eight receiver data sampled at the second time step.

START IMAGE
    Pressing this button activates the AOA and target-position plots.

Parameter Entry Windows

Several parameters that may be entered properly to ensure the functioning of the radar are explained below.

F_L (GHz)
    Enter the frequency of the LEFT radar unit.

F_R (GHz)
    Enter the frequency of the RIGHT radar unit.

Offset (inches)

Enter the distance from the center of the vehicle to the center patch antenna. If the radars are not mounted symmetrically with respect to the vehicle center, enter the half distance from one center patch antenna to another center patch antenna.

Threshold

Magnitude threshold for target detection and location.

A/D Rate

Enter the desired A/D sampling rate per channel. This number times five should not exceed the maximum sampling rate of the A/D board (PC-DAS16/12). Current maximum rate of this exemplary embodiment is 100K samples/s. Slower or faster rate models are included within the scope of the present invention. For example, a 300K samples/s model is within the scope of the present invention. Unless expressly stated otherwise, it is not intended to limit the sampling rate of the present invention.

# of Points

Enter the total number of sample points for five traces in this example.

Running AVG

Enter the size of the smoothing window for smoothing the data. The minimum value is 2 for this exemplary embodiment. This smoothing window helps reduce high frequency fluctuations caused by the noise of the unstable power source. If a large number is entered, the radar will be less sensitive to the movement of the target and a sudden appearance of a new target depending on the sampling rate and CPU speed. The default value is 5 in this embodiment. For example, a value of 10 may be recommended for noisier signals.

Slide BKG AVG

Enter the number of time steps to be used for calculating the average background after the "START NEW BKG" is pressed.

Graphics Windows

Five graphics windows are shown on the screen to help the diagnosis of the functioning of the radar and to display the detected image. These graphs are discussed here.

Waveform Plot

Plot the digitized traces of the reference clock, I- and Q-channel of left unit (LI & LQ), I- and Q-channel of the right unit (RI & RQ). Each trace appears as a staircase waveform with each step corresponding to a receiving element starting from element #1 at the beginning of the trace. Element #1 is close to the mixer circuit. In a normal situation in this example, all the traces may have approximately a similar variation range that should be around the center of the vertical scale. The vertical scale indicates the digital readout of the recorded data and is from 0 to 4000 since a 12-bit A/D conversion from 0-10V is used in this example. A value of 4096 is equivalent to 10 volts. There are nine sections on each trace in this example. The last section should be wider (2-4 times) to avoid CPU time jittering. If less than nine sections are observed, it could be caused by different A/D sampling rate or different CPU time on the computer. One may increase the value of "# Points" parameter.

Background Removed Magnitude Plot

Two traces are plotted here as a function of time. One trace plots the mean of the signal magnitudes of the eight receiving channels from the left unit. The other trace plots the similar trace for the right unit. The background has been subtracted from the data before calculating the magnitude. For a no target situation, the magnitude may stay below five (digital readout). If not, a new background may be needed. These traces provide a rough idea about the scattering intensity from the target, but it does not necessarily mean a target would not be detected if the magnitude is low since the AOA processing provides additional processing gain.

AOA Plots

The normalized AOA profile is plotted in a polar coordinate that is inconsistent with the outward view from the center antenna of each radar unit. The left and right plots correspond to the AOA results from the left and right radar units, respectively. These two AOA plots are only activated after the "START IMAGE" button has been pressed and the mean magnitude of the radar unit is higher than the desired threshold specified in the "threshold" parameter window.

Zone Plot

Each triangulated target position based on AOA results is marked on this zone plot as a circle until the window is cleared. This plot is only activated after the "START IMAGE" button has been pressed and the mean magnitude of both radar units are higher than the desired threshold specified in the "threshold" parameter window.

VEE Programs

This section will briefly describe key functions and objects in the exemplary radar control program.

Each block of the radar program represents a collection of tasks that are grouped together as a function or an object. The top and bottom pins on each block indicate the execution flow in and out, respectively. The pins at the left and right of each block represent the data input and output terminals, respectively. For instance, after the program starts, a message is displayed to remind the user to remove the AC adapter. Then an object called "CBI_UL" is executed. "CBI_UL" is the A/D data acquisition command that loads the A/D command library. This allows the programs to recognize the A/D acquisition card related command later. All of the commands related to the A/D card can be found under the "DataAcq" tab at the top tool bar. This is not a standard VEE library but was installed by installing the Universal Library provided with the A/D card. It is important to know that "CBI_UL" is hardware dependent and may need to be updated whenever there is a hardware change such as a new A/D card, a new A/D card configuration, or a new computer. One can update it by simply cutting the existing object away and inserting a new one from the "DataAcq" pull-down window. It may also be noted that the path name of the library files "CB32.dll" and "CB32.h" may be an absolute path such as "C:\program files\CB\ . . . " instead of "~install_drectory\ . . . " in order to compile the Run-Time version. Like all objects and functions, editing an object can be done by double clicking the object or by right clicking on the object and selecting "Restore" from the pop-up menu. After the library is loaded, the program checks the presence and address of the A/D card and displays the name of the card. Note that the name is hardwired into the "Board_CHK" object in this example. If different board is used, one may edit this object and change the name string. Most of the global variables are also initialized in the ground of program. "Call Get_Background" object reads in the saved background data and loads them to a proper global variable to be used later for background subtraction.

The next group of the program initials the COUNTER CLEAR, CLOCK and A/D TRIGGER control signals. The CLOCK and TRIGGER are both set to low (zero volt). The COUNTER CLEAR is first set to low and then set back to high to clear the counter output. An infinite loop begins the continuous data collection and processing routines. The "TakeData" function triggers the A/D data sampling and collects real time radar data from both the left and right unit as will be discussed. If the "START NEW BKG" is enabled, the collected data will be sent to a slide mean buffer for calculating the average background. The recorded trace data are also sent to the plot object for plotting the clock and IQ traces.

The background subtraction is performed in the "Data_Cal" function. The background-subtracted data are then sent to a slide-mean buffer for noise reduction by smoothing. This running-window smoothing is done in "SlideMean" function. If the "REC BEG" is enabled, the smoothed data are collected in the buffers waiting for being written out to data files once the "REC ENG" button is pressed.

The smoothed I- and Q-channel data are combined to form complex data. Then a MATLAB object is used to calculate the mean magnitude of the left and right radar units separately. The mean magnitudes are also sent to a plot object for displaying. The "PSD_AOA" function is then called to calculate the AOA profiles. These AOA profiles are then sent to the "Triangulation" function for determining the positions of detectable obstacles.

The "TakeData" function is responsible of getting radar data from the radar board through the A/D board to the PC. At the beginning of the scan, the "COUNTER CLEAR" is set to low and then to high to clear the counter chip on the radar board. As mentioned, this also switches the first receiving element on. The "cbAInScan" object provided from the data acquisition library is then called to prepare the A/D card for taking multiple-channel, multiple-time data. The A/D card will now wait for the occurrence of the rising edge of the trigger signal to begin collecting data. This trigger action is done by calling the "Set_Trig_H" and "Set_Trig_L" functions. The A/D card will now collect the specified number of the data points asynchronously using its internal clock at a specified sampling rate. The "cbAInScan" is set to run in the background. Therefore, while the A/D card is collecting the data, the receiving elements may be switched by calling the "switch_ant" function. The "Get_Trace" function will constantly check the A/D data collection status. The A/D finishes sampling the specified number of data points. The "Get_Trace" function will stop the background operation and will extract the CLOCK, LI, LQ, RI and RQ trace data from the A/D data buffer. As mentioned earlier, each trace (except for the CLOCK) has a staircase shape containing data from all eight receiving elements. The next job is to separate data from individual receiving elements. This may be done by the MATLAB object named "Segmentation". This object automatically detects the clock pulse. Receiving data for each receiving element is then obtained by averaging the values contained between two clock pulses. Now each of the LI, LQ, RI and RQ channels would contain eight real numbers.

Programs in the "PSD" function are responsible for generating AOA profiles. It takes five inputs in this exemplary embodiment. "E1" and "E2" correspond to the eight complex data from the left and right radar units, respectively. "lambda_L" and "lambda_R" correspond to the wavelength in inches of the left and right radar units, respectively. "dx" is the element spacing in an array in inch units. Four outputs are generated. "ang_L" is the angle indices associated with the AOA profile, "AOA1", for the left radar unit. Similarly, "ang_R" is the angle indices associated with the AOA profile, "AOA2", for the right radar unit.

The programs of the "Trigulation" function determine the target location from the left and right AOA profiles. The "Triangulation" function may detect a single target or multiple targets depending on the detection algorithm. The output contains the coordinate of the "detected" target.

Software Algorithms

The data calibration, processing, and detecting algorithms for this exemplary embodiment of the X-band radar system will now be discussed in greater detail. The calibration algorithm removes any magnitude and phase imbalance between I and Q channels. Such a minor imbalance may inevitably occur from the minor differences in the PCB layout, mixer characteristics, and soldering conditions. The calibration procedure will also be discussed. The processing algorithm processes the array data received from each radar unit to remove background clutter and to obtain the angle-of-arrival (AOA) estimation. The AOA produces a received radar energy map as function of angles within the coverage of interest. The detection algorithm determines the presence of an obstacle based on the magnitude and pattern of the AOA result obtained from each unit (for single unit application) and locates the position(s) of the obstacle(s) via triangulation using the AOA results obtained from multiple (e.g., two or more) units placed at different positions. This embodiment of the detection algorithm also contains an algorithm to reject "ghost" responses generated from the triangulation process in the case of multiple targets.

Radar Imaging Algorithms

Both near-field focusing (NFF) and angle-of-arrival (AOA) radar imaging techniques were explored during development of this exemplary embodiment of the radar system. The advantages and disadvantages of individual or the combination of these two techniques were carefully examined against practical conditions. Among different combinations that were tested with simulated data, some were found to be more effective than others for this example. In the end, the fastest and most effective configuration was identified to be the AOA and the triangulation algorithms for this exemplary embodiment of the radar system. It should be recognized that other algorithms may be more effective for other embodiments of the present invention.

Near-Field Focusing (NFF) Algorithm

Figure 31:
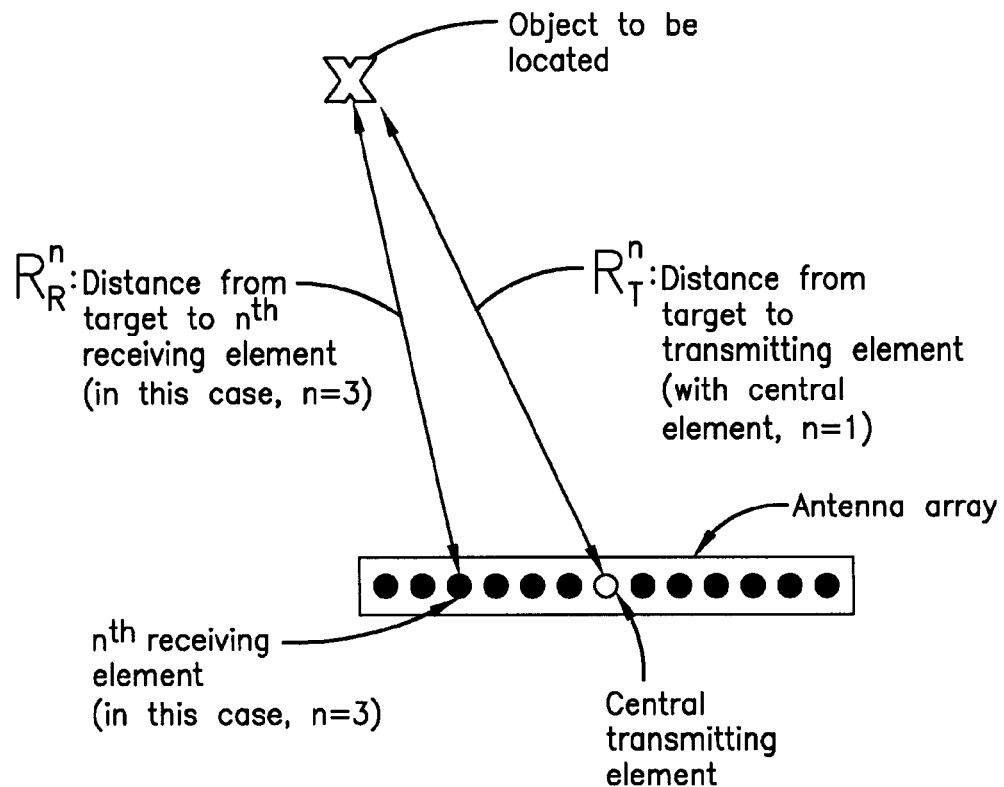
FIG. 31 is a diagram of an exemplary embodiment of the near-field focusing algorithm.

The NFF algorithm is used to produce a two-dimensional (2-D) image from the scattering source in the cross range and the down range. This algorithm is utilized for both detecting the presence of a "target" (by comparing the response with that of an "empty" environment) and locating precisely the location of the target. The algorithm may accomplish a large amount of processing. FIG. 31 illustrates the configuration of the NFF algorithm.

The scattered response from a point-like object can be expressed as $$E_R^n = A \frac{e^{-jk(R_T + R_R^n)}}{R_T R_R^n}, \qquad (3.13)$$

where the index "n" indicates the element number in the array and $R_T^n$ and $R_R^n$ are distances from the scattering object, P, to the transmitting and $n^{th}$ receiving elements, respectively. The wavelength number is indicated by $$k = \frac{2\pi}{\lambda},$$

where $\lambda$ is the wavelength. The complex amplitude A is related to some electromagnetic constant and the scattering property of the object to be detected. As one can see, there is phase variation among the different array elements due to different $R_R{}^n$. Assuming the object is located at Q, the NFF algorithm is simply the summation of the phase corrected responses based on the postulated object position, Q. That is $$I = \sum_{n}^{M} E_R^n \cdot e^{+jk\left(R_T^Q + R_R^Q\right)}. \tag{3.14}$$

Notice that if the position Q is the same as P—the true object position—then the phase-compensated responses from each in the summation would be added up coherently and result in a large magnitude. On the other hand, if Q differs from P, a phase variation exists among the phase-compensated responses depending on the position of the receiving element. This results in a much smaller magnitude of the sum. Notice that the farther the distance from the target, the less the phase difference is, and thus the less sensitivity of the NFF algorithm. A test was performed in which an image was obtained from simulated data, where the magnitude of the summed value for each postulated object position pixel within the 6 feet by 12 feet region was plotted in a normalized color scale. The true object position was chosen to be at (0',6') position. The NFF algorithm successfully showed that the maximum magnitude does appear at the true target position. There were 30 receiving elements used in this simulation. The spacing between each two element was 0.75". The relative large array size produced a fairly good cross-range resolution. As the array size is reduced due to the cost and simplicity consideration, the resolution decreases. The NFF may be most effective when the object is very close to the array.

Angle-of-Arrival (AOA) Algorithm

Figure 32:
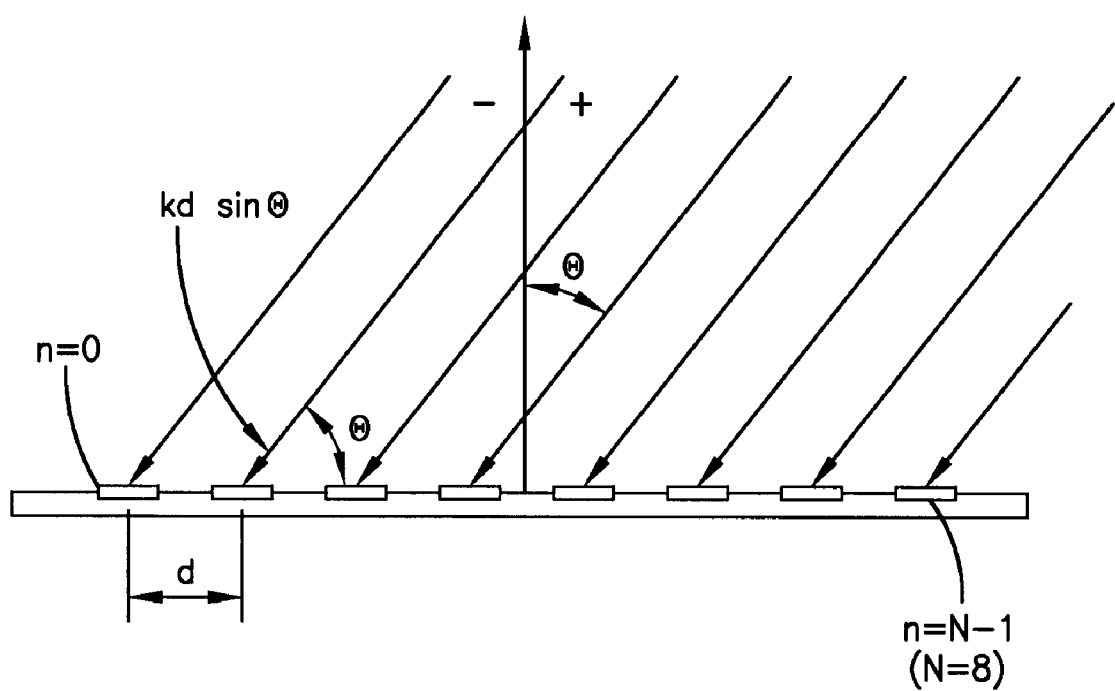
FIG. 32 is a diagram of an exemplary embodiment of the basic parallel-ray assumption of the AOA algorithm.
Figure 33:
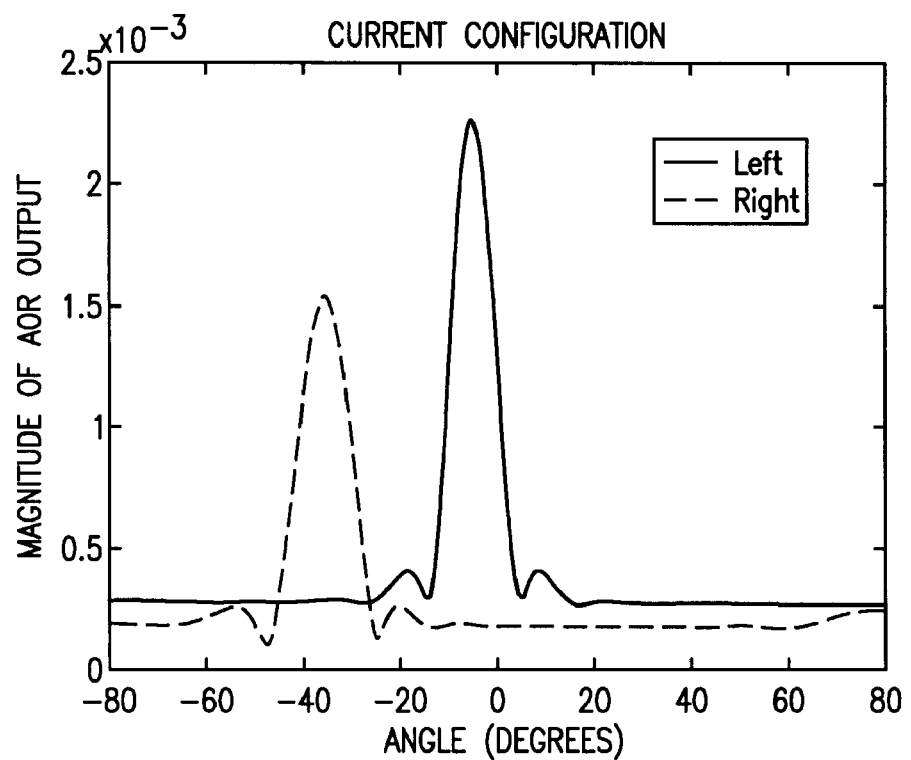
FIG. 33 is a graph of an example of the $/(\Omega)$ of an individual module with Hanning window weighting over the array.
Figure 34:
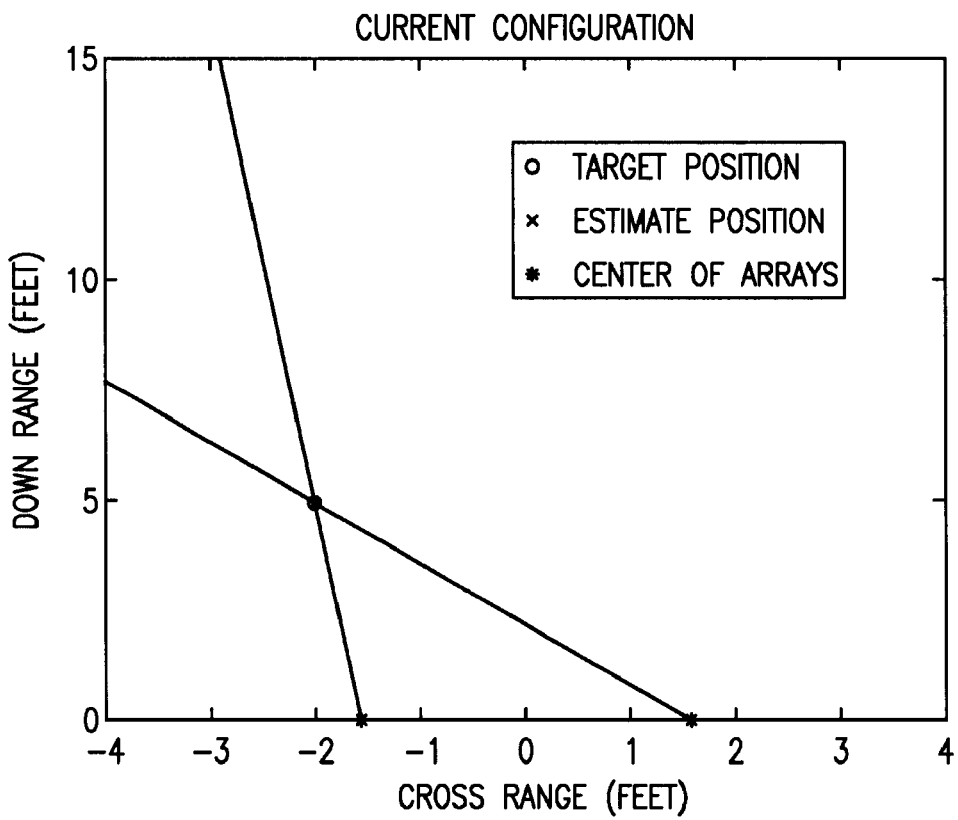
FIG. 34 is a graph of an example of the triangulation results based on maximum AOA directions estimated from left and right modules.
Figure 35:
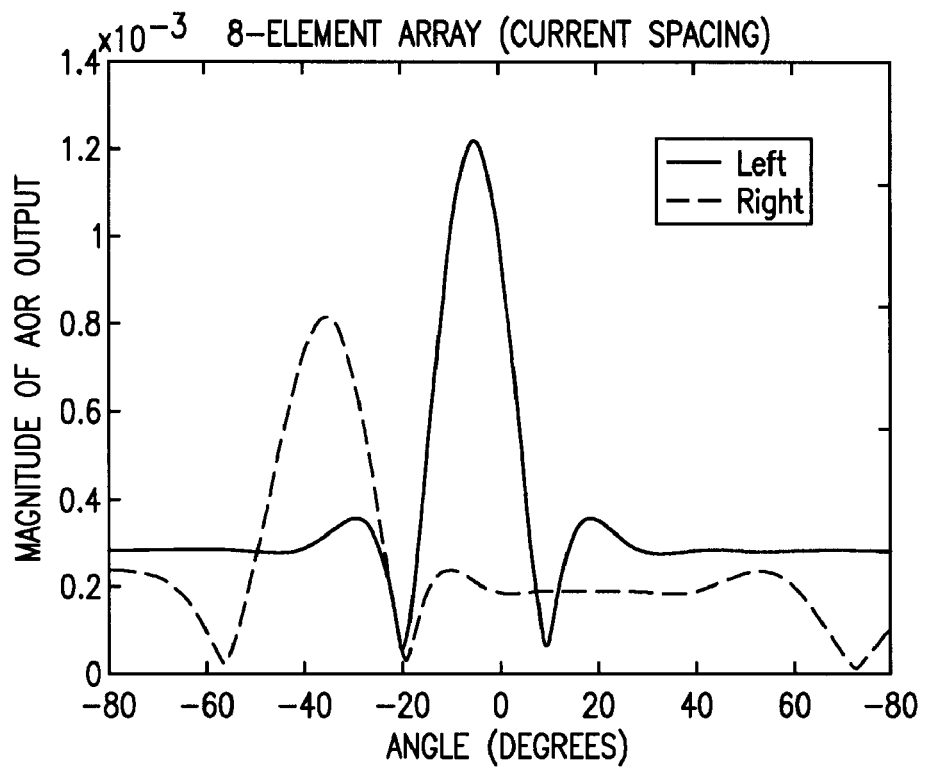
FIG. 35 is a graph of an example of the $/(\Omega)$ of an individual module with Hanning window weighting over the array.
Figure 36:
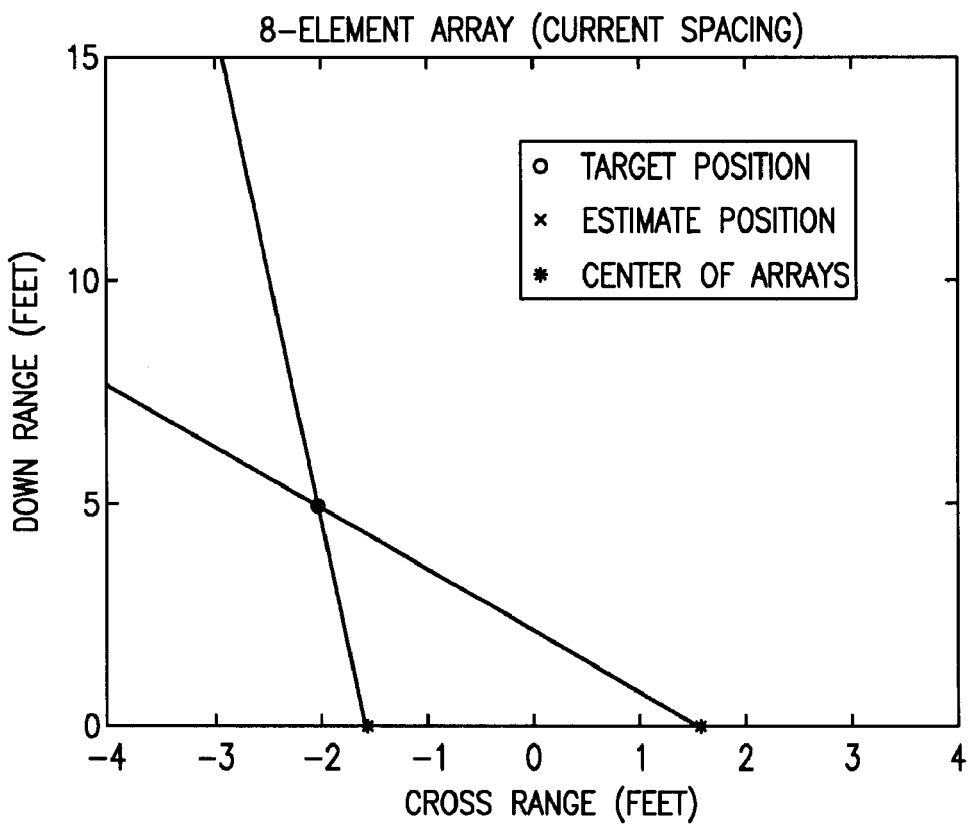
FIG. 36 is a graph of an example of the triangulation results based on maximum AOA directions estimated from left and right modules.

The concept of AOA can be used to pinpoint the direction (relative to the center of an array) of the target. The algorithm utilizes the phase variation among different array elements under the far-field assumption where the incoming rays that arrive at receiving elements are assumed to be in parallel with each other as illustrated in FIG. 32. The accuracy of the AOA may diminish if the object is too close such that the rays from the object to different array elements are no longer parallel.

Under the parallel-ray assumption, the scattered response from an object observed at the $n^{th}$ array element can be expressed as $$E_n = A e^{jk(nd)\sin\theta}, \tag{3.15}$$

where d is the element spacing, n=[0, 1, 2 ... N-1] of a N-element array, and $\theta$ is the angle away from the normal direction. As the index n increases, a phase advance of kd sin $\theta$ is introduced. Notice the designation of the "positive angle region" and "negative angle region" in FIG. 32. Similar to the NFF algorithm, the AOA algorithm also attempts to correct the different phase based on a postulated object angle, $\theta'$, and collect the contributions from all of the corrected responses. That is $$I(\theta') = \sum_{n=0}^{N-1} E_n \cdot e^{-j(k\sin\theta')x}, \tag{3.16}$$

where x=nd is the position of the $n^{th}$ element (relative to the leftmost element). From (3.15) and (3.16), it is apparent that as $\theta'$ (the searching angle) approaches $\theta$, $I_\theta$ will produce a large value. Conversely, if $\theta'$ is incorrect, the corrected responses of the receiving elements would be in and out of phase, resulting in a much smaller magnitude of the sum. Notice that (3.16) is in the form of a well-known Fourier series if we introduce a new variable $$\Omega = \frac{k\sin\theta'}{2\pi} = \frac{\sin\theta'}{\lambda}.$$

Then (3.16) becomes $$I(\Omega) = \sum_{n=0}^{N-1} E_n \cdot e^{-j2\pi\Omega x}. \tag{3.17}$$

The conventional Fourier has an additional (1/N) multiplication factor. Since the AOA will be normalized to its peak value and the multiplication of a constant does not affect the AOA pattern, this (1/N) factor will be neglected. Therefore, AOA can also be easily calculated using the FFT algorithm. That is, $$I(\Omega) = FFT(E_n, NF). \tag{3.18}$$

Note that "NF" is the number of points in the final angle domain that gives the desired angle increment size in the $\Omega$ domain. After obtaining $I(\Omega)$, one can change back to the desired $\theta$ domain using the following variable transformation.

$$\theta' = \sin^{-1}(\Omega\lambda). \tag{3.19}$$

Note the coordinates of $\theta'$ are not uniformly distributed. Our study shows that using the power of (3.18) may make it easier to do the thresholding for target detection. In which case, the AOA output would take $$AOA(\theta') = |FFT(E_n, NF)|^2. \tag{3.20}$$

The relationships are between the coordinates of input space domain and the output angle domain. These relationships are $$\text{Angel Range:} \quad \left\{-\sin^{-1}\frac{\lambda}{2d} \ldots \sin^{-1}\frac{\lambda}{2d}\right\} \tag{3.21}$$

$$\text{Angle Increment (in } \Omega \text{ domain):} \quad \frac{(\lambda/d)}{NF-1} \tag{3.22}$$

Detection Criteria

Before locating a target, the target has to be detected first. In the absence of a target, noise may be present in the data and the AOA output would produce randomly distributed peaks in the angle range of interest. Attempting to use this noisy AOA output to locate targets may be meaningless, and the resultant location map may be ignored. The scattering magnitude (SM) may be used as a test criterion to determine the presence of an object within the view area of the radar. The scattering magnitude (SM) is defined as $$SM = \sum_{n=0}^{7} |E_n|. \quad (3.23)$$

This is the sum of the magnitude of signals received from all eight elements on each radar unit. If there is more than one radar unit, SM value should be calculated for each unit separately. Each SM value from each radar unit after each measurement is compared against two predetermined thresholds. Note that it is implied here that background response has been removed via subtraction. If the SM value exceeds the lower threshold, a target is possibly detected in the view area of that radar. If SM exceeds the higher threshold, a target is surely detected. This criterion should be useful in monitoring multiple zones such as around a bus or property. When a dual-unit is used for position triangulation, the triangulation can be activated only when both SM values exceed the lower threshold. Then, the type of warning will be determined by the target position in this example. Only one of the two SM's may exceed the lower threshold such as in the case when a target is significantly off to one side or when one of the two radar units is not working. In this case, the warning decision may be switched to the above single-radar warning mode.

Choice of Array Size

The array size, W, is related to the cross-range resolution, $\theta_{half\ power}$, of the angle-of-arrival (AOA) image by the following relationship $$\theta_{half\ power} = 2\sin^{-1}\frac{0.44\lambda}{W}. \quad (3.24)$$

As one can see, the resolution gets poorer as the array size W is reduced as demonstrated in Table 1. Note that this resolution parameter does not necessarily mean the angle accuracy if one uses the maximum value in the AOA pattern as the detection criteria. The resolution parameter does affect the capability of discriminating a thin object from a fat cylinder one. If a weighting function is applied during the FFT processing to reduce the array truncation effect, the resolution may get a little poorer due to the reduction of the "effective" array size.

TABLE 1

Choice of Array Size and Array Spacing.

| | Notation | Case 1 (current) | Case 2 (Shorter Array) | Case 3 (final design) |
|---|---|---|---|---|
| Spacing | d | $\frac{\lambda_0}{\sqrt{\varepsilon_d}}$ | $\frac{\lambda_0}{\sqrt{\varepsilon_d}}$ | $\frac{\lambda_0}{2}$ |
| Elements Number | N | 16 | 8 | 8 |
| Ambiguity Angle | $\theta_a = \sin^{-1}\frac{\lambda_0}{2d}$ | ±128° | ±128° | ±90° |
| Angle Resolution | $2\sin^{-1}\frac{0.44\lambda}{W}$ | 5.6° (No Window) 8° (Hanning) | 11.2° (No Window) 12° (Hanning) | 14.5° (No Window) |

Choice of Element Spacing

The spacing between the array elements determines the range of ambiguity in the AOA estimation in this embodiment. The ambiguous angle where a ghost peak would appear can be predicted from:

$$\theta_a = \sin^{-1}\frac{\lambda_0}{2d}, \quad (3.25)$$

where d is the spacing between adjacent elements. When d is less than one half of the wavelength in free space, there is no ambiguous angle. As the spacing increases, the ambiguous angle becomes closer to the true angle as demonstrated in Table 1. Depending on the applications, a larger spacing can be used for smaller angle coverage by ignoring peaks outside the coverage area. Of course, a larger spacing also means a larger array size for the same number of elements, and thus improving the angle resolution.

Choice of the Number of Elements

Figure 37:
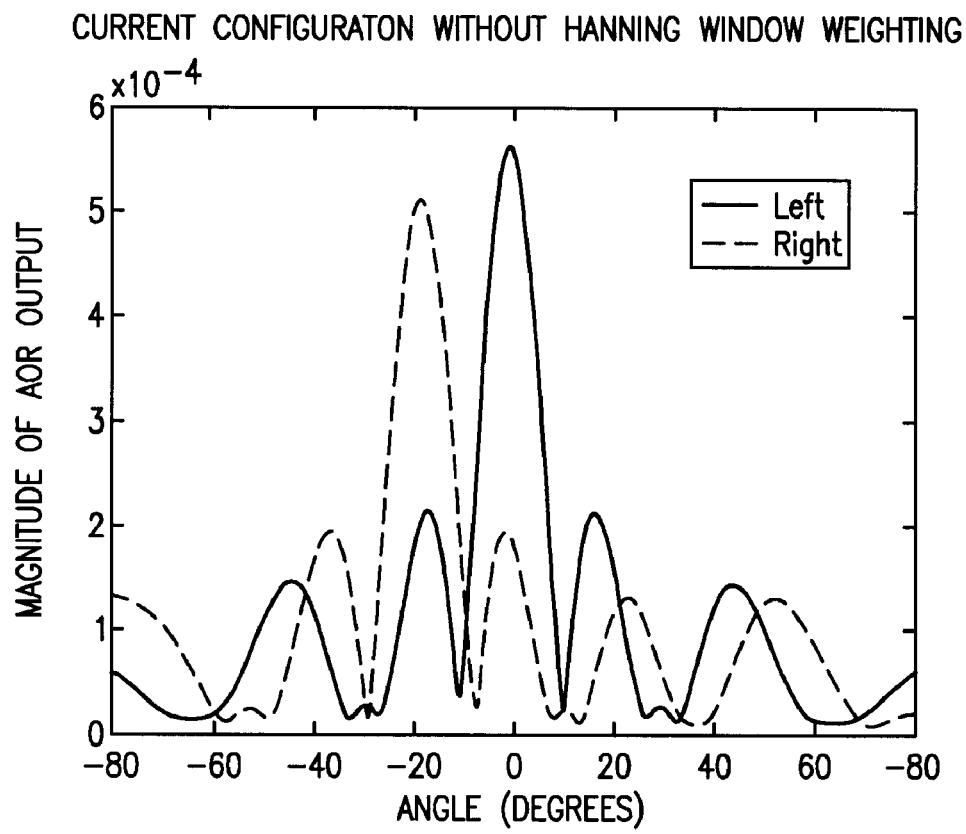
FIG. 37 is a graph of an example of the $/(\Omega)$ of an individual module without Hanning window weighting over the array.

Although an array containing more elements results in a higher cost and more memory and more computation time, it may provide a better sensitivity due to the integration (or summation) during the AOA processing. Integration over more elements reduces the noise effect as well as the array truncation error as demonstrated from the comparison of the AOA outputs in case 1 and 2 as shown in FIGS. 33 through 37. Notice that Case 1 shows a larger separation between the peak and the floor level resulting from the combination of array truncation and weighting. A Hanning window function has been applied to weight the array data before the AOA processing to reduce the sidelobes as shown in FIG. 37 for Case 1 without the Hanning window. FIGS. 33 through 37 show I(Ω) and triangulation results between Case 1 and 2 with two array modules separated by 38 inches (center to center). The element spacing is $$\frac{\lambda_0}{\sqrt{\varepsilon_d}} \sim 0.67$$

inches in this example.

Position Triangulation Including Multiple Target Triangulations

Figure 38:
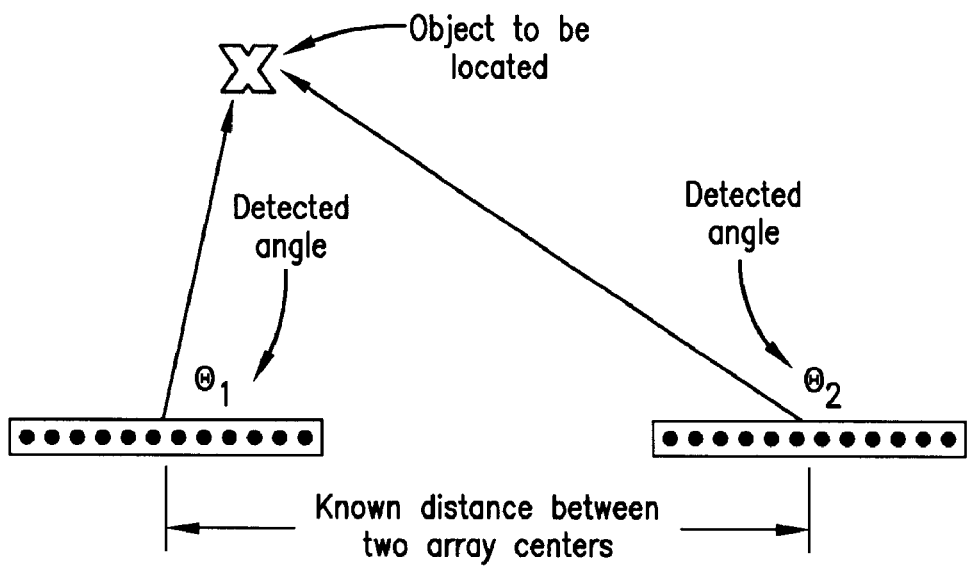
FIG. 38 is a diagram of an exemplary embodiment of the triangulation of the object position based on two AOA information.

The object position is triangulated using the AOA information obtained from two separate arrays as illustrated in FIG. 38. Such a triangulation algorithm involves algebra and uses the knowledge of the relative position of the two arrays. This minimizes both the complexity of the algorithm necessary for detection and location, as well as the time required for processing (since AOA is the quicker of the two algorithms). Thus, this technique inherently reduces the cost of the processing for this exemplary application.

Figure 39:
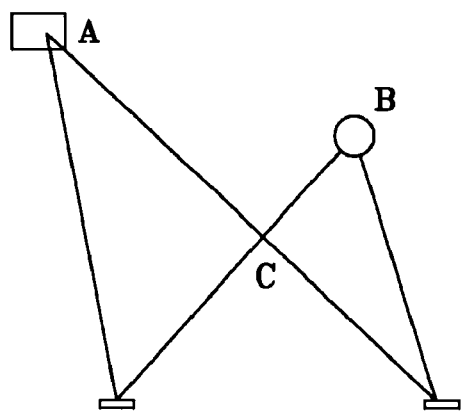
FIG. 39 is a diagram of an example of the "ghost" target produced by triangulation in the presence of multiple targets.
Figure 40:
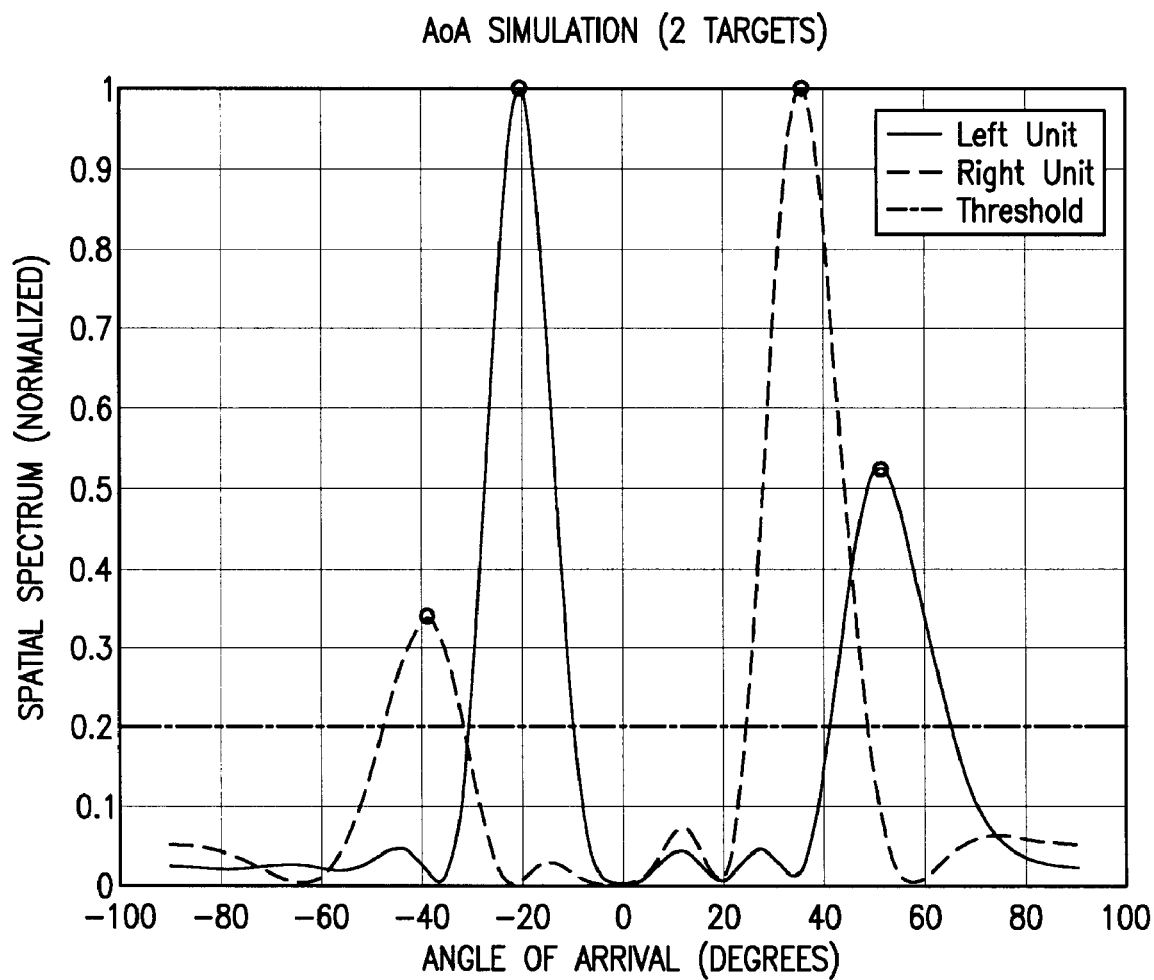
FIG. 40 is a graph of an example of the simulated AOA's of two arrays looking at two targets.
Figure 41:
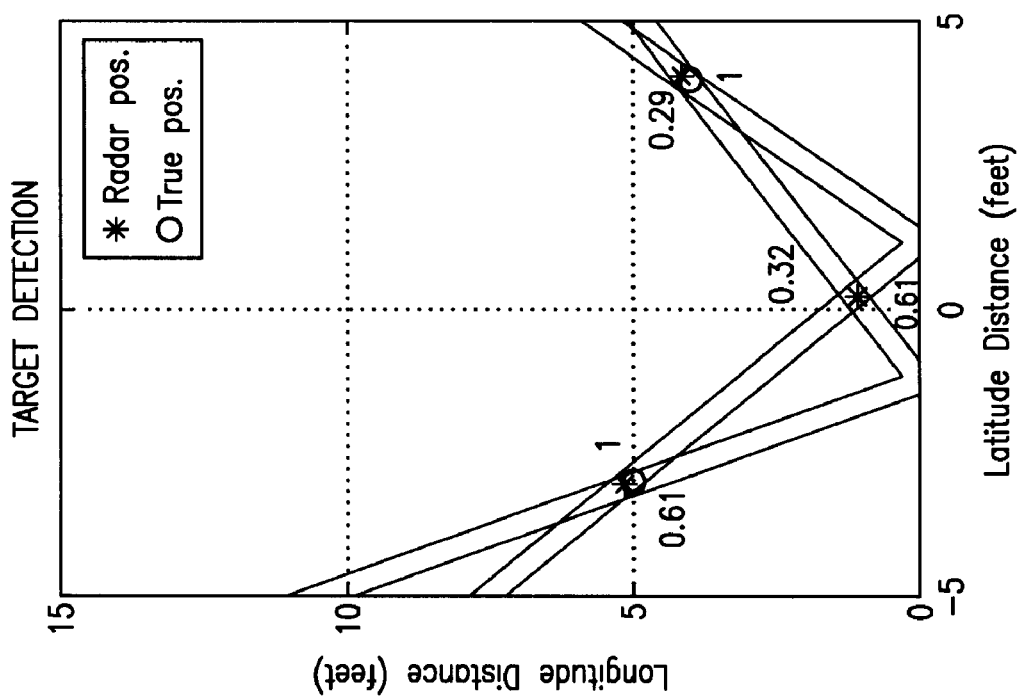
FIG. 41 is a graph of an example of the positions of true and ghost targets obtained from triangulation.

One limitation of the triangulation algorithm occurs when there is more than one target present as illustrated in FIG. 39 for a two-target case. Each array sees two targets coming from two different directions. If one performs triangulation using all possible combinations between the two AOA peaks from the left array and the two AOA peaks from right array, there will be four interceptions A, B, C and D, where D is not within the region of interest. Clearly, locations C and D do not have real targets and are called "ghost" targets. This situation is also demonstrated from simulated data shown in FIG. 40 and FIG. 41 except that the values of the AOA peaks are also shown in FIG. 41. The ghost targets can be eliminated if one limits the combinations of AOA's during the triangulation process. For the case of two targets (two AOA peaks above a predetermined threshold), combine only the direction associated with the left array and the two peaks from the right array and vise versa. A generalized rule of this algorithm is to consider the interceptions that involve at least one the maximum peak in each AOA. Note that ghosts located further away from the true targets may still exist. This may not be a concern since the true target will give a warning first due to closer distance.

An example of the peak-searching algorithm was implemented in MATLAB©. In searching the number of the peaks, a threshold line is gradually moved down from 0.98 to the specified lower limit of the threshold in this example. Any peak above each threshold level is picked and stored.

The triangulation is simply done by solving for the x-y coordinates of the interception point of two lines originated from the center of the array, respectively. The direction of each line is determined by the peak direction found from the AOA function.

I/Q Imbalance Calibration Algorithm

An important characteristic of a coherent radar system is its I/Q balance. In theory, the output of the I and Q channels may have the same magnitude and be 90-degrees out of phase when there is only one RF source. This condition is used to obtain accurate amplitude and phase information of the measured RF signal. In practice, minor imbalance may exist due the minor differences in the PCB, mixer characteristics, and soldering conditions between the I and Q channels. Such an imbalance causes error in phase, which in turn causes error in the subsequent processing such as angle of arrival. This example includes a procedure that calibrates such an imbalance error. The objective of this calibration is to obtain two corrections parameters for correcting the amplitude and phase. These two parameters can be stored in memory for calibrating measurement data later. Note that such calibration may not be needed if the imbalance is small and negligible. Even if the calibration is needed, it may only be needed to be done once for the same batch of mixer diodes, print circuit boards, and assembly procedure.

Calibration Measurement

Figure 42:
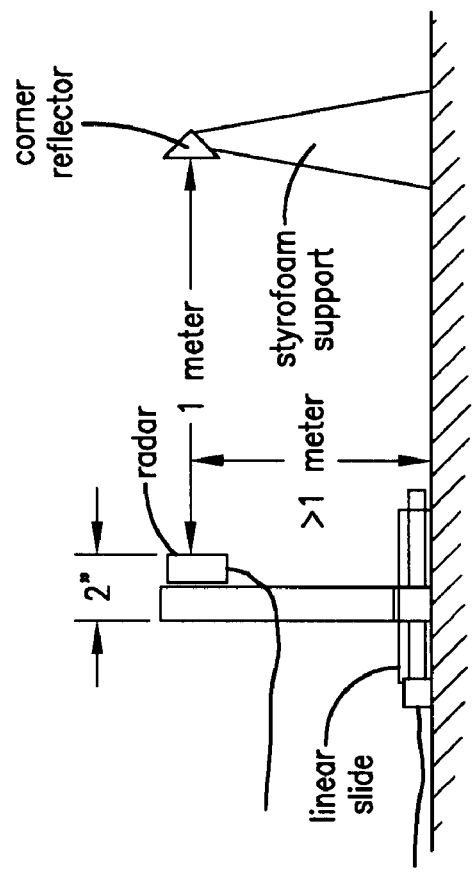
FIG. 42 is a diagram of an exemplary embodiment of the setup for I/Q calibration.

The calibration measurement involves a simple test bench setup as shown in FIG. 42. A small corner reflector is used as a reference target that is located in front of the radar at the distance of about one meter and is moving toward (or away from) the radar at slow speed. The reference target needs only to move a few inches (e.g., >0.6 inches) for this measurement in this example. Each 0.6-inch displacement causes the phase of the data to go through 360 degrees, needed for finding amplitude and phase correction parameters, p and $\Delta\theta$, respectively.

After collection of the calibration data, which are now two 8×N data matrices (one for I and one for Q), a 5-point running-window smoothing process is applied to each row to reduce noise. The amplitude of the I channel for each receiving channel is estimated by the standard deviation of the data collected from that channel. Similarly, the amplitude of the Q channel for each receiving channel is also estimated by the standard deviation of the data collected from that channel. That is $a_n = STD(I_n)$ $b_n = STD(Q_n)$, n: receiving channel (or element number).

The amplitude correction factor, p, is then found from $$p = \frac{1}{8}\sum_{n=1}^{8}\frac{a_n}{b_n} \quad (3.26)$$

Note that only one correction factor is required for all eight receiving channels since they share a single I/Q mixer circuit. This is the reason of taking the mean value in (3.26).

Figure 43:
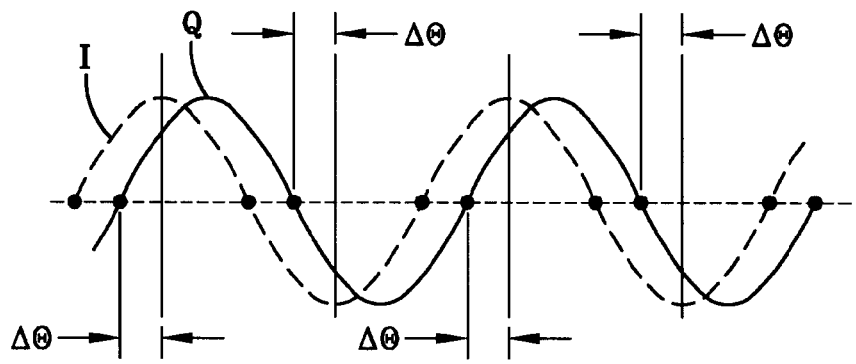
FIG. 43 is a diagram of an example of the scheme for finding the phase error term $\Delta\theta$.

The second correction factor to be found is the phase error, $\Delta\theta$. This is the angle of departure of the phase of the Q channel from the desired quadrature phase (90°) difference from that of the I channel. $\Delta\theta$ can be found from the distance between the zero-crossing point of the Q channel to the peak point of the I channel as shown in FIG. 43. The peak positions of the I-channel data are determined from the center position of two neighborhood zero-crossing points. Note that every half cycle corresponds to 180 degrees. The $\Delta\theta$ found from different cycles are then averaged using weighted mean. This zero-crossing-point approach was found to be more robust and less sensitive to the amplitude variation from cycle to cycle due to the change of target distance.

Calibration Algorithm

Assuming that the measured signals (DC voltage) of I and Q channels after the mixer and low-pass filter are $$\begin{cases} I = a \cdot \cos\theta \\ Q = b \cdot \sin(\theta + \Delta\theta) \end{cases} \quad (3.27)$$

The amplitudes a and b depend on the target type, position, orientation and distance. From the calibration measurement, the amplitude correction factor, p, is used from (3.26). Then, the amplitude corrected voltage of Q channel becomes $$Q' = Q \cdot p \quad (3.28)$$
$$= a \cdot \sin(\theta + \Delta\theta)$$
$$= a \cdot (\sin\theta \cdot \cos\Delta\theta + \sin\Delta\theta \cdot \cos\theta)$$
$$= Q \cdot \cos\Delta\theta + \sin\Delta\theta \cdot I$$

Rearranging (3.28), one obtains the following calibration equation for the Q channel. Note that both correction parameters, p and $\Delta\theta$, are already known from the calibration measurement.

$$\tilde{Q} = \frac{Q \cdot p - I \cdot \sin\Delta\theta}{\cos\Delta\theta}. \quad (3.29)$$

Equation (3.29) is applied to every data point before they are combined into a complex number representing the measured scattered field as shown below.

$$E_n = I_n - j\tilde{Q}_n. \quad (3.30)$$

The negative sign is due to the longer transmission line in the LO for Q channel mixing.

Measurement Example

Figure 44:
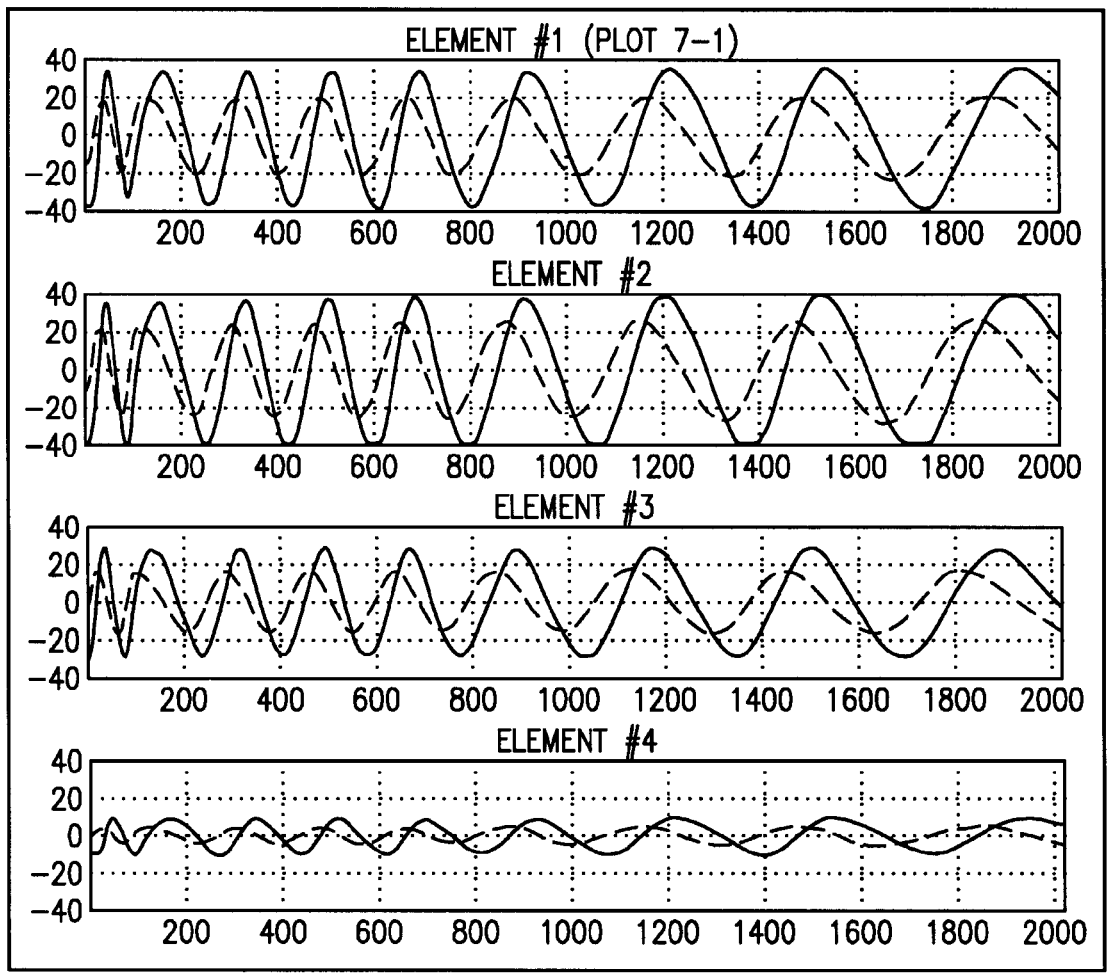
FIG. 44 is a graph of an example of the data recorded from the calibration measurement for channels 1-4 BEFORE I/Q calibration.
Figure 45:
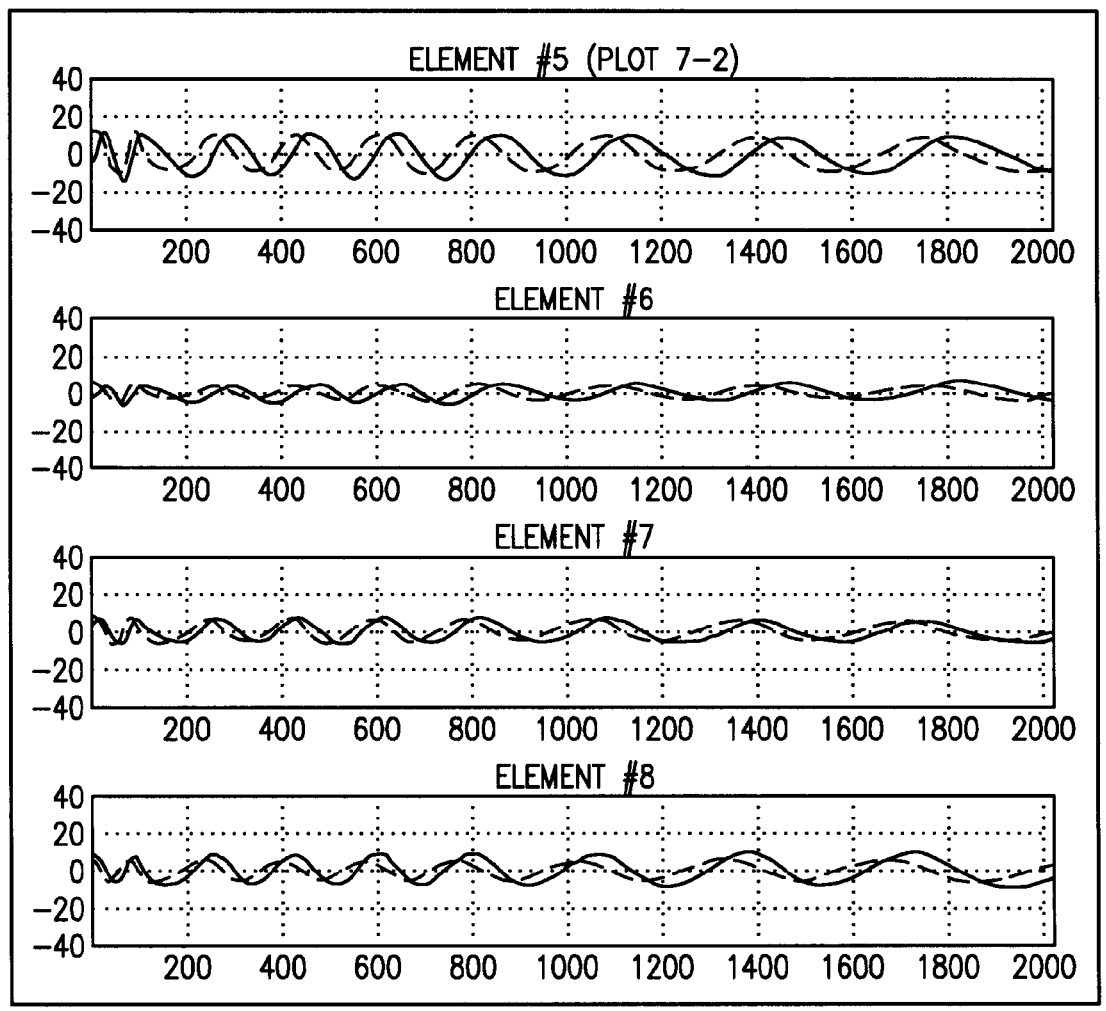
FIG. 45 is a graph of an example of the data recorded from the calibration measurement for channels 5-8 BEFORE I/Q calibration.
Figure 46:
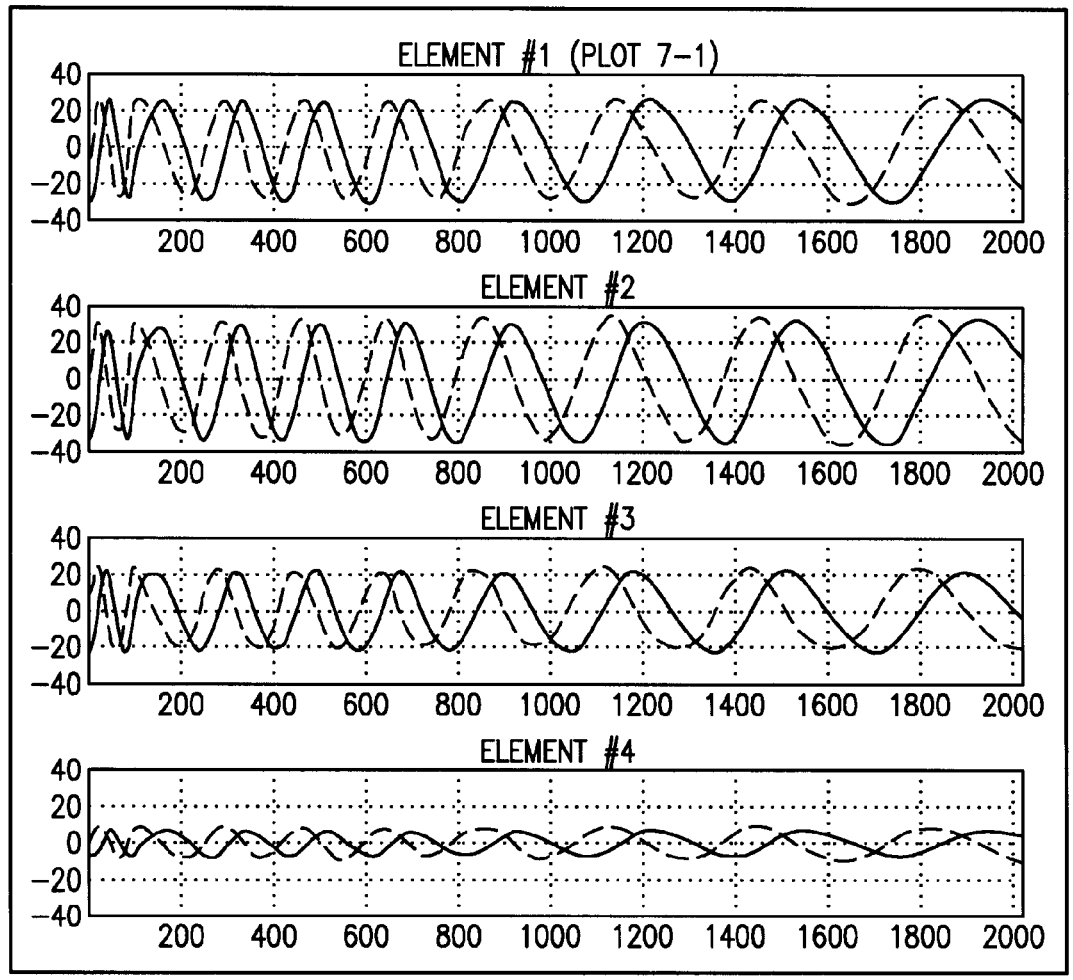
FIG. 46 is a graph of an example of the data recorded from the calibration measurement for channels 1-4 AFTER I/Q calibration.
Figure 47:
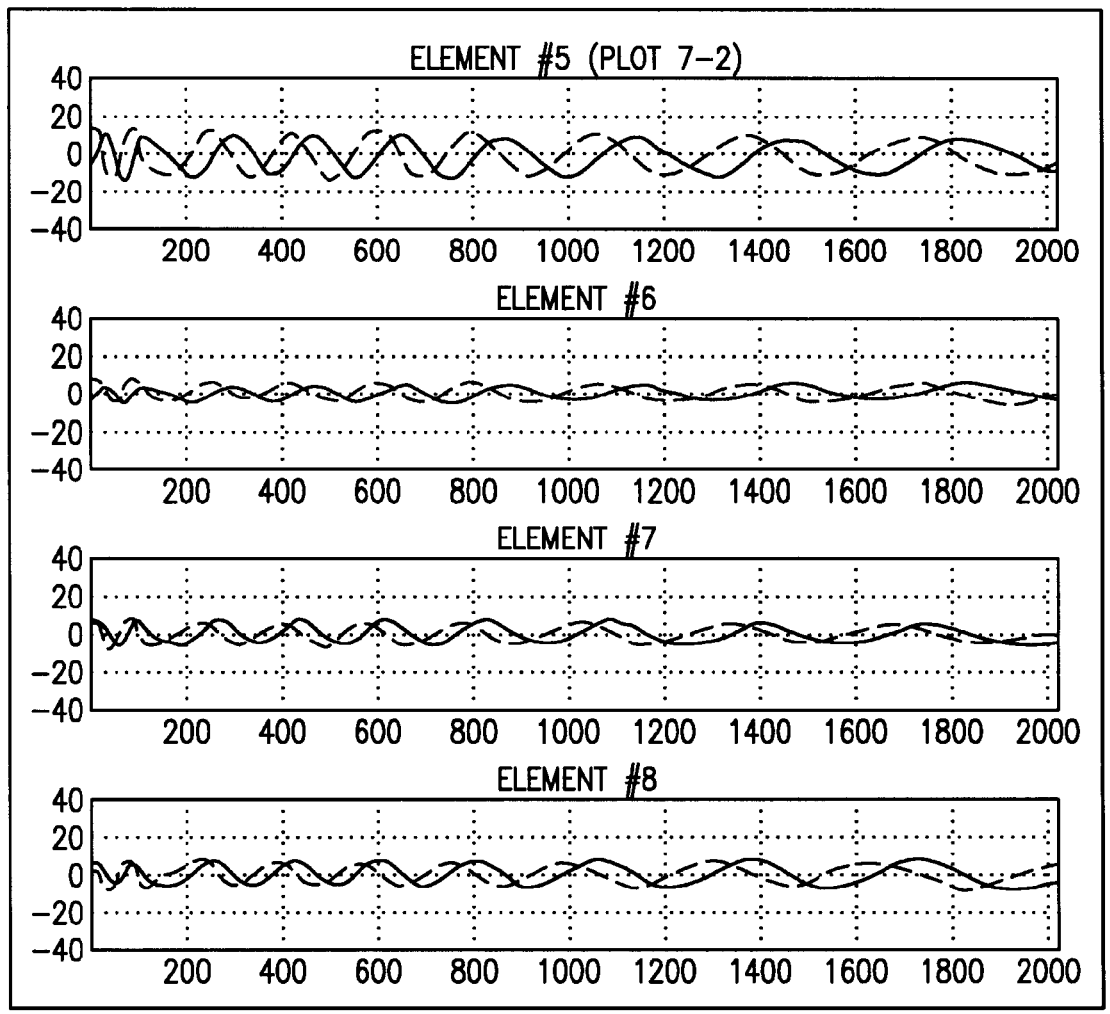
FIG. 47 is a graph of an example of the data recorded from the calibration measurement for channels 5-8 AFTER I/Q calibration.

A measurement example of the above calibration procedure was made using an exemplary embodiment of a radar. FIGS. 44 and 45 plot the background-subtracted waveforms recorded from all eight receiving channels while a reference corner reflector was moving slowly toward the radar. One can see the different amplitudes between the I and Q channel. Also, the peaks of the Q channel are not aligned with the zeros of the I channel as they should preferably be in order to have a 90-degree phase difference. Another way of viewing such amplitude and phase imbalance is to plot the data in an I-Q plane. The amplitude imbalance was observed by the different height and width of the rectangle that boxes the traces. The phase imbalance was seen by the tilting of the elliptical circles. The calculated AOA at every time point for raw data without I/Q calibration was plotted in color scales. Ideally, one may see a horizontal line since the angle of the reference target remained unchanged using the calibration measurement. Instead, the imbalance between I and Q channels causes undesired fluctuations in the AOA peaks. As a comparison, the results from calibrated data showed visible improvement as seen in FIGS. 46 and 47.

It should be noted that the imbalance observed in this example may be the result of deterioration of the specific unit on which many modifications were tested.

A third phase of this example focused on improvements to enhance the overall system robustness and sensitivity. These improvements include reducing transmitter-to-receiver coupling, controlling radiation pattern, eliminating broadside insensitivity, and optimizing mixer biasing. This effort included hardware design modification as well as additional software algorithm development.

In this example, the transmitter-to-receiver coupling was minimized by eliminating the transmitting patch antenna originally located at the center of the receiving array. The new radiation source is from the open-face DRO cavity that was found to give a good radiation pattern as well as similar or higher radiation power. The insensitivity issue associated with an object located along the centerline of the array due to the AC-coupled scheme was overcome by introducing an 180° phase delay to half of the array elements. The effect of switching time was also investigated. Automatic I/Q imbalance calibration procedures and algorithms were developed to improve the stability and accuracy of the AOA output as well as the target position. Algorithms were also developed for determining the true locations of more than one target present simultaneously.

In all, this effort included hardware design modification as well as software algorithm development. All of the remaining design and system performance issues were closely investigated and improved.

Radiation Pattern Study

During this effort, the radiation patterns were investigated carefully. Several attempts were made to improve the radiation patterns for further enhancing the system sensitivity. An objective of these attempts was to narrow the radiation pattern in the vertical (or elevation) plane and to widen the pattern in the horizontal (or azimuth) plane. Initially, diffraction and refraction structures were added to the transmitting patch antenna for pattern controlling. Later, the radiation patterns from the open-ceiling DRO cavity were investigated. The latter configuration has the advantage of much weaker transmitter-to-receiver coupling that could improve the receiver sensitivity. It was also found that the new radiation source using the DRO directly increased the radiated power slightly even though the earlier exemplary configuration (transmitting patch) had an additional RF gain stage.

The previous exemplary configuration contained a transmitting patch antenna and a RF gain stage located at the center of the array. The DRO circuit is enclosed by a conducting cavity to prevent it from letting radiation out. Measurement data revealed undesired coupling from the transmitting patch and the transmission line leading to the transmitting patch. This coupling term was stronger than desired target returns and therefore limited the maximum gain allowable in the subsequent digital gain stages.

Figure 49:
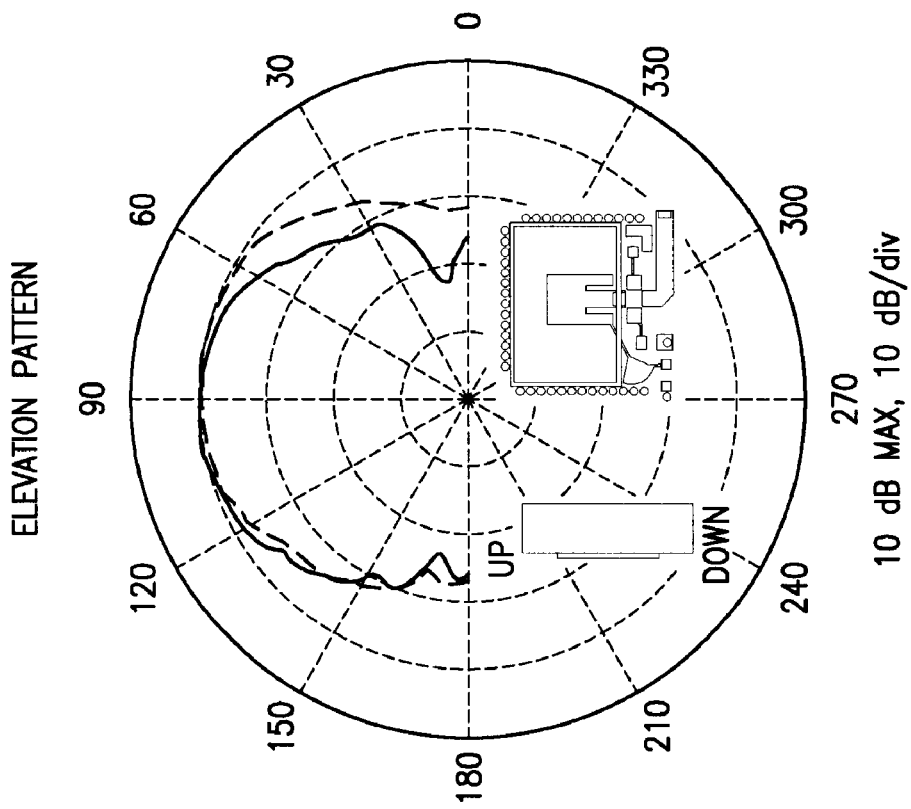
FIG. 49 is a graph of an example of the vertical pattern from the transmitting patch antenna with (dashed) and without (solid) a 0.25-inch thick Plexiglas layer on top.
Figure 48:
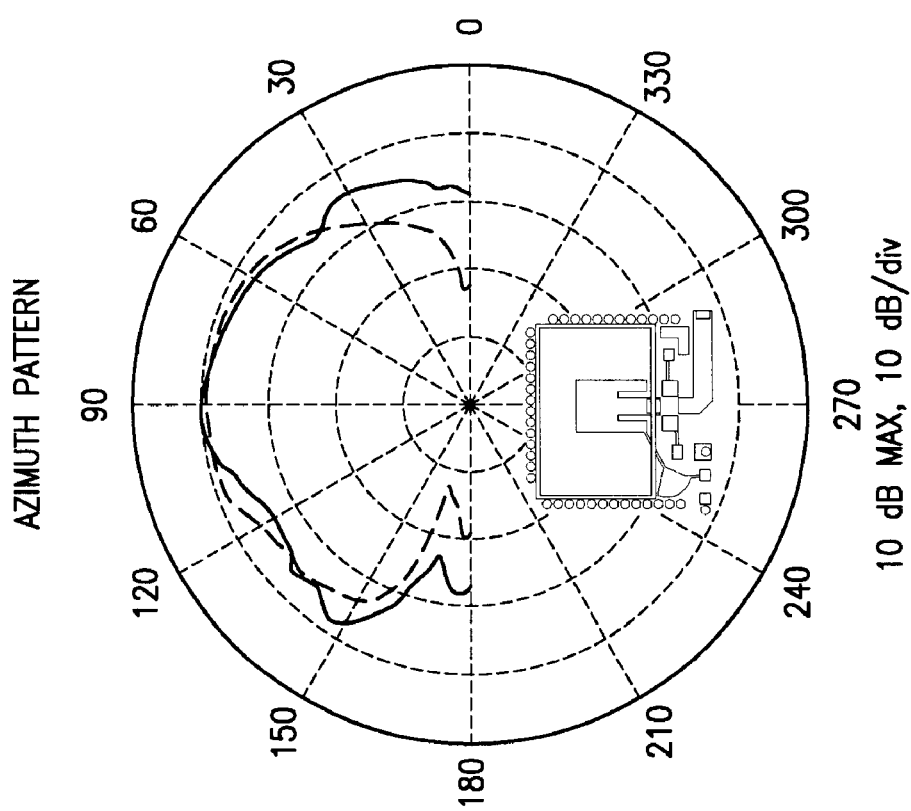
FIG. 48 is a graph of an example of the horizontal pattern from the transmitting patch antenna with (dashed) and without (solid) a 0.25-inch thick Plexiglas layer on top.

The radiation patterns from the patch antenna were measured and shown by the dashed line in FIGS. 48 and 49 for the horizontal and vertical planes, respectively. As one can see, a good horizontal pattern that had a smooth and broad radiation lobe was observed. However, the vertical pattern was not as narrow as desired in this example and had radiation toward the downward (ground) and upward (sky) directions.

The first modification was to introduce a layer of dielectric material on top of and in contact with the transmitting patch as illustrated in FIGS. 48 and 49 viewed from the top and side, respectively. A Plexiglas panel with a thickness of 0.25 inches was used as the layer of material to diffract the rays. The modified radiation patterns are shown by the solid lines. Desirable pattern widening in the horizontal plane and pattern narrowing in the vertical plane are clearly visible. The radiated power in the broadside direction was found to be similar before and after placing this dielectric layer.

Figure 50:
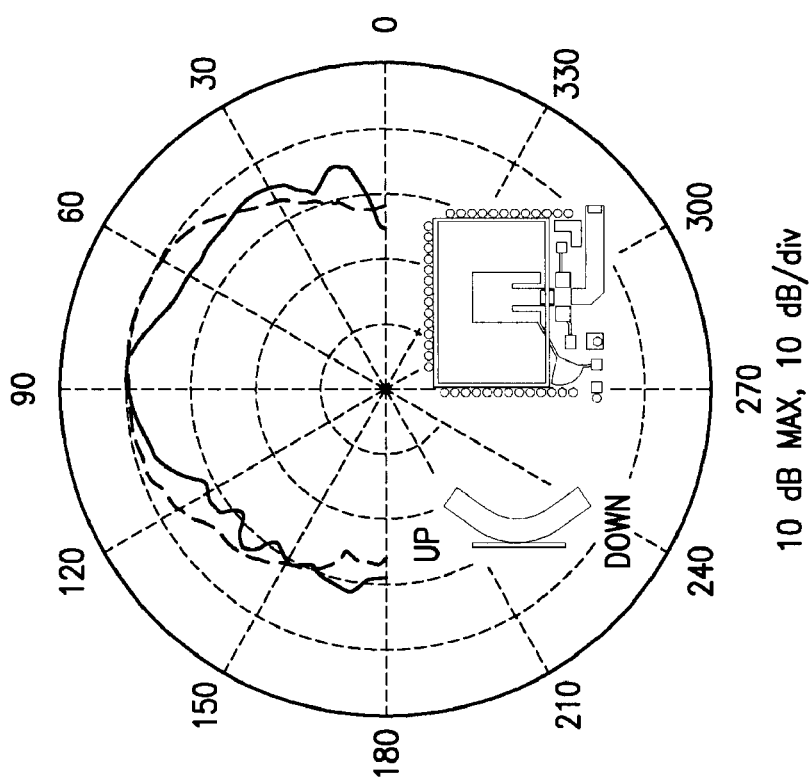
FIG. 50 is a graph of an example of the vertical pattern from the transmitting patch antenna with (dashed) and without (solid) a 0.125-inch thick Plexiglas layer on top.

Another attempt to further narrow the vertical plane along the broadside direction was carried out by using a dielectric (Plexiglas, 0.125" in thickness) layer that was curved outward in the vertical plane. The geometry and resultant vertical pattern are shown in FIG. 50. A narrow pattern in the broadside direction was achieved. The horizontal pattern remained similar to that obtained from a flat layer.

Figure 51:
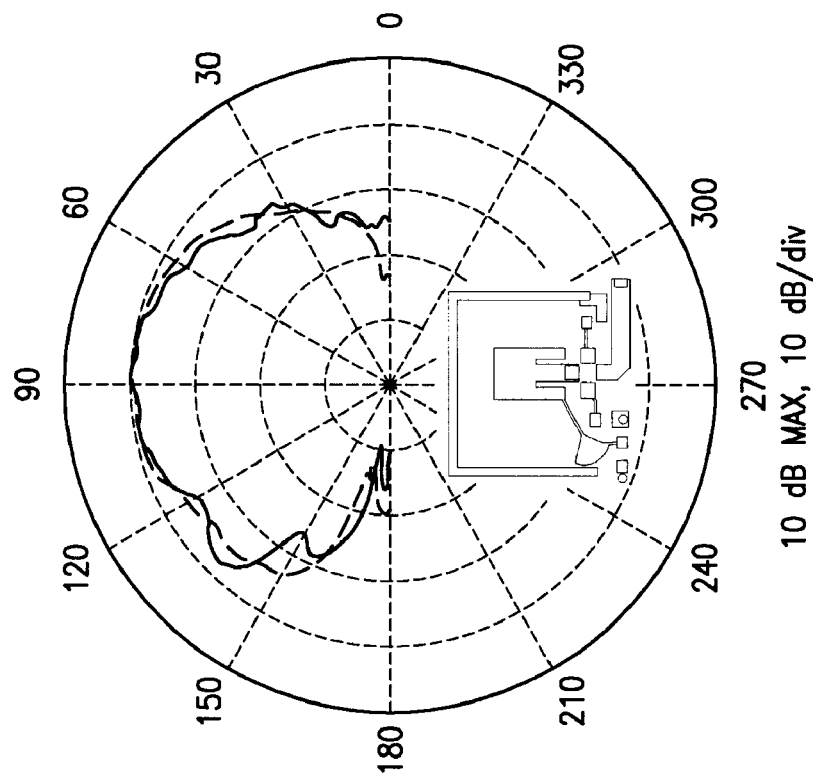
FIG. 51 is a graph of an example of the horizontal pattern from the transmitting patch antenna with (dashed) and without (solid) 0.25-inch tall metallic walls.
Figure 52:
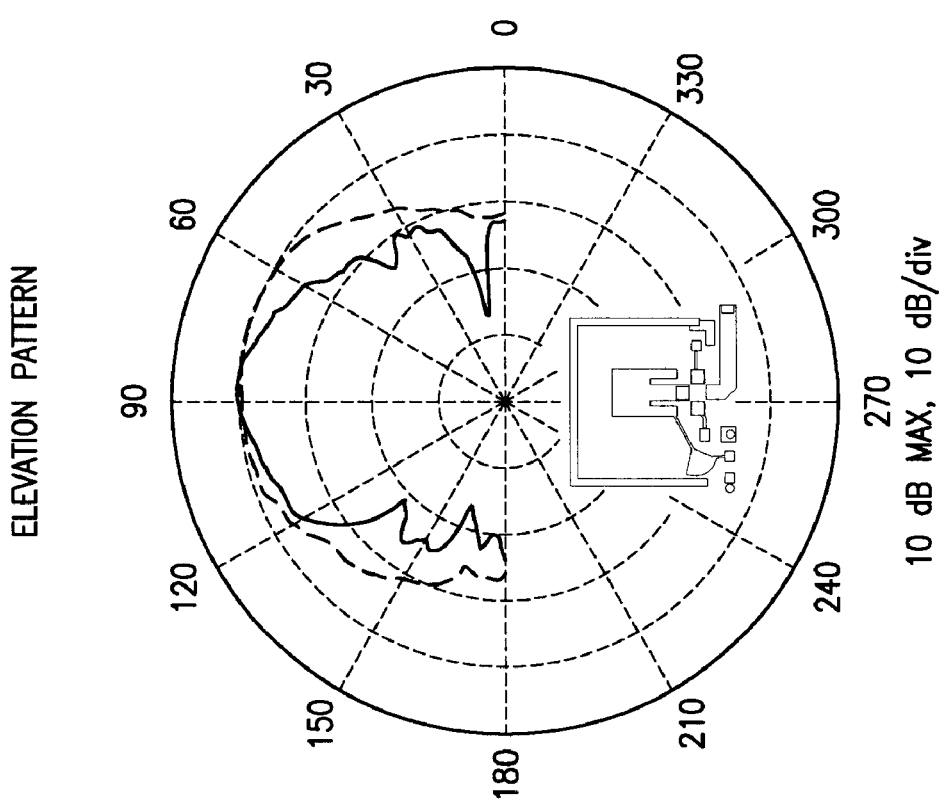
FIG. 52 is a graph of an example of the vertical pattern from the transmitting patch antenna with (dashed) and without (solid) 0.25-inch tall metallic walls.

It was also interesting to find out that a simple conducting wall (0.25" in height) around the transmitting patch significantly narrowed the vertical pattern and a little deterioration in the horizontal pattern. This finding is shown in FIGS. 51 and 52.

Radiation Pattern from Open-Face DRO

For this exemplary embodiment, it was determined that the transmitting antenna would be at least moved away from the receiving array to avoid the transmitter-to-receiver coupling and to increase the sensitivity. This embodiment helps to limit interference that may be caused by the leakage radiation from the DRO circuit. The DRO is used as the radiation source itself in this embodiment.

Figure 53:
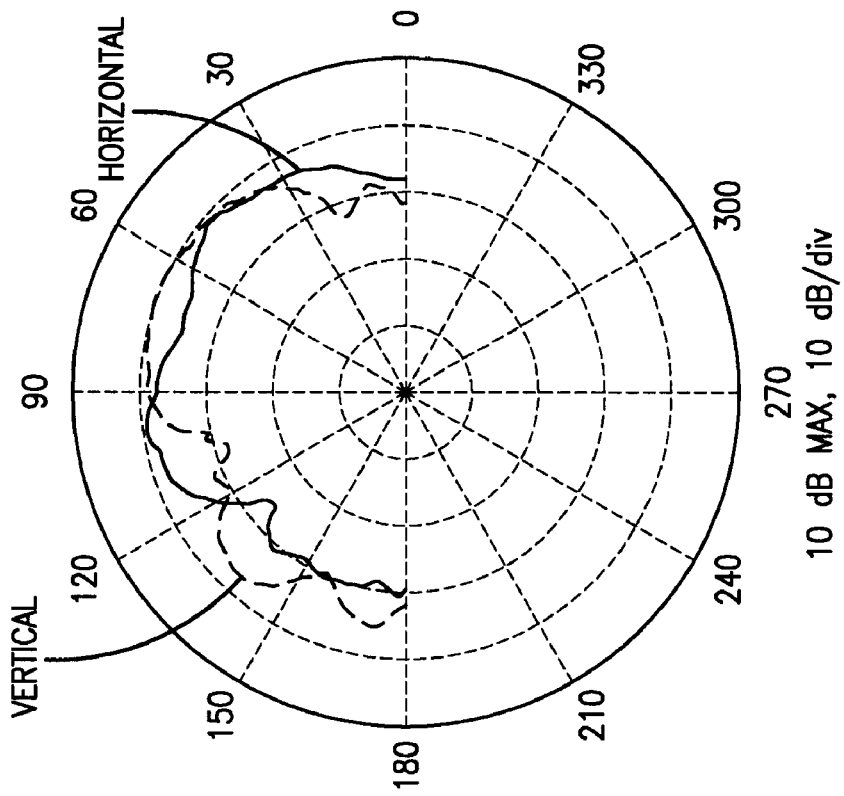
FIG. 53 is a graph of an example of the radiation of a DRO circuit without the cavity.
Figure 54:
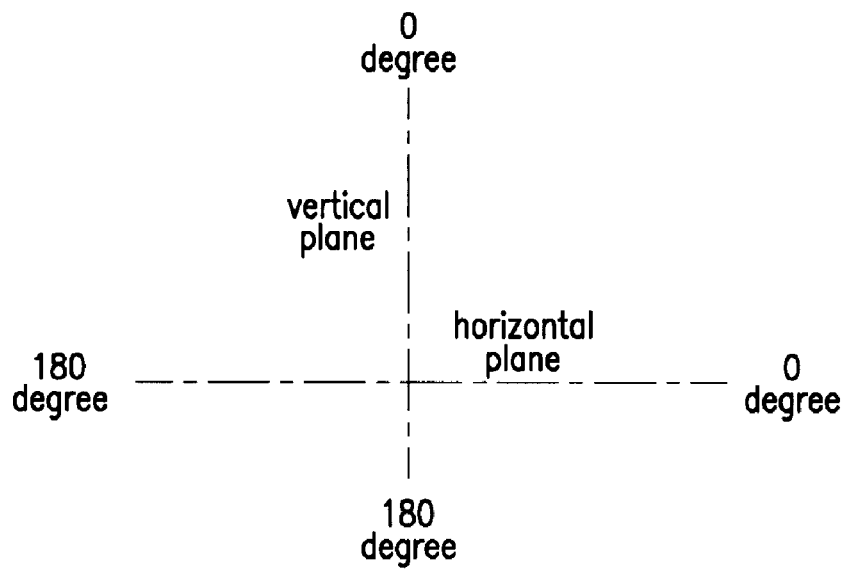
FIG. 54 is a diagram of an example of the coordinate definition of the subsequent pattern data.

First, the efficiency, polarization and pattern of the DRO if it is allowed to radiate was examined. It was found that the polarization of the radiated electrical field is mainly in the same direction as the coupling stub connected to the Drain of the FET in the DRO circuit. Since this polarization needs to be aligned with that of the receiving antennas, the orientation of the DRO circuit was rotated. FIG. 53 plots the measured radiation patterns for the DRO circuit without the cavity or tuning screw. The coordinate system for these patterns is indicated in FIG. 54.

Figure 55:
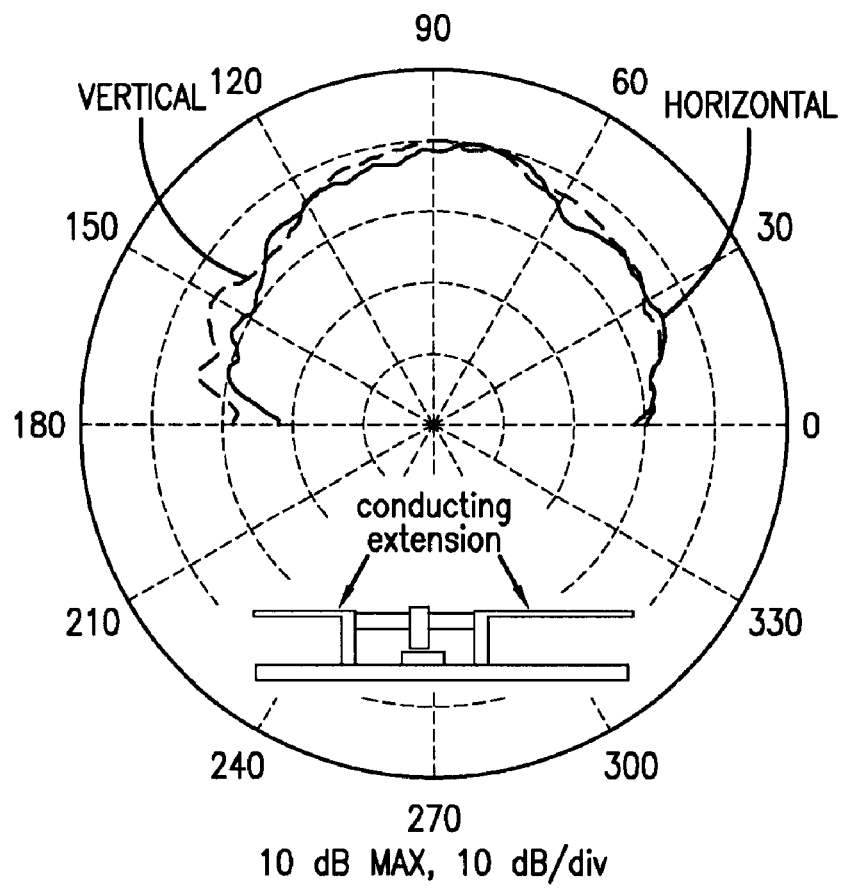
FIG. 55 is a graph of an example of the measured radiation patterns from the DRO with cavity and extended top surface.

Next, the patterns with the cavity added were measured by removing the ceiling of the DRO cavity. A clear ⅛" Plexiglas panel was placed at the ceiling for supporting the tuning screw (1 mm diameter). The top surface was also extended all the way around with a conducting plate to reduce edge diffractions as illustrated in FIG. 55 along with the measured radiation patterns in the horizontal and vertical planes. Both vertical and horizontal patterns look similar in this example. This horizontal pattern is quite desirable with a broad and smooth shape. The elevation pattern may be broader than desired and there is significant energy radiated into upward and downward directions. It was found that more power (~+9 dB) was radiated from this open-face DRO than from the previous Patch+FET configuration.

Receiving Pattern

Figure 56:
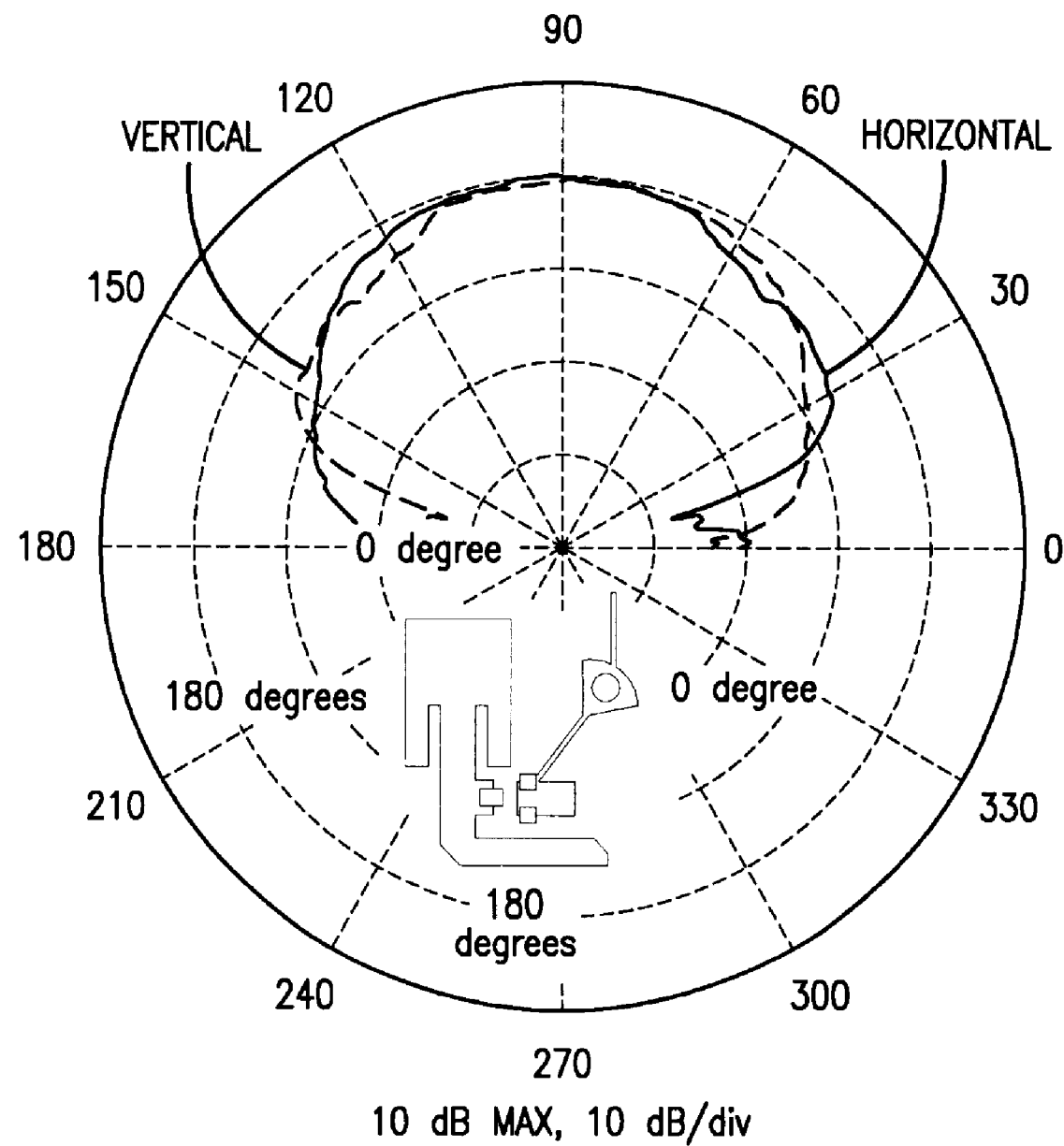
FIG. 56 is a graph of an example of the receiving patterns.

The receiving patterns for the receiving patch antenna were also using a RF network analyzer as the RF source. The results are shown in FIG. 56. Both vertical and horizontal patterns are similar within ±60 degrees. Very desirable dips in the upward and downward directions are observed in the vertical pattern. The slightly asymmetric pattern beyond 60 degrees may be caused by the presence of the switching circuit. Overall, these are good receiving patterns and required no further improvement for this example.

Except for the non-shielded ceiling, the only other opening that may produce leakage is the tunnel section above the filter. This section may have a minimal height (without affecting the function of the filter and transmission line) and may be longer than a wavelength (e.g., ~1.14") to prevent such leakage from happening.

Mixing Circuit

Figure 57:
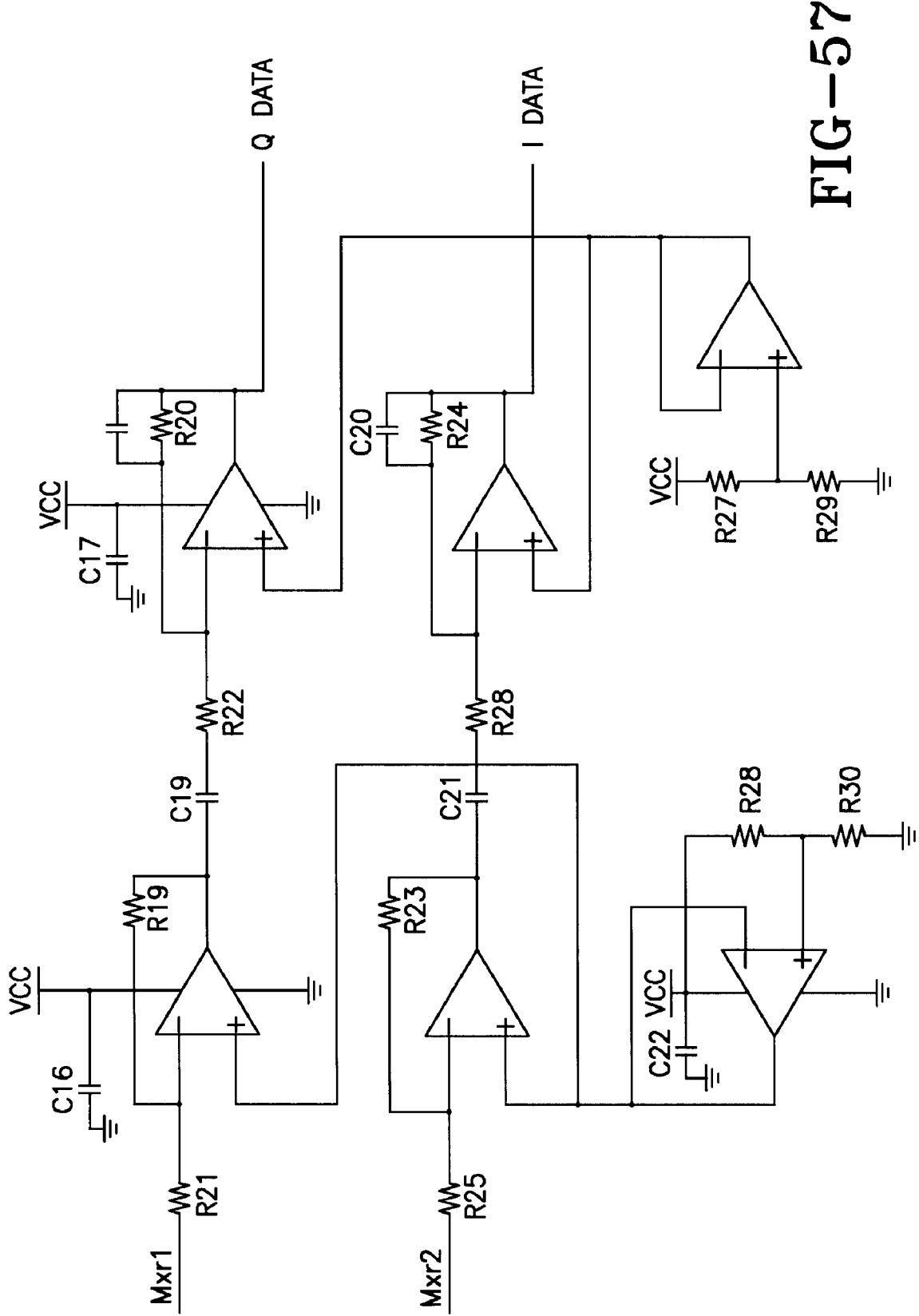
FIG. 57 is a diagram of an exemplary embodiment of the adjusted mixer biasing and gain circuits.

FIG. 57 shows the adjustments made to the circuits involving mixer biasing and gain stages in this embodiment. These adjustments are due to the removal of the transmitting patch antenna and the change in the DRO cavity. These changes resulted in higher LO level that changed the bias condition of the mixer diodes.

The values of R21 and R25 were reduced to achieve approximately 1 mA forward currents flowing into the mixer diodes. This also means a 0.1 V increase across R21 (or R25) resistor from left to right. This causes the voltage values at the "−" terminals of the U16 to be approximately 1 V. Note that it may be normal to have a slight voltage difference between I and Q channels. In fact, they should be slightly different unless there is no RF signal present. The input voltages at "+" terminals of U16 were also adjusted by adjusting the value of R30 such that it can support the diode's current since the input voltage of the "−" terminal will follow the input voltage of the "+" terminal during normal amplifier operations. The removal of the transmitting patch antenna and its feeding transmission-line greatly reduced the transmitter-to-receiver coupling that enables us to increase the gain at the second stage. This explains why the values of R20 and R24 were increased. This provides a gain of approximately 100 to 1 in this example. The gain at the first stage is 10 to 1 in this example.

It should be noted that further adjustments for R21, R25, R19 and R23 may be needed since the LO level on another board may be higher.

AOA Ambiguity Improvement

Figure 58:
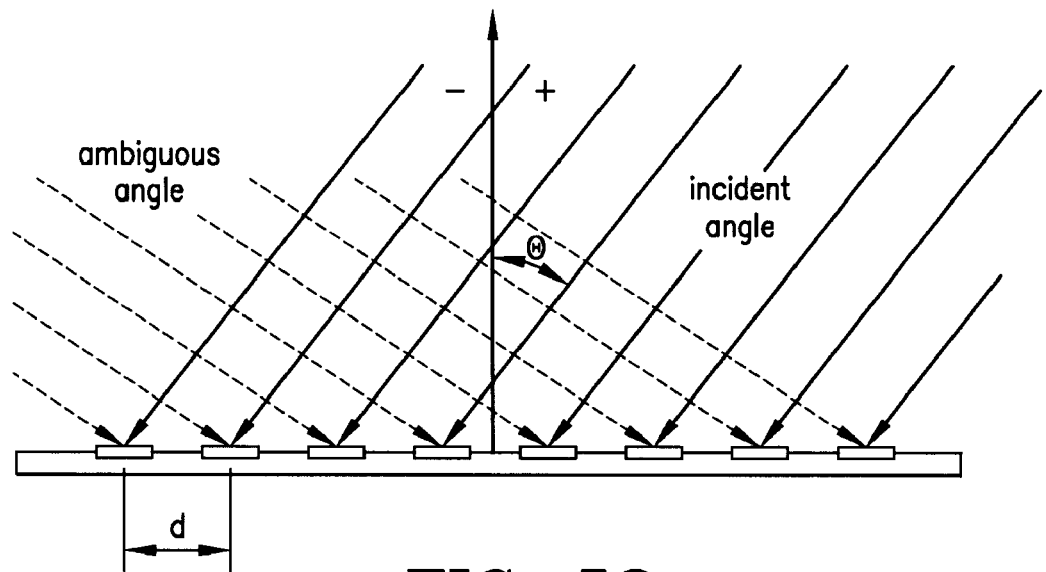
FIG. 58 is a diagram of an exemplary embodiment of the angle ambiguity.

Let the true incident angle be θ from the normal as shown by the solid lines in FIG. 58. The phase increment from a receiving element to its right neighbor is then $$\Delta\phi = \frac{2\pi d}{\lambda} \cdot \sin\theta. \tag{3.31}$$

An ambiguous angle (or aliasing), $\theta_g$, should then satisfy the following condition.

$$\frac{2\pi d}{\lambda} \cdot \sin\theta_g - \frac{2\pi d}{\lambda} \cdot \sin\theta = \pm 2\pi \tag{3.32}$$

or equivalently $$\sin\theta_g = \sin\theta \pm \frac{\lambda}{d}. \tag{3.33}$$

Figure 59:
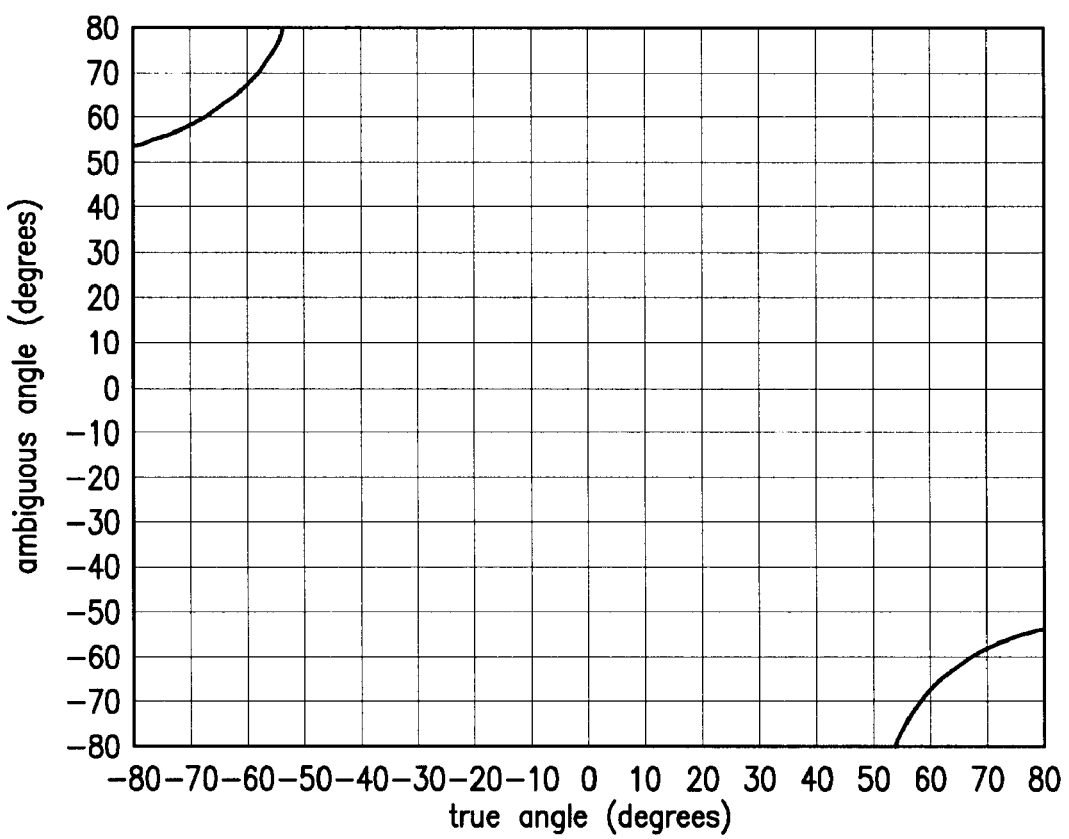
FIG. 59 is a graph of an example of the ambiguous angle for previous spacing ($d=\lambda/\sqrt{3.2}$).

The spacing for the previous array design was chosen to be $\lambda/\sqrt{3.2}$. The ambiguous angles for different incident angles are plotted in FIG. 59. As one can see, ambiguity occurs if the target is located beyond ~52 degrees from the broadside direction in this example. Note that the these curves only indicate the peak locations of the ambiguous angles. Since every peak has a lobe with some width, the ambiguous region actually occurs sooner than 52 degrees. To push the peak associated with the ambiguous angle further outside of our region of interest, the spacing was reduced to λ/2~0.56" in this example.

By reducing the array spacing, the ambiguous regions are moved beyond 60 degrees. Another minor adjustment in the peak searching algorithm in the triangulation may also completely avoid the ambiguous angle. This may be done by excluding any peak that is located at the upper or lower limit of the angle of interest.

Broadside AOA Improvement

The AOA is obtained from processing the relative phase information observed at different receiving elements in the array. Different phases at different receiving elements are caused by the different propagation distances required to arrive at the elements as shown in FIG. 32.

Under the parallel-ray assumption, the amplitude and phase of the received fields observed at the $n^{th}$ array element can be expressed as $$E_n = Ae^{jk(nd)\sin\theta}, \quad (3.34)$$

where d is the element spacing, n=[0, 1, 2, ... N-1] of a N-element array, and θ is the angle away from the normal direction. As the index n increases, a phase advance of kd sin θ is introduced. Notice that all receiving elements will receive the same if the incident waves are coming from the broadside direction, i.e. θ=0°. In this case, a potential problem may occur because of the AC-coupled configuration in the circuit design as shown in FIG. 57. Capacitors C19 (Q-channel) and C21 (I-channel) are the AC-coupling capacitors that isolate the DC bias of the mixers from the second gain stage to enhance the stability and sensitivity. At the left terminal of each capacitor, a DC voltage of approximately 1.02 V is present all the time in this embodiment. This voltage is used to properly bias the mixer to have a bias current of approximately 1 mA. Note that this bias current is determined by the diode's I-V characteristic, LO level, and the load resistance, R21 or R25. This DC voltage may change a little when a RF signal is introduced from the receiving channel. The deviation of such DC voltage from that obtained without RF contains the desired RF information. If the array is not scanning (i.e., parked at a certain receiving channel), such a DC voltage may not be able to pass through the capacitors C19 and C21. During the scanning, changing of RF signals among different receiving channels appears as an AC modulation upon the DC bias as a function of time, and thus is able to pass through the coupling capacitors.

Actually, the RC circuit acts like a high-pass filter as shown by the relationship (see Equation (3.35)) between the input and output voltages. This high-pass filter does not only block DC but also blocks a portion of signals at a frequency below the cutoff frequency defined earlier. Since I- and Q-channels have the same design, the following discussion will use only Q-channel as an example.

$$|V_o| = |V_i| \cdot A \cdot \frac{(\omega/\omega_c)}{\sqrt{1 + (\omega/\omega_c)^2}} \quad (3.35)$$

$$\omega_c = \frac{1}{R_{22}C_{19}} \quad (Q\text{-Channel}) \quad (3.36)$$

$$= \frac{1}{4.7 \times 10^3 \times 22 \times 10^{-6}}$$

$$\approx 9.6 \text{ (Hz)}$$

The discharging time constant is $\tau = R_{22}C_{19} \approx 0.1$ second in this example. Actually, at $$t = \frac{\tau}{10},$$

the voltage has dropped down to approximately $$e^{-\frac{t}{\tau}} = 90\%.$$

Using this as a tolerance, the switch time from one receiving channel to the next channel may not be longer than τ/10 in this example, which corresponds to 10 ms for the current choice of C and R values. This also means the frequency for the array scanning may be faster than 100 Hz in this example. Note that the charging time is very short and is determined by the internal capacitance (looking into the OPAMP from the output port) and the feedback resistance (R19) of the amplifier (U14).

Figure 60:
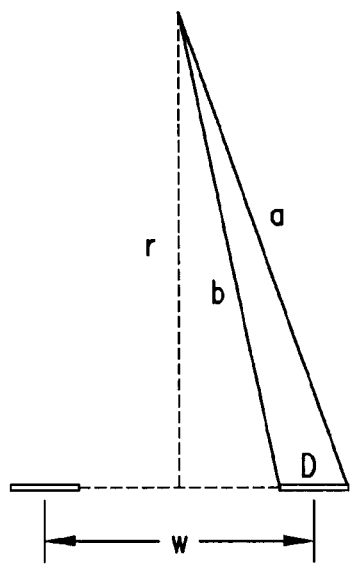
FIG. 60 is a diagram of an exemplary embodiment of the phase difference between the left-most and right-most element in an array for a target located along the centerline.

The AC-coupling scheme may have a drawback in a situation in which an object appears near the center broadside direction of the array. This is clear from Equation (3.34) since the value of sin θ becomes very small as θ gets close to 0 degree. This may mean that the signals from all receiving channels only vary slightly or vary as during the array scan. Effectively, they may cause a similar DC voltage shift at the input of the high-pass filter. Such a DC shift may not pass the filter and may result in the loss of target. Note that an object positioned near the blind direction of one array would be away from the blind direction of the other array for the exemplary embodiment of the dual-unit configuration unless the object is very far away or is located at the center line between the two radar units. To determine the minimum distance, r, for which simultaneous blindness may occur, the geometry is shown in FIG. 60. Note that D is approximately 3.92" and λ is approximately 1.14" in this example. The condition where the blindness may begin to occur is $$a - b < \lambda/2. \quad (3.37)$$

Figure 61:
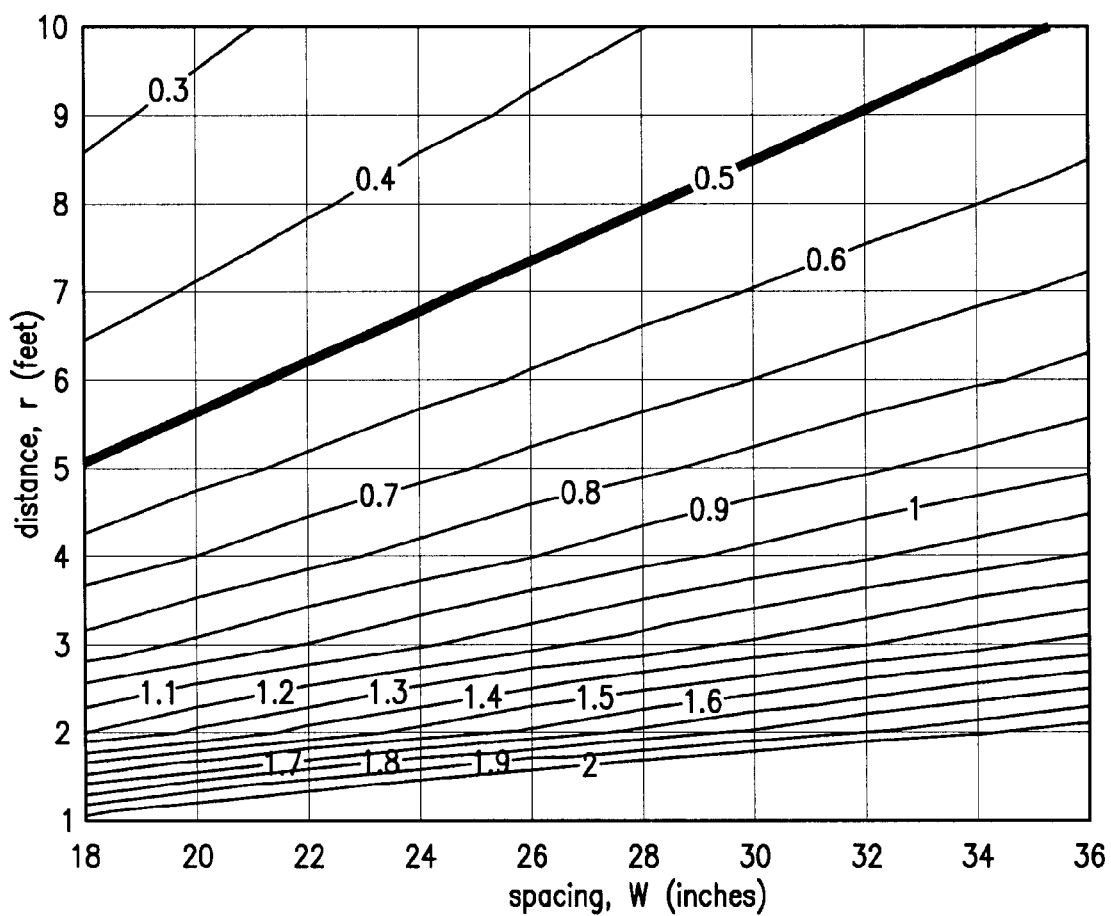
FIG. 61 is a graph of an example of the (a-b)/wavelength for different target distance and radar spacing.

FIG. 61 plots the values of (a–b)/λ for different down-range distance and radar spacing. The region above the thick line indicates the phase difference between the innermost and outmost elements is less than 180° (i.e., in phase). This is the region where a target located along the centerline is simultaneously within the blind directions of both left and right radar units.

Blind Direction Elimination

In order to overcome the issue of the blind direction in the region of most interest for this example, an additional –180° phase shift is introduced to the receiving channels 5 through 8 by adding the length of the transmission line. This resulted in a 0.344-inch length difference between the left four and right four elements in this example. This makes the signals from the right side of elements to be the negative of the signals from the left side of elements when a target is located on the centerline. This allows the signals to go through the high-pass filter. After the signals are digitized, a negative sign is multiplied back to the data from the right side of elements before calculating the AOA.

Based on the incident fields expressed in Equation (3.34) and the high-pass filter characteristic shown in Equation (3.35), the resultant AOA before and after adding the –180-degree phase shift for channels 5-8 was compared. The simulations were done for switching time of 1 ms, 10 ms and 20 ms. The switch time is defined to be the time duration between one receiving channel to the next channel during the array scan. It was also assumed that one data point was taken at each receiving channel. The simulations results were displayed. When the switch time is longer than the discharging time constant (e.g., 9.6 ms in this example), the blind direction effect is pronounced, and the 180-degree phase shift introduced to channels 5-8 successfully recovered the AOA peaks near the broadside direction. It was observed that when the switch time is much less than the discharging time constant, similar AOA results are obtained for both cases. This suggests that the there will not be a blind direction issue when the switch time is much less than 9.6 ms in this example. In fact, the actual switching time may be shorter than 1 ms in some exemplary embodiments. Note that the short switching may be limited by the response time of the RF switches used in the receiving channels. This may also be much shorter than 1 ms. If the sampling speed of the A/D is an order of magnitude compared to 1 kHz in this example, multiple data points can be integrated at each receiving channel for improving signal to noise ratio.

This example clearly demonstrated that the concept of introducing an 180-degree phase shift could indeed remove the blind direction issue that may be inherent to the AC-coupling scheme. Most importantly, it also indicates such a 180 degree phase shift may not be required when the switch time is much shorter than the discharging time constant. The latter approach may be preferred for some embodiments since the actual phase shift may deviate a little from 180 degrees due to temperature effect and no modification to the AOA algorithm would be required to compensate for an artificial phase shift.

Conclusion

An X-band array radar design was developed for detecting and locating a stationary or moving object in view of the radar. One exemplary design was a long continuous array that had a length of approximately 1 m and contained more than 30 receiving elements. This concept was tested using a patch antenna array mounted on a vehicle bumper and commercial RF equipment. The switching between the array elements was done using commercial mechanical switches. The test results demonstrated that the angle-of-arrival of a target in front of the array may be accurately obtained from the array data. It also demonstrated that the near-field focusing algorithm was able to determine the down range distance of the target along the AOA direction.

In another exemplary embodiment, the array size was reduced down to eight receiving elements. The radar was developed using low-cost components. In this embodiment, a single transmitting patch antenna radiates the microwave energy from the center of the array. Eight receiving patch antennas (four on each side) then record the magnitude and phase of the scattered microwave energy from potential obstacles. This recorded information is digitized and processed to obtain the angle direction of the obstacle relative to the radar unit. The location of the obstacle may then be determined utilizing the angle information from two separate units. A special control and data processing program was developed for the radar. This program provides a simple control panel.

In yet another embodiment, the radiation source was changed to an open-face DRO cavity. This embodiment reduced transmitter-to-receiver coupling and improved the radiation pattern. In addition, this embodiment improved broadside sensitivity by introducing a phase delay to half of the array elements.

Furthermore, an automatic I/Q-imbalance calibration algorithm was developed and demonstrated using data collected from an exemplary embodiment of a radar of the present invention. This calibration algorithm requires only two amplitude and phase correction factors determined from a calibration measurement. The procedure and setup of this calibration measurement was discussed. It should be noted that the imbalance condition observed should be considered as a worse case due to the deterioration of the specific exemplary unit on which countless modifications were experimented. Such calibration may not be needed if the imbalance is small and negligible (to be determined by the calibration measurement). Even if calibration is needed, it may only need to be done once for the same batch of mixer diodes, print circuit boards, and assembly procedure. The correction factors can then be hardwired into the DSP codes.

Other embodiments of the radar system are within the scope of the present invention. Based on the teaching of the present invention, the hardware and software of the radar system may be selected to meet the requirements and specifications of a particular installation. In addition, the number and spacing of the receiving elements may be selected to achieve the desired detection sensitivity and the desired accuracy of AOA and positioning.

Any embodiment of the present invention may include any optional or preferred feature of any other embodiment of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for detecting an object, said method comprising:

providing a transmitting antenna;

providing a first array of receiving antennas;

transmitting from said transmitting antenna;

measuring a magnitude and phase of a respective received signal at each of said receiving antennas of said first array;

determining a first magnitude of a first weighted sum of respective phase-compensated signals related to each of said receiving antennas of said first array;

comparing said first magnitude of said first weighted sum from said first array against a first predetermined threshold value;

comparing said first magnitude of said first weighted sum from said first array against a second predetermined threshold value; and detecting an object by considering a ratio of said first magnitude to said first predetermined threshold value and a ratio of said first magnitude to said second predetermined threshold value.

2. The method of claim 1 further comprising the step of determining a warning based on a relationship of said first magnitude of said first weighted sum to said first predetermined threshold value and said second predetermined threshold value.

3. The method of claim 2 further comprising:

providing a first type of said warning if said first magnitude of said first weighted sum exceeds said first predetermined threshold value but not said second predetermined threshold value; and providing a second type of said warning if said first magnitude of said first weighted sum exceeds said first predetermined threshold value and said second predetermined threshold value.

4. The method of claim 1 further comprising:
providing a second array of receiving antennas;
measuring a magnitude and phase of a respective received signal at each of said receiving antennas of said second array;
determining a second magnitude of a second weighted sum of respective phase-compensated signals related to each of said receiving antennas of said second array;
comparing said second magnitude of said second weighted sum of said respective phase-compensated signals of said second array against third predetermined threshold value;
comparing said second magnitude of said second weighted sum of said respective phase-compensated signals of said second array against fourth predetermined threshold value; and
detecting an object by further considering a ratio of said second magnitude to said third predetermined threshold value and a ratio of said second magnitude to said fourth predetermined threshold value.

5. The method of claim 4 further comprising the step of determining a warning based on a relationship of said first magnitude of said first weighted sum of said first array to said first predetermined threshold value and said second predetermined threshold value and on a relationship of said second magnitude of said second weighted sum of said second array to said third predetermined threshold value and said fourth predetermined threshold value.

6. The method of claim 5 wherein said warning is based on said first magnitude of said first weighted sum of said first array if said first magnitude of said first weighted sum of said first array at least exceeds said first predetermined threshold value but said second magnitude of said second weighted sum of said second array does not exceed said third predetermined threshold value.

7. The method of claim 6 wherein said first magnitude of said first weighted sum of said first array at least exceeds said first predetermined threshold value but said second magnitude of said second weighted sum of said second array does not exceed said third predetermined threshold value, the method further comprising:
providing a first type of said warning if said first magnitude of said first weighted sum of said first array exceeds said first predetermined threshold value but not said second predetermined threshold value; and
providing a second type of said warning if said first magnitude of said first weighted sum of said first array exceeds said first predetermined threshold value and said second predetermined threshold value.

8. The method of claim 4 further comprising:
performing position triangulation if said first magnitude of said first weighted sum of said first array exceeds said first predetermined threshold value and said second magnitude of said second weighted sum of said second array exceeds said third predetermined threshold value;
wherein said second predetermined threshold value is higher than said first predetermined threshold value and said fourth predetermined threshold value is higher than said third predetermined threshold value.

9. The method of claim 8 further comprising the step of providing a warning based on the position of the object.

10. A method for determining the location of an object, said method comprising:
providing a transmitting antenna;
providing a first array of receiving antennas and a second array of receiving antennas;
transmitting from said transmitting antenna;
measuring a magnitude and phase of a respective received signal at each of said receiving antennas of said first array and said second array;
determining a first weighted sum of the magnitudes of said first array;
determining a second weighted sum of the magnitudes of said second array;
comparing said first weighted sum of said first array against a predetermined threshold value;
comparing said second weighted sum of said second array against a predetermined threshold value; and
performing position triangulation if at least one peak of said first weighted sum of said first array and at least one peak of said second weighted sum of said second array both at least exceed said respective predetermined threshold value.

11. The method of claim 10 wherein the step of performing position triangulation considers only interceptions that involve a peak of said first weighted sum of said first array and a peak of said second weighted sum of said second array.

12. A method for detecting an object, said method comprising:
providing a transmitting antenna;
providing a first array of receiving antennas;
transmitting from said transmitting antenna;
measuring a magnitude and phase of a respective received signal at each of said receiving antennas of said first array;
determining a first magnitude of a first weighted sum of respective phase-compensated signals related to each of said receiving antennas of said first array;
comparing said first magnitude of said first weighted sum from said first array against a first predetermined threshold value; and
detecting an object by considering a ratio of said first magnitude to said first predetermined threshold value.

13. The method of claim 12 further comprising:
providing a second array of receiving antennas;
measuring a magnitude and phase of a respective received signal at each of said receiving antennas of said second array;
determining a second magnitude of a second weighted sum of respective phase-compensated signals related to each of said receiving antennas of said second array;
comparing said second magnitude of said second weighted sum from said second array against a second predetermined threshold value; and
detecting an object by further considering a ratio of said second magnitude to said second predetermined threshold value.

14. The method of claim 13 further comprising the step of performing position triangulation if said first magnitude of said first weighted sum of said first array exceeds said first predetermined threshold value and said second magnitude of said second weighted sum of said second array exceeds said second predetermined threshold value.

* * * * *

UNITED STATES PATENT AND TRADEMARK OFFICE
CERTIFICATE OF CORRECTION

PATENT NO.         : 7,295,154 B2                                                  Page 1 of 1
APPLICATION NO. : 10/968472
DATED              : November 13, 2007
INVENTOR(S)        : Walton et al.

It is certified that error appears in the above-identified patent and that said Letters Patent is hereby corrected as shown below:

In Item (56), References Cited, FOREIGN PATENT DOCUMENTS, please delete "GB 2309829 A 8/1999" and insert -- GB 2309829 A 8/1997 --.

In column 37, line 12, please delete "against third" and insert -- against a third --.

In column 37, line 16, please delete "against fourth" and insert -- against a fourth --.

Signed and Sealed this

Eighteenth Day of March, 2008

JON W. DUDAS
*Director of the United States Patent and Trademark Office*